US011373424B1

(12) United States Patent
Fleming et al.

(10) Patent No.: US 11,373,424 B1
(45) Date of Patent: Jun. 28, 2022

(54) DOCUMENT ANALYSIS ARCHITECTURE

(71) Applicant: AON RISK SERVICES, INC. OF MARYLAND, New York, NY (US)

(72) Inventors: Samuel Cameron Fleming, Spokane, WA (US); David Craig Andrews, Carnation, WA (US); Jared Dirk Sol, Spokane, WA (US); Scott Buzan, Spokane Valley, WA (US); Timothy Seegan, Spokane, WA (US); Christopher Ali Mirabzadeh, Spokane, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 3 days.

(21) Appl. No.: 16/897,559

(22) Filed: Jun. 10, 2020

(51) Int. Cl.
*G06K 9/62* (2022.01)
*G06N 3/08* (2006.01)
*G06F 40/284* (2020.01)
*G06V 30/416* (2022.01)
*G06V 30/414* (2022.01)

(52) U.S. Cl.
CPC .......... *G06V 30/414* (2022.01); *G06F 40/284* (2020.01); *G06K 9/627* (2013.01); *G06K 9/6256* (2013.01); *G06N 3/08* (2013.01); *G06V 30/416* (2022.01)

(58) Field of Classification Search
CPC ............ G06K 9/00463; G06K 9/0469; G06K 9/00483; G06K 9/6256; G06K 9/6257; G06F 40/284; G06F 40/289; G06F 40/279; G06F 40/295; G06F 40/30; G06F 40/40

USPC ...... 704/1–10, 257; 382/224, 227, 229, 180, 382/159
See application file for complete search history.

(56) References Cited

U.S. PATENT DOCUMENTS

| | | | |
|---|---|---|---|
| 6,253,169 B1 * | 6/2001 | Apte | G06F 16/355 704/9 |
| 10,614,345 B1 * | 4/2020 | Tecuci | G06K 9/6272 |
| 2002/0113818 A1 * | 8/2002 | Tsuda | G06F 16/951 715/748 |
| 2010/0049762 A1 * | 2/2010 | Cui | G06F 16/951 707/710 |
| 2012/0278332 A1 * | 11/2012 | Wang | G06F 40/284 707/740 |
| 2014/0324808 A1 | 10/2014 | Sandhu et al. | |

(Continued)

OTHER PUBLICATIONS

Zichao Yang, Diyi Yang, Chris Dyer, Xiaodong He, Alex Smola, Eduard Hovy, "Hierarchical Attention Networks for Document Classification", Proceedings of NAACL-HLT 2016, pp. 1480-1489, Carnegie Mellon University, Microsoft Research, Redmond (Year: 2016).*

(Continued)

*Primary Examiner* — Andrew M Moyer
*Assistant Examiner* — Stephen M Brinich
(74) *Attorney, Agent, or Firm* — Lee & Hayes, P.C.

(57) ABSTRACT

Systems and methods for generation and use of document analysis architectures are disclosed. A model builder component may be utilized to receiving user input data for labeling a set of documents as in class or out of class. That user input data may be utilized to train one or more classification models, which may then be utilized to predict classification of other documents. Trained models may be incorporated into a model taxonomy for searching and use by other users for document analysis purposes.

17 Claims, 31 Drawing Sheets

(56) References Cited

U.S. PATENT DOCUMENTS

| | | | | |
|---|---|---|---|---|
| 2016/0078022 A1* | 3/2016 | Lisuk | ................... | G06F 40/117 |
| | | | | 706/12 |
| 2017/0237868 A1* | 8/2017 | Sato | .................. | G06K 9/00469 |
| | | | | 358/402 |
| 2017/0286869 A1 | 10/2017 | Zarosim et al. | | |
| 2018/0349388 A1* | 12/2018 | Skiles | .................. | G06F 3/0482 |
| 2019/0236348 A1* | 8/2019 | Miao | ................. | G06K 9/00456 |
| 2020/0394396 A1* | 12/2020 | Yanamandra | ...... | G06K 9/00469 |

OTHER PUBLICATIONS

Non Final Office Action for U.S. Appl. No. 16/897,513, dated Aug. 4, 2021 Edmund,William, "Document Analysis Architecture" 17 Pages.

International Search Report and Written Opinion for PCT App. No. PCT/US21/36295, dated Sep. 14, 2021, 9 pages.

\* cited by examiner

< Document List

Example Title A
Publication Number A

Abstract

Example Abstract A

Claims

1. A method comprising:
Element 1
Element 2
Element 3

2. The method of claim 1, further comprising:
Element 4

3. The method of claim 1, further comprising:
Element 5

4. A system comprising:
Element 6
Element 7
Element 8

5. The system of claim 4, the operations further comprising:
Element 9

Category Notes

CATEGORY PROGRESS

929 In
5697 Out
0 Skipped
550 Unlabeled

Patent Details

Prediction: In (0.988)
Claim Score: 0 (Broadest: 0)

Patent Notes

Add notes to this patent

☐ Show Keywords
☐ Enable Hotkeys
☐ Use Uncertainty Sampling

| Out | ← | Undo | Skip | In |
| → | ↓ | → |

```
┌─────────────────────────────────────────────────────────────────────────┐
│ Generate classification models configured to identify document of       │
│ multiple documents as in class or out of class, classification models   │
│ trained utilizing user input data indicating first portion of documents │
│ as in class and second portion of documents as out of class, wherein    │
│ documents include patents and patent applications                       │
│                              2702                                       │
└─────────────────────────────────────────────────────────────────────────┘
                                   │
                                   ▼
┌─────────────────────────────────────────────────────────────────────────┐
│ Determine, for individual ones of classification models, technology     │
│ category and one or more subcategories associated with individual ones  │
│ of classification models, technology category and one or more           │
│ subcategories associated with classification system associated with     │
│ multiple documents                                                      │
│                              2704                                       │
└─────────────────────────────────────────────────────────────────────────┘
                                   │
                                   ▼
┌─────────────────────────────────────────────────────────────────────────┐
│ Generate taxonomy of classification models, taxonomy indicating         │
│ categorical relationships between classification models, generating     │
│ taxonomy based at least in part on technology category and one or more  │
│ subcategories associated with individual ones of classification models  │
│                              2706                                       │
└─────────────────────────────────────────────────────────────────────────┘
```

```
┌─────────────────────────────────────────────────────────────────┐
│ Store taxonomy of models trained to determine classification of  │
│ individual ones of documents, individual ones of models trained  │
│ based at least in part on document dataset indicated to be in    │
│ class at least in part from first user input data                │
│                            3002                                   │
└─────────────────────────────────────────────────────────────────┘
                              ↓
┌─────────────────────────────────────────────────────────────────┐
│       Receive second user input data representing search query   │
│                            3004                                   │
└─────────────────────────────────────────────────────────────────┘
                              ↓
┌─────────────────────────────────────────────────────────────────┐
│      Determine portion of models that are associated with        │
│                       search query                                │
│                            3006                                   │
└─────────────────────────────────────────────────────────────────┘
                              ↓
┌─────────────────────────────────────────────────────────────────┐
│ Cause display of search results for search query, search results │
│   indicating portion of taxonomy associated with portion of he   │
│                            models                                 │
│                            3008                                   │
└─────────────────────────────────────────────────────────────────┘
```

FIG. 30

DOCUMENT ANALYSIS ARCHITECTURE

BACKGROUND

Determining the similarities, differences, and classification of information, such as a document, in association with other information can be valuable. However, quantifying attributes of document analysis, particularly in large corpuses of documents, is difficult. Described herein are improvements in technology and solutions to technical problems that can be used to, among other things, generate and utilize a document analysis architecture.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3B illustrates an example user interface with functionality for displaying document data and for accepting user input.

FIG. 27 illustrates a flow diagram of an example process for building model taxonomies.

FIG. 30 illustrates a flow diagram of another example process for searching classification models using taxonomies.

DETAILED DESCRIPTION

Figure 1:
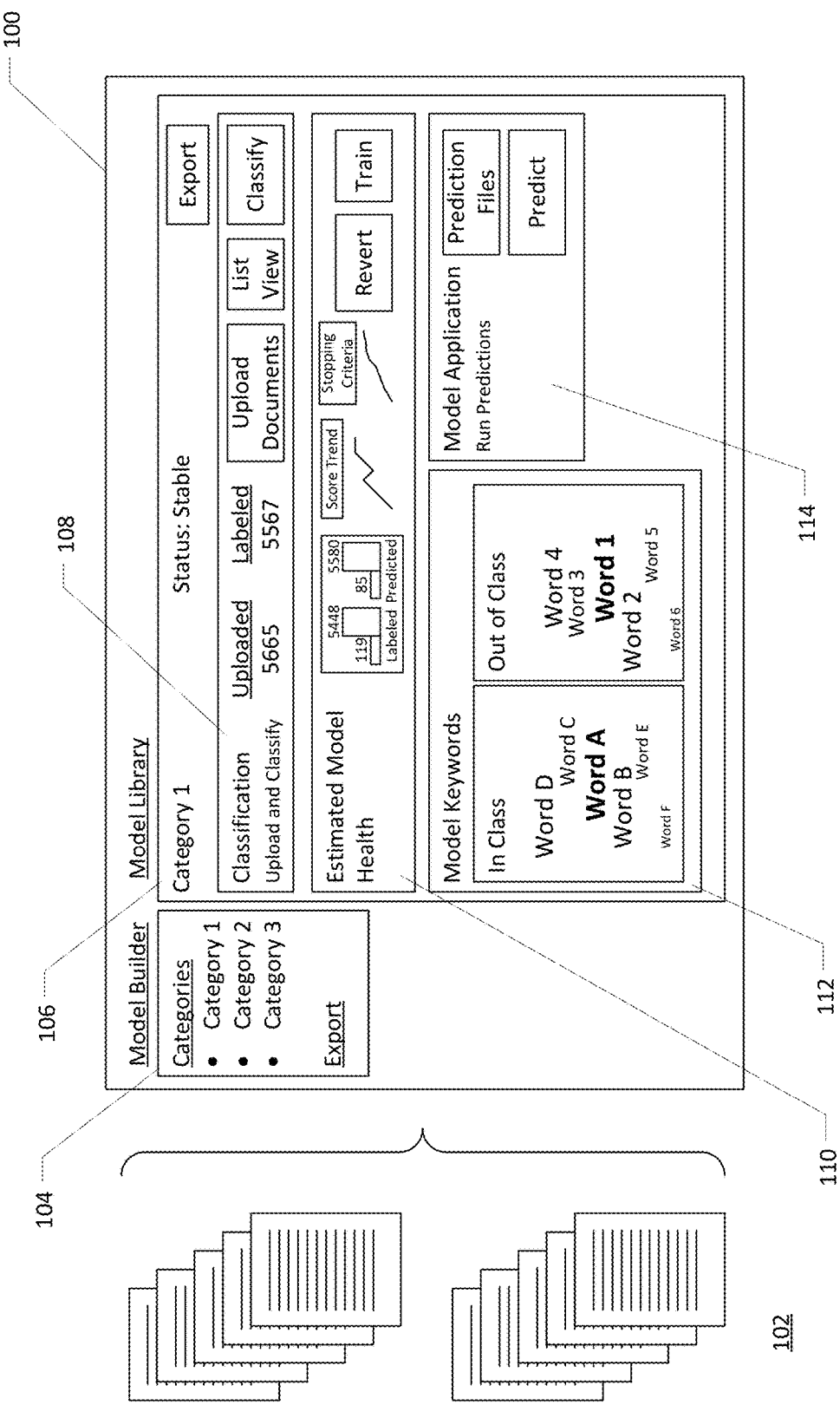
FIG. 1 illustrates a conceptual diagram of a user interface that may receive documents and utilize a document analysis architecture to analyze the documents.

Systems and methods for generation and use of a document analysis architecture are disclosed. Take, for example, an entity that would find it beneficial to utilize a platform to determine which documents in a set of documents are in class for a given purpose and which of the documents in the set of documents are out of class for that given purpose. For example, an entity may desire to know which patents and/or patent applications are most relevant for patentability determinations, for infringement determinations, for asset acquisition purposes, for research and development purposes, for insurance purposes, etc. Generally, a user may search a database of such documents utilizing keyword searching. To gather a reasonable number of results that does not unduly limit the documents in those results, users may employ broad keyword searching and then review each document to determine whether each document should be considered in class or out of class for the purposes at hand. However, taking patents and patent applications as an example, the potential corpus of documents, even if looking just to patents and patent applications filed in the United States, easily numbers in the thousands if not tens of thousands or more. In light of this, a document analysis platform that is configured to intake documents, receive marginal user input to train classification models, and then to use those classification models to determine which documents in a set of documents are in class would be beneficial. Additionally, a model taxonomy that includes previously-trained classification models in a searchable and utilizable fashion may be desirable to make document classification determinations across users in a time sensitive, accurate manner.

Described herein is a document analysis platform that is configured to produce classification determinations associated with document sets, such as patents and patent applications. The platform may include a model building component and a model library component. Generally, the model building component may be utilized to build or otherwise train classification models for determining whether a given document is in class or out of class. The model library may represent a taxonomy of classification models that are related to each other in a taxonomy tree or otherwise through a subject matter hierarchy. The document analysis platform may be accessible to users via one or more user interfaces that may be configured to display information associated with the classification models and model taxonomies and to receive user input.

For example, the document analysis platform may be configured to receive data representing documents. The documents may be provided to the document analysis platform by users uploading those documents and/or by the document analysis platform fetching or otherwise retrieving those documents. While example documents as described herein may be patents and patent applications, it should be understood that the documents may be any type of documents that a classification analysis may be performed on. Additionally, while examples provided herein discuss the analysis of text data from the documents, other forms of content data may also be analyzed, such as image data, metadata, audio data, etc. Furthermore, when documents are described herein as being received and/or sent to the document analysis platform, it should be understood that such sending and/or receiving includes the sending and/or receiving of data representing those documents. The data representing the documents may be received at the document analysis platform and may be stored in a database associated with the document analysis platform.

The document analysis platform may be configured to display a user interface for presenting information associated with the documents and/or analysis of the documents. For example, the user interface may include selectable portions that, when selected, may present information associated with the model building component and/or information associated with the model taxonomy component. When the model building component is selected, the user interface may be caused to display categories associated with the documents and/or a classification analysis that is being or has been conducted. Example categories for a given analysis may include, for example, project categories such as, "asphalt roofing production," "natural materials," "roofing service," "tire recycle," etc. In general, the categories may correspond to projects initiated by a user of the platform and the title of the category may represent the subject matter and/or purpose of the project. Some or all of these categories, as displayed on the user interface, may be selectable to allow a user to navigate between project categories to see information associated with those project categories. Additionally, a category window may be displayed on the user interface that may present a title of the category, a status of the classification model being utilized for determining classification of documents associated with the category, and an option to export the analysis and/or documents associated with the analysis from the user interface, a classification window, an estimated model health window, a keyword window, and/or a model application window. With respect to the category title, one or more tags that have been determined from user input and/or from the classification model may be displayed. The tags may provide additional information about the project category and/or restrictions on the classification determinations associated with the project category. With respect to the status of the classification model, this portion of the category window may provide a user with a visualization of which stage in the model building process this project category is associated with. For example, at the outset of a project category, a classification model may not be selected or trained. In these examples, the status may indicate that no model has been selected. Once a model is selected, the user may start providing indications of which documents are in class and which documents are out of class. These indications may be utilized to train the selected model. However, depending on the amount and quality of the user indications, the output of the trained model may not be associated with a high confidence value. In these examples, the status may indicate that the model has been trained but is not yet stable. Once the confidence values increase as the model is retrained, the status may indicate that the model is stable.

The classification window may be configured to display information associated with the number of uploaded or otherwise accessed documents associated with the project category as well as the number of those documents that have been labeled as in class or out of class by a user. The classification window may also be configured with a selectable portion for allowing users to upload documents. The classification window may also include an option to view a list of the documents that have been upload as well as an option to start classifying the documents that have been uploaded. Additional details on the list view and the user interface for classifying documents will be described in detail elsewhere herein.

The estimated model health window may be configured to display an indication of the number of the documents that have been labeled as in class and the number of the documents that have been labeled as out of class. As described more fully herein, the user may utilize the document analysis platform to display a given document and/or portions of a given document. The user interface displaying the document may also include classifying options, which may be selectable to indicate whether the document being displayed should be labeled as "in class," corresponding to a relevant document, or "out of class," corresponding to an irrelevant document. Other options may include, for example, an "undo" option that may be utilized to undo labelling of a document, and a "skip" option which may be utilized when the user does not desire to provide an in or out indication for a given document. As documents are labeled, the number of labeled documents increases and that information is displayed in the estimated model health window. The estimated model health window may also be configured to display an indication of the number of the documents that were predicted to be in class by the classification model and the number of the documents that were predicted to be out of class by the classification model. As described more fully herein, the classification model may be trained utilizing the labeled documents. For example, a positive training dataset associated with the documents labeled "in" may be generated and, in examples, a negative training dataset associated with the documents labeled "out" may be generated. These datasets may be utilized to train the classification model how to identify, for the documents that have not been labeled, whether a given document is in class or out of class. This information may be displayed in the estimated model health window.

The estimated model health window may also be configured to display a score trend indicator, which may indicate a confidence value associated with utilizing an instance of the classification model to predict classification of the unlabeled documents. For example, a first set of user input indicating classification of a first set of the documents may be received and utilized to train the classification model. The classification model may be run and a confidence value associated with predictions made by the classification model may be determined. Thereafter, a second set of user input indicating classification of additional ones of the documents may be received and the classification model may be retrained utilizing the second set of user input. This retrained instance of the classification model may be run and another confidence value associated with predictions made by the retrained classification model may be determined. The score trend indication may display the confidence values as they change from run to run and may provide an indication of whether the confidence values are increasing, remaining constant, or decreasing. Such an indication may provide a user with a gauge of the impact of a given set of user inputs for training the model and whether those inputs are improving or hindering the model's ability to predict classification for the documents at issue.

The estimated model health window may also be configured to display a stopping criteria indicator, which may indicate a marginal benefit of receiving additional user input for model training. For example, when a model is initially trained and run, a first number of the documents will be predicted as in and a second number of the documents will be predicted as out. When the model is retrained using additional labeling information and run, the number of documents predicted as in and the number of documents predicted as out may change. This process may continue as additional labeling information is obtained and the model is retrained. However, it may be beneficial to display for a user the stopping criteria indicator, which may indicate how the number of in and out predictions differs from run to run of the model. For example, the stopping indicator may show that a last retraining and running of the model did not change the number of documents labeled in and out, and/or that the change was slight. In these examples, the user may utilize the stopping criteria indicator to determine that additional labeling to improve the model's ability to predict classification is not warranted.

The estimated model health window may also be configured to display an option to revert the model to a previous version and an option to train the model based on new labeling information. For example, when the score trend indicates a drop in confidence from retraining a model based on a given set of user input, the option to revert may be selected and the previous version of the model may be identified as the current model. The option to revert may also, in examples, remove the labeling of documents associated with that model. The training option may be utilized to instruct the document analysis platform to retrain the model based at least in part on user input received since the model was last trained. Upon retraining the model, the user interface may be configured to enable the model application window to provide functionality for the user to select an option to run the model as trained or otherwise predict classification of the documents in the document set. When the predict option is selected, the documents that have not been labeled may be analyzed to determine whether to mark those documents as in class or out of class. When this occurs, the estimated model health window may be updated, such as by changing the number of documents predicted to be in and out, the score trend indicator, and/or the stopping criteria indicator.

In addition to the above, the model keywords window may provide a visual indication of the keywords that the model has determined to be included as in class and those keywords that the model has determined to be excluded as out of class. The presentation of these keywords may take one or more forms, such as a word cloud and/or a table. In a word cloud, the size, font, emphasis, and spacing of the keywords from each other may indicate the relative importance of a given keyword to the included and excluded groupings. For example, a keyword located in the center of the word cloud with larger, darker, more emphasized font than other keywords may be the most relevant keyword to the grouping. In the table view, keywords may be ranked and the more relevant keyword may be identified as the first keyword in the table.

The document analysis platform, as described herein, may be hosted or otherwise utilized by a system that may be connected to one or more other systems and/or devices. For example, the system may be configured to receive, over a network, the documents from a third-party system that includes a document database that stores data representing the documents. The platform may also be configured to receive, over the network, data representing the documents from one or more client devices, which may be computing devices configured to access the Internet, display information, and receive user input. The client devices may include the one or more user interfaces described herein and/or may include an application configured to instruct processors of the client devices to display user interfaces as provided by the system associated with the document analysis platform, such as via an application residing on memory of the client devices and/or via an Internet browser. The client devices may receive user input, such as user input from the user interfaces, and may provide user input data corresponding to that user input to the system associated with the document analysis platform. The system may utilize that user input data for the various operations described herein. The model building component and the model library component, as described herein, may be stored in memory of the system and may be utilized to train classification model, predict document classification, and search for models, for example.

With respect to the model builder component, the document analysis platform may include a user interface configured to display a summary of information associated with individual ones of the documents of a given document set. For example, the user interface may include portions of the documents and information associated with the documents, such as whether the document has been labeled, a prediction made in association with the document, a confidence value associated with the prediction, and/or an evaluation of the document and/or a portion of the document. In the example where the documents are patents and patent applications, the user interface may display portions of the documents such as the publication number, the title, the abstract, one or more claims, and/or a claim score. The claim score may be based at least in part on an analysis of the claims of a given patent and the claim score may be provided by way of a scale, such as a scale from 0 to 5 where 0 represents the broadest claim score and 5 represents the narrowest claim score. The user interface may also provide some information about the project category associated with the documents, such as the category title, a category progress indicating how many documents have been labeled and/or predicted to be in class and out of class, how many documents have been skipped, and/or a total number of uploaded documents. The user interface may also provide options for viewing the document summaries, such as an option to filter the summaries based at least in part on one or more of the attributes of the documents and/or the analysis of the documents. The options may also include the ability to sort the summaries based at least in part on one or more of the attributes of the documents and/or the analysis of the documents. The options may also include the ability to remove or add columns of information to the summaries and/or the option to take an action in association with a document, such as tagging a document, removing a document, editing a document, etc. In addition, the user interface may include selectable portions associated with some or each of the document summaries that, when selected, may cause another user interface to display the full document associated with the selected portion.

The summary user interface may also provide one or more indications of relationships between documents in the document set. For example, when the documents are patents and patent applications, the summary user interface may display indications of relationships between various patents and patent applications. For example, patents and patent applications may be related as "families," meaning that the patents and patent applications have some relationship, generally associated with priority dates. For example, a given application may be a continuation, divisional, and/or continuation-in-part application of another application. In other examples, a given application may be a foreign counterpart or a Patent Cooperation Treaty (PCT) application of another application. The summary user interface may provide an indication of such relationships, such as by grouping the documents in a family together and/or providing a visual indicator of the relationship, such as a box surrounding the summaries of the documents in a given family. In these examples, each of the documents in a given family may be predicted to be in class or out of class based at least in part on one of those documents being predicted to be in class or out of class, respectively. Additionally, when one document in a family is labeled by a user as in class or out of class, the document analysis platform may automatically label the other documents in the family accordingly.

The full document user interface may include some of the same information as described in the summary user interface. That information may include the document title, publication number, abstract, claims, and category notes such as the number of documents marked in class and out of class, the number of documents skipped, the number of documents that have been labeled, and analysis details of the document. The analysis details may include the prediction made with respect to the document, such as whether a classification model determined that the document was in class or out of class, a confidence value associated with that determination, and a claim score associated with the claims of the document. In addition to the above, the full document user interface may provide a voting window that may allow a user to provide user input indicating whether the document should be labeled as in class or otherwise "in class" or irrelevant or otherwise "out of class." Additional options may include "skip" and "undo" for example. The voting window may also be utilized to present one or more of the keywords, to enable "hotkeys" or otherwise shortcut keys to allow for the user input via a keyboard or similar device as opposed to a mouse scrolling and clicking one of the options, and an option to utilize uncertainty sampling.

Once documents are labeled, such as via user input as described above, one or more processes may be performed to predict the classification of other documents in a document set. For example, the system may receive user input data indicating in class documents and out of class documents from a subset of first documents. For example, if the first documents include 1,000 documents, the user input data may indicating classification for a subset, such as 20, of those documents. The system may then utilize that user input data to train a classification model, such that the classification model is configured to determine whether a given document is more similar to those documents marked in class or more similar to those documents marked out of class. Utilizing the classification model, as trained, the system may predict the classification of the remainder of the first documents that were not labeled by the user input. Each or some of the predictions for the remainder of the documents may be associated with a confidence value indicating how confident the system is that the classification model accurately determined the classification of a given document. A threshold confidence value may be determined and the system may determine whether an overall confidence value associated with the classification model satisfies that threshold confidence value. In instances where the confidence value does not satisfy the threshold confidence value, the system may cause an indication of this determination to be displayed and may request additional user input data for retraining the classification model. In instances where the confidence value satisfies the threshold confidence value, the system may receive second documents for classification prediction. The second documents may be received based at least in part on a user uploading additional documents and/or from the system retrieving additional documents from one or more databases. The classification model may then be utilized to predict classification of this second document set.

As described herein, the document analysis platform may be configured to receive user input data associated with classification of given documents. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

Additionally, or alternatively, documents representations may include a method that takes a document and turns it into a vector form as a list of floating point numbers based at least in part on the document's text contents. This vector form may be called an embedding. This embedding may be used to calculate distance, and therefore similarity, between documents. These embeddings could be used in association with the classification models in addition to or in replacement of the keyword and/or vectors described above. The embeddings may be utilized to create thematic groups of documents with a set. The set of documents can be some keyword, CPC, owner(s), etc., and the result may be a visual display of document groups (e.g., clusters) that share similar themes. There may be a degree of supervision in the clustering process that may allow for some human control over which documents are grouped in which clusters.

In further examples, the classification models may utilize transfer learning. In these examples, a general-purpose model may be generated and/or received, and each specific classification model may use the general purpose model as a starting point. Rather than having to train a classification model from scratch, the model would be fine-tuned from the general purpose model for whatever that model has not already been trained for with respect to the specific scenario being modeled. These transfer learning techniques may include the user of ULMFit, BERT, ELMo, and T5, among others.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

In addition to the training of classification models as described above, once the classification models are trained such that the models are determined to accurately predict classification as trained, the models may be placed in a model taxonomy. The model taxonomy may represent a taxonomy tree or otherwise a model hierarchy indicating relationships between models and/or a level of specificity associated with the models. For example, a model associated with determining whether documents are in class with respect to "computers," may be associated with other models trained to determine whether documents are in class with respect to "processors," "memory," and "keyboards," respectively. Each of these models may also be associated with other models trained to determine more specific aspects of these components, such as "microprocessors" and "processor components," or "RAM" and "partitioned memory." This taxonomy may be searchable and may provide functionality that allows a user to provide a search query for a model. The keywords from the search query may be utilized to identify models that may be applicable to the search query and/or to highlight "branches" of the taxonomy associated with the search query.

A user interface may be utilized to display indications of the models identified during a model search, and the user interface may be configured to receive user input indicating selection of a given model for use in determining classification of documents. The user and/or the platform may then upload the document set to be analyzed and the selected model may be utilized to predict classification of individual ones of the documents. A user interface indicating the results of the classification determination as performed utilizing the selected model may be displayed as well as a confidence value associated with the accuracy of the model in determining classification. This may provide the user with an indication of whether the previously-trained model is sufficient for analyzing the documents at issue, or whether another model should be selected, or a new model should be trained.

The model taxonomy may also provide an indication of where models have not been trained for a given subject matter. For example, a "slot" on the model taxonomy may be left blank or may indicate that a model has not yet been trained. The slots may be determined from the predefined classification system, such as by CPC codes. This may provide a user an indication of whether selecting an already-trained model would be preferable to training a new model. The model taxonomy may also provide an indication of how closely related models are on the hierarchy. This indication may be presented by way of lines between "nodes" in the taxonomy, where the length of a line may indicate how closely the models are related to each other. In addition, when a user query for use of a model is received, the model and/or models that most closely match up with the search query may be identified. The platform may determine whether at least one of the resulting models has keywords that are sufficiently similar to the keywords in the search query. In examples where there is sufficient similarity, indicators of those models may be presented as results to the user. In examples where there is insufficient similarity, the user interface may return results indicating that no models in the model taxonomy are sufficient in light of the search query, and may request that the user perform the operations associated with training a new model.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a conceptual diagram of a user interface 100 that may receive documents and utilize a document analysis platform to analyze the documents. The user interface 100 may be displayed on a display of an electronic device, such as the electronic device 202 as described with respect to FIG. 2 below.

For example, the document analysis platform may be configured to receive data representing documents 102. The documents 102 may be provided to the document analysis platform by users uploading those documents 102 and/or by the document analysis platform fetching or otherwise retrieving those documents 102. While example documents 102 as described herein may be patents and patent applications, it should be understood that the documents 102 may be any type of documents 102 that a classification analysis may be performed on. Additionally, while examples provided herein discuss the analysis of text data from the documents 102, other forms of content data may also be analyzed, such as image data, metadata, audio data, etc. The data representing the documents 102 may be received at the document analysis platform and may be stored in a database associated with the document analysis platform.

The document analysis platform may be configured to display the user interface 100 for presenting information associated with the documents 102 and/or analysis of the documents 102. For example, the user interface 100 may include selectable portions that, when selected, may present information associated with a model building component of the document analysis platform and/or information associated with a model taxonomy component of the document analysis platform. When the model building component is selected, the user interface 100 may be caused to display categories 104 associated with the documents 102 and/or a classification analysis that is being or has been conducted. Example categories 104 for a given analysis may include, for example, project categories such as, "asphalt roofing production," "natural materials," "roofing service," "tire recycle," etc. A shown in FIG. 1, the example categories 104 are "Category 1," "Category 2," and "Category 3." Some or all of these categories 104, as displayed on the user interface 100, may be selectable to allow a user to navigate between project categories to see information associated with those project categories. Additionally, a category window 106 may be displayed on the user interface 100 that may present a title of the category 104, a status of the classification model being utilized for determining classification of documents 102 associated with the category 106, and an option to export the analysis and/or documents 102 associated with the analysis from the user interface 100, a classification window 108, an estimated model health window 110, a keyword window 112, and/or a model application window 114. With respect to the category title, one or more tags that have been determined from user input and/or from the classification model may be displayed. The tags may provide additional information about the project category 104 and/or restrictions on the classification determinations associated with the project category 104. With respect to the status of the classification model, this portion of the category window 106 may provide a user with a visualization of which stage in the model building process this project category 104 is associated with. For example, at the outset of a project category 104, a classification model may not be selected or trained. In these examples, the status may indicate that no model has been selected. Once a model is selected, the user may start providing indications of which documents 102 are in class and which documents 102 are out of class. These indications may be utilized to train the selected model. However, depending on the amount and quality of the user indications, the output of the trained model may not be associated with a high confidence value. In these examples, the status may indicate that the model has been trained but is not yet stable. Once the confidence values increase as the model is retrained, the status may indicate that the model is stable.

The classification window 108 may be configured to display information associated with the number of uploaded or otherwise accessed documents 102 associated with the project category 104 as well as the number of those documents 102 that have been labeled as in class or out of class by a user. The classification window 108 may also be configured with a selectable portion for allowing users to upload documents 102. The classification window 108 may also include an option to view a list of the documents 102 that have been upload as well as an option to start classifying the documents 102 that have been uploaded. Additional details on the list view and the user interface for classifying documents 102 will be described in detail elsewhere herein.

The estimated model health window 110 may be configured to display an indication of the number of the documents 102 that have been labeled as in class and the number of the documents 102 that have been labeled as out of class. As described more fully herein, the user may utilize the document analysis platform to display a given document 102 and/or portions of a given document 102. The user interface displaying the document 102 may also include classifying options, which may be selectable to indicate whether the document 102 being displayed should be labeled as "in," corresponding to a relevant document, or "out," corresponding to an out of class document. Other options may include, for example, an "undo" option that may be utilized to undo labelling of a document 102, and a "skip" option which may be utilized when the user does not desire to provide an in or out indication for a given document 102. As documents 102 are labeled, the number of labeled documents increases and that information is displayed in the estimated model health window 110. The estimated model health window 110 may also be configured to display an indication of the number of the documents 102 that were predicted to be in class by the classification model and the number of the documents 102 that were predicted to be out of class by the classification model. As described more fully herein, the classification model may be trained utilizing the labeled documents. For example, a positive training dataset associated with the documents labeled "in" may be generated and, in examples, a negative training dataset associated with the documents labeled "out" may be generated. These datasets may be utilized to train the classification model how to identify, for the documents 102 that have not been labeled, whether a given document 102 is in class or out of class. This information may be displayed in the estimated model health window 110.

The estimated model health window 110 may also be configured to display a score trend indicator, which may indicate a confidence value associated with utilizing an instance of the classification model to predict classification of the unlabeled documents. For example, a first set of user input indicating classification of a first set of the documents 102 may be received and utilized to train the classification model. The classification model may be run and a confidence value associated with predictions made by the classification model may be determined. Thereafter, a second set of user input indicating classification of additional ones of the documents 102 may be received and the classification model may be retrained utilizing the second set of user input. This retrained instance of the classification model may be run and another confidence value associated with predictions made by the retrained classification model may be determined. The score trend indication may display the confidence values as they change from run to run and may provide an indication about whether the confidence values are increasing, remaining constant, or decreasing. Such an indication may provide a user with a gauge of the impact of a given set of user inputs for training the model and whether those inputs are improving or hindering the model's ability to predict classification for the documents 102 at issue.

The estimated model health window 110 may also be configured to display a stopping criteria indicator, which may indicate a marginal benefit of receiving additional user input for model training. For example, when a model is initially trained and run, a first number of the documents 102 will be predicted as "in" and a second number of the documents 102 will be predicted as "out." When the model is retrained using additional labeling information and run, the number of documents 102 predicted as "in" and the number of documents 102 predicted as "out" may change. This process may continue as additional labeling information is obtained and the model is retrained. However, it may be beneficial to display for a user the stopping criteria indicator, which may indicate how the number of "in" and "out" predictions differs from run to run of the model. For example, the stopping criteria indicator may show that a last retraining and running of the model did not change the number of documents 102 labeled "in" and "out," and/or that the change was slight. In these examples, the user may utilize the stopping criteria indicator to determine that additional labeling to improve the model's ability to predict classification is not warranted.

The estimated model health window 110 may also be configured to display an option to revert the model to a previous version and an option to train the model based on new labeling information. For example, when the score trend indicates a decrease in confidence from retraining a model based on a given set of user input, the option to revert may be selected and the previous version of the model may be identified as the current model. The option to revert may also, in examples, remove the labeling of documents 102 associated with that model. The training option may be utilized to instruct the document analysis platform to retrain the model based at least in part on user input received since the model was last trained. Upon retraining the model, the user interface 100 may be configured to enable the model application window 114 to provide functionality for the user to select an option to run the model as trained or otherwise predict classification of the documents 102 in the document set. When the predict option is selected, the documents 102 that have not been labeled may be analyzed to determine whether to mark those documents 102 as in class or out of class. When this occurs, the estimated model health window 110 may be updated, such as by changing the number of documents 102 predicted to be "in" and "out," the score trend indicator, and/or the stopping criteria indicator.

In addition to the above, the model keywords window 112 may provide a visual indication of the keywords that the model has determined to be included as in class and those keywords that the model has determined to be excluded as out of class. The presentation of these keywords may take one or more forms, such as a word cloud and/or a table. In a word cloud, the size, font, emphasis, and spacing of the keywords from each other may indicate the relative importance of a given keyword to the included and excluded groupings. For example, a keyword located in the center of the word cloud with larger, darker, more emphasized font than other keywords may be the most relevant keyword to the grouping. In the table view, keywords may be ranked and the more relevant keyword may be identified as the first keyword in the table.

Figure 2:
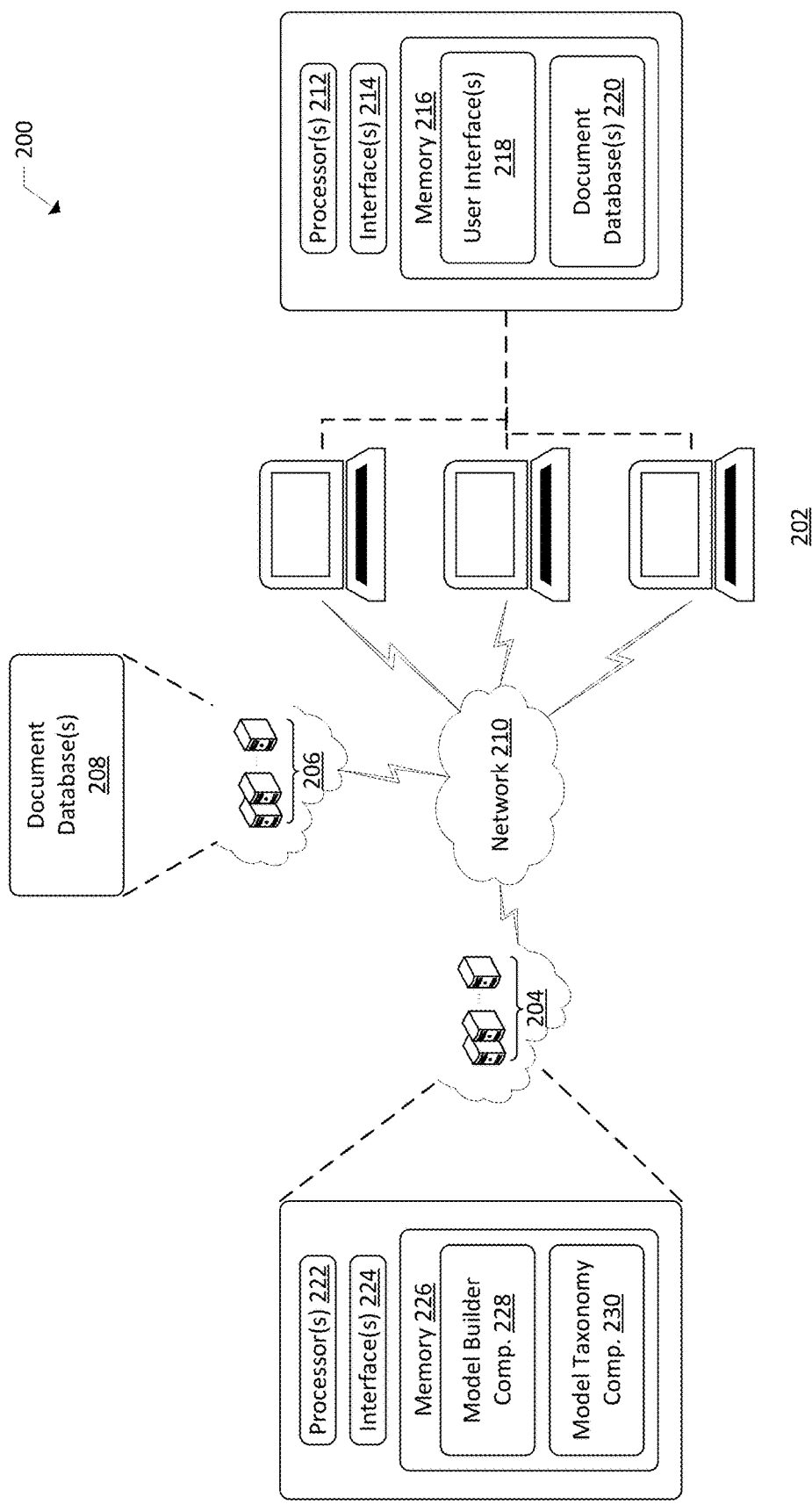
FIG. 2 illustrates a schematic diagram of an example environment for a document analysis architecture.

FIG. 2 illustrates a schematic diagram of an example environment 200 for a document analysis architecture. The architecture 200 may include, for example, one or more client-side devices 202, also described herein as electronic devices 202, a document analysis system 204 associated with a document analysis platform, and/or a document database system 206 associated with one or more document databases 208. Some or all of the devices and systems may be configured to communicate with each other via a network 210.

The electronic devices 202 may include components such as, for example, one or more processors 212, one or more network interfaces 214, and/or memory 216. The memory 216 may include components such as, for example, one or more user interfaces 218 and/or one or more document databases 220. As shown in FIG. 2, the electronic devices 202 may include, for example, a computing device, a mobile phone, a tablet, a laptop, and/or one or more servers. The components of the electronic device 202 will be described below by way of example. It should be understood that the example provided herein is illustrative, and should not be considered the exclusive example of the components of the electronic device 202.

By way of example, the user interface(s) 218 include one or more of the user interfaces described elsewhere herein, such as the user interface 100 corresponding to a model builder user interface, a document summary user interface, a full document user interface, user interfaces utilized for document voting, confidence value user interfaces, keyword user interfaces, search query user interfaces, model taxonomy user interfaces, etc. It should be understood that while the user interfaces 218 are depicted as being a component of the memory 216 of the client-side devices 202, the user interfaces 218 may additionally or alternatively be associated with the document analysis system 204. The user interfaces 218 may be configured to display information associated with the document analysis platform and to receive user input associated with the document analysis platform. The document databases 220 of the client-side device 202, and/or the document databases 208 of the document database system 206 may include data corresponding to documents that a user may desire to be analyzed using the document analysis platform. Those documents may include, for example, patents and patent applications, and/or the documents may include non-patent documents. The documents may be stored with respect to the document databases 208 of the document database system 206 and/or the documents may be stored with respect to the document databases 220 of the client-side devices 202.

The document analysis system 204 may include one or more components such as, for example, one or more processors 222, one or more network interfaces 224, and/or memory 226. The memory 226 may include one or more components such as, for example, a model builder component 228 and/or a model taxonomy component 230. The model builder component 228 may be configured to receive user input data as described herein for labelling documents as in class or out of class. The model builder component 228 may also be configured to utilize the user input data, as well as other data associated with a document set in question, to train classification models for determining the classification of a given document. The model builder component 228 may also be configured to utilize the trained classification models to predict document classification and to display results of the use of the classification models. The model taxonomy component 230 may be configured to generate and utilize a model taxonomy including the trained classification models. The model taxonomy component 230 may also be configured to receive user input data representing user queries for use of classification models and to display search results to the search query indicating one or more models associated with the search query.

As shown in FIG. 2, several of the components of the document analysis system 204 and/or the client-side devices 202 and the associated functionality of those components as described herein may be performed by one or more of the other systems and/or by the client-side devices 202. Additionally, or alternatively, some or all of the components and/or functionalities associated with the client-side devices 202 may be performed by the document analysis system 204.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 112 and/or 222, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112 and/or 222 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112 and/or 222 may possess its own local memory, which also may store program components, program data, and/or one or more operating systems.

The memory 116 and/or 226 may include volatile and nonvolatile memory, removable and non-removable media implemented in any method or technology for storage of information, such as computer-readable instructions, data structures, program component, or other data. Such memory 116 and/or 226 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116 and/or 226 may be implemented as computer-readable storage media ("CRSM"), which may be any available physical media accessible by the processor(s) 112 and/or 222 to execute instructions stored on the memory 116 and/or 226. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116 and/or 226, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 114 and/or 224 may enable messages between the components and/or devices shown in system 100 and/or with one or more other remote systems, as well as other networked devices. Such network interface(s) 114 and/or 224 may include one or more network interface controllers (NICs) or other types of transceiver devices to send and receive messages over the network 210.

For instance, each of the network interface(s) 114 and/or 224 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114 and/or 224 may include a wide area network (WAN) component to enable message over a wide area network.

In some instances, the document analysis system 204 may be local to an environment associated the electronic device 202. For instance, the document analysis system 204 may be located within the electronic device 202. In some instances, some or all of the functionality of the document analysis system 204 may be performed by the electronic device 202. Also, while various components of the document analysis system 204 have been labeled and named in this disclosure and each component has been described as being configured to cause the processor(s) to perform certain operations, it should be understood that the described operations may be performed by some or all of the components and/or other components not specifically illustrated.

Figure 3A:
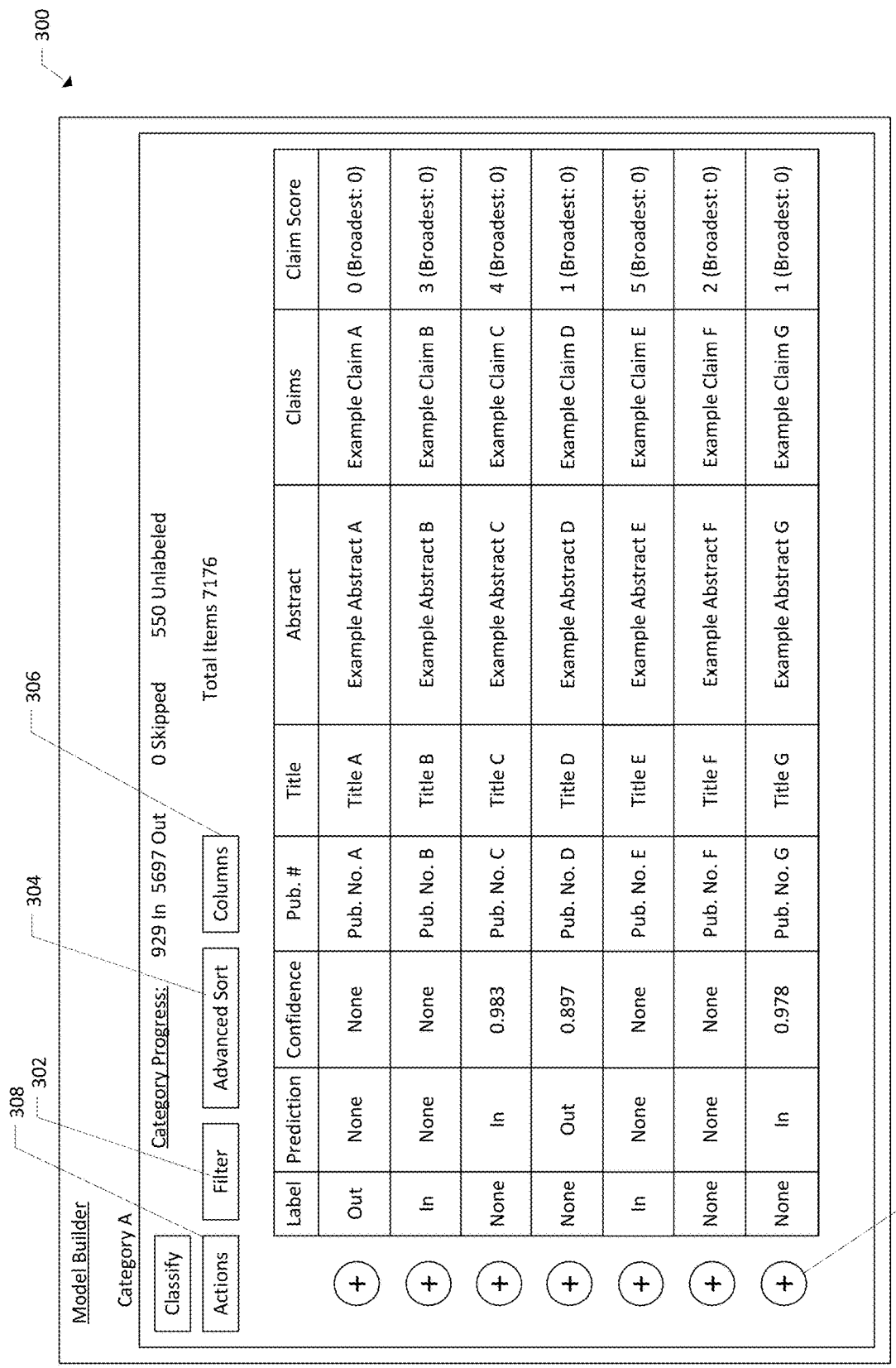
FIG. 3A illustrates an example user interface displaying document data and user input data for classification model building.

FIG. 3A illustrates an example user interface 300 displaying document data and user input data for classification model building. The user interface 300 depicted in FIG. 3A may also be described as a summary user interface 300 herein.

For example, the summary user interface 300 may include portions of the documents and information associated with the documents, such as whether the documents have been labeled, a prediction made in association with the document, a confidence value associated with the prediction, and/or an evaluation of the document and/or a portion of the document. In the example where the documents are patents and patent applications, the user interface 300 may display portions of the documents such as the publication number, the title, the abstract, one or more claims, and/or a claim score. The claim score may be based at least in part on an analysis of the claims of a given patent and the claim score may be provided by way of a scale, such as a scale from 0 to 5, where 0 represents the broadest claim score and 5 represents the narrowest claim score. The user interface 300 may also provide some information about the project category associated with the documents, such as the category title, a category progress indicating how many documents have been labeled and/or predicted to be in class and out of class, how many documents have been skipped, and/or a total number of uploaded documents. For example, as depicted in FIG. 3A, the category is "Category A" and the category progress is "929 In," "5697 Out," "0 Skipped," and "550 Unlabeled." The user interface 300 may also provide options for viewing the document summaries, such as a filter option 302 to filter the summaries based at least in part on one or more of the attributes of the documents and/or the analysis of the documents. The options may also include a sort options 304, which may be utilized to sort the summaries based at least in part on one or more of the attributes of the documents and/or the analysis of the documents. The options may also a columns option 306, which may be utilized to remove or add columns of information to the summaries. The options may also include an action option 308, which may be utilized to take an action in association with a document, such as tagging a document, removing a document, editing a document, etc. In addition, the user interface 300 may include selectable portions 310 associated with some or each of the document summaries that, when selected, may cause another user interface to display the full document associated with the selected portion.

FIG. 3B illustrates an example user interface 350 with functionality for displaying document data and for accepting user input. The user interface 350 depicted in FIG. 3B may also be described as a full document user interface 350 herein.

The full document user interface 350 may include some of the same information as described in the summary user interface 300. That information may include the document title, publication number, abstract, claims, and category notes such as the number of documents marked in class and out of class, the number of documents skipped, the number of documents that have been labeled, and analysis details of the document. The full document user interface 350 may provide additional information regarding some or all of the aspects of a given document. For example, additional portions of the abstract and/or additional claims and/or claim language may be displayed in the full document user interface 350. Additionally, the category progress information and analysis details may be displayed in a category notes window 352. The analysis details may include the prediction made with respect to the document, such as whether a classification model determined that the document was in class or out of class, a confidence value associated with that determination, and a claim score associated with the claims of the document. For example, as shown in FIG. 3B, the prediction made with respect to this document is "in," and the confidence value associated with that determination is 0.988. As will be described in more detail elsewhere herein, the confidence value may be on a scale of 0.0 to 1.0, with 1.0 indicating complete confidence that a document is marked correctly. As such, a confidence value of 0.988 represents a near certain determination that the document is marked correctly. The claim score in FIG. 3B is "0," indicating the most favorable claim score on the 0 to 5 scale. The claim score may be determined in a number of ways, such as based at least in part on the number of words in a given claim, the terminology used in a claim, the support for the claim language in the detailed description of the patent, the presence of negative limitations and/or modifiers, the number of recited operations, etc.

In addition to the above, the full document user interface 300 may provide a voting window 354 that may allow a user to provide user input indicating whether the document should be labeled as relevant or otherwise "in class" or irrelevant or otherwise "out of class." Additional options may include "skip" and "undo" for example. The voting window 354 may also be utilized to present one or more of the keywords to enable "hotkeys" or otherwise shortcut keys to allow for the user input via a keyboard or similar device as opposed to a mouse scrolling and clicking one of the options, and an option to utilize uncertainty sampling. For example, a user may view the information about the document in the full document user interface 350. After review of some or all of the information being displayed, the user may determine that the document is either in class or out of class (or determine that the document is to be skipped). In examples where the document is to be labeled as in class, the user may utilize one or more input means to select a portion of the screen corresponding to the "in" option. In examples where the document is to be labeled as out of class, the user may utilize one or more input means to select a portion of the screen corresponding to the "out" option. Alternatively, when hotkeys are enabled, the user may select the corresponding hotkey on a keyboard (whether physical or digital). Upon selection of one of the options in the voting window 354, the user interface 350 may be caused to display the next unlabeled document in the document set to allow the user to review that document and provide user input associated with the classification of that document.

Figure 4:
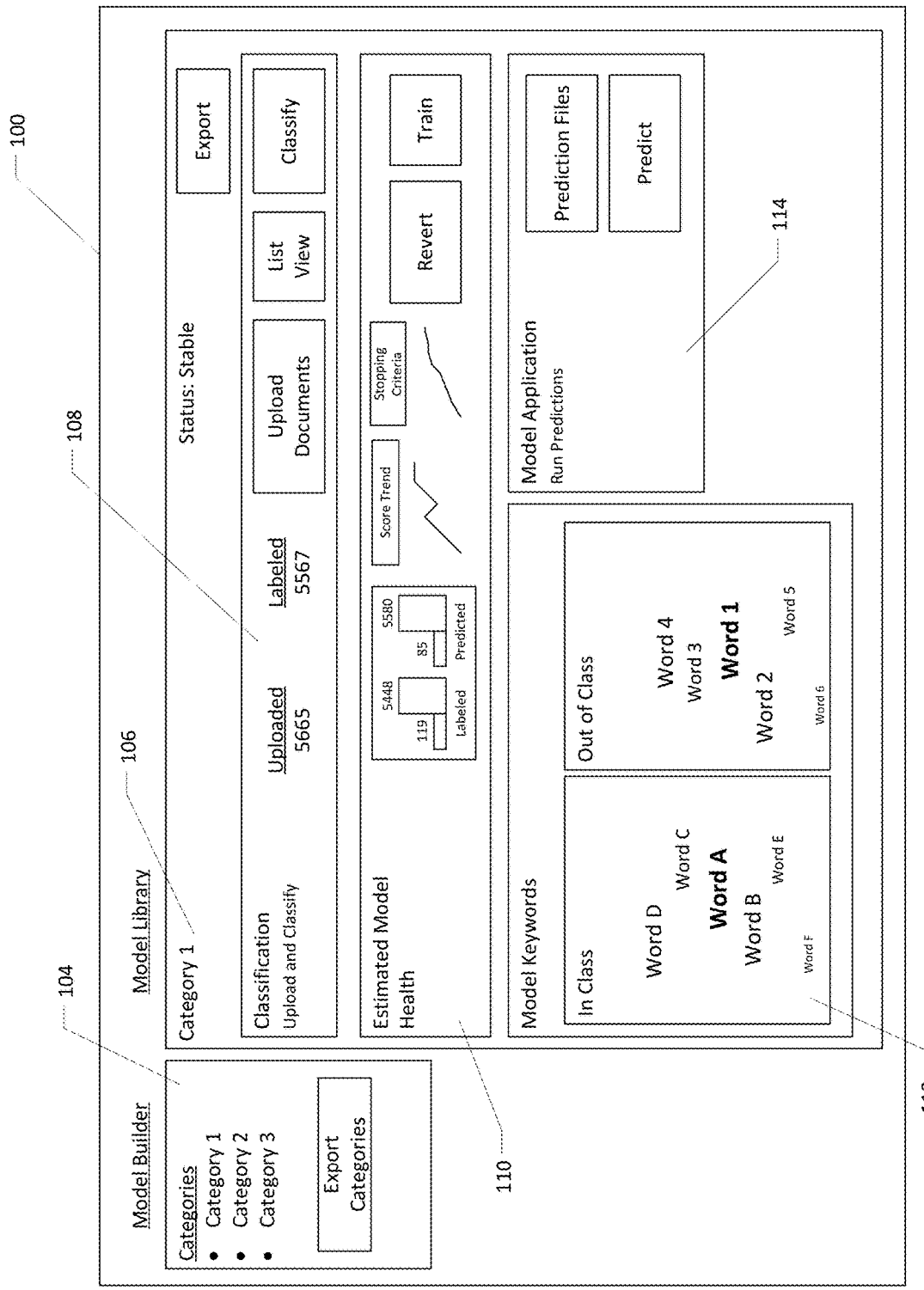
FIG. 4 illustrates an example user interface displaying information associated with use of a classification model for determining which portions of a document set are in class.

FIG. 4 illustrates an example user interface 100 displaying information associated with use of a classification model for determining which portions of a document set are in class.

For example, the document analysis platform may be configured to receive data representing documents. The documents may be provided to the document analysis platform by users uploading those documents and/or by the document analysis platform fetching or otherwise retrieving those documents. While example documents as described herein may be patents and patent applications, it should be understood that the documents may be any type of documents that a classification analysis may be performed on. Additionally, while examples provided herein discuss the analysis of text data from the documents, other forms of content data may also be analyzed, such as image data, metadata, audio data, etc. The data representing the documents may be received at the document analysis platform and may be stored in a database associated with the document analysis platform.

The document analysis platform may be configured to display the user interface 100 for presenting information associated with the documents and/or analysis of the documents. For example, the user interface 100 may include selectable portions that, when selected, may present information associated with a model building component of the document analysis platform and/or information associated with a model taxonomy component of the document analysis platform. When the model building component is selected, the user interface 100 may be caused to display categories 104 associated with the documents and/or a classification analysis that is being or has been conducted. Example categories 104 for a given analysis may include, for example, project categories such as, "asphalt roofing production," "natural materials," "roofing service," "tire recycle," etc. A shown in FIG. 4, the example categories 104 are "Category 1," "Category 2," and "Category 3." Some or all of these categories 104, as displayed on the user interface 100, may be selectable to allow a user to navigate between project categories to see information associated with those project categories. Additionally, a category window 106 may be displayed on the user interface 100 that may present a title of the category 104, a status of the classification model being utilized for determining classification of documents associated with the category 106, and an option to export the analysis and/or documents associated with the analysis from the user interface 100, a classification window 108, an estimated model health window 110, a keyword window 112, and/or a model application window 114. With respect to the category title, one or more tags that have been determined from user input and/or from the classification model may be displayed. The tags may provide additional information about the project category 104 and/or restrictions on the classification determinations associated with the project category 104. With respect to the status of the classification model, this portion of the category window 106 may provide a user with a visualization of which stage in the model building process this project category 104 is associated with. For example, at the outset of a project category 104, a classification model may not be selected or trained. In these examples, the status may indicate that no model has been selected. Once a model is selected, the user may start providing indications of which documents are in class and which documents are out of class. These indications may be utilized to train the selected model. However, depending on the amount and quality of the user indications, the output of the trained model may not be associated with a high confidence value. In these examples, the status may indicate that the model has been trained but is not yet stable. Once the confidence values increase as the model is retrained, the status may indicate that the model is stable.

The classification window 108 may be configured to display information associated with the number of uploaded or otherwise accessed documents associated with the project category 104 as well as the number of those documents that have been labeled as in class or out of class by a user. The classification window 108 may also be configured with a selectable portion for allowing users to upload documents. The classification window 108 may also include an option to view a list of the documents that have been upload as well as an option to start classifying the documents that have been uploaded. Additional details on the list view and the user interface for classifying documents will be described in detail elsewhere herein.

The estimated model health window 110 may be configured to display an indication of the number of the documents that have been labeled as in class and the number of the documents that have been labeled as out of class. As described more fully herein, the user may utilize the document analysis platform to display a given document and/or portions of a given document. The user interface displaying the document may also include classifying options, which may be selectable to indicate whether the document being displayed should be labeled as "in," corresponding to a relevant document, or "out," corresponding to an out of class document. Other options may include, for example, an "undo" option that may be utilized to undo labelling of a document, and a "skip" option which may be utilized when the user does not desire to provide an in or out indication for a given document. As documents are labeled, the number of labeled documents increases and that information is displayed in the estimated model health window 110. The estimated model health window 110 may also be configured to display an indication of the number of the documents that were predicted to be in class by the classification model and the number of the documents that were predicted to be out of class by the classification model. As described more fully herein, the classification model may be trained utilizing the labeled documents. For example, a positive training dataset associated with the documents labeled "in" may be generated and, in examples, a negative training dataset associated with the documents labeled "out" may be generated. These datasets may be utilized to train the classification model how to identify, for the documents that have not been labeled, whether a given document is in class or out of class. This information may be displayed in the estimated model health window 110.

The estimated model health window 110 may also be configured to display a score trend indicator, which may indicate a confidence value associated with utilizing an instance of the classification model to predict classification of the unlabeled documents. For example, a first set of user input indicating classification of a first set of the documents may be received and utilized to train the classification model. The classification model may be run and a confidence value associated with predictions made by the classification model may be determined. Thereafter, a second set of user input indicating classification of additional ones of the documents may be received and the classification model may be retrained utilizing the second set of user input. This retrained instance of the classification model may be run and another confidence value associated with predictions made by the retrained classification model may be determined. The score trend indication may display the confidence values as they change from run to run and may provide an indication about whether the confidence values are increasing, remaining constant, or decreasing. Such an indication may provide a user with a gauge of the impact of a given set of user inputs for training the model and whether those inputs are improving or hindering the model's ability to predict classification for the documents at issue.

The estimated model health window 110 may also be configured to display a stopping criteria indicator, which may indicate a marginal benefit of receiving additional user input for model training. For example, when a model is initially trained and run, a first number of the documents will be predicted as "in" and a second number of the documents will be predicted as "out." When the model is retrained using additional labeling information and run, the number of documents predicted as "in" and the number of documents predicted as "out" may change. This process may continue as additional labeling information is obtained and the model is retrained. However, it may be beneficial to display for a user the stopping criteria indicator, which may indicate how the number of "in" and "out" predictions differs from run to run of the model. For example, the stopping criteria indicator may show that a last retraining and running of the model did not change the number of documents labeled "in" and "out," and/or that the change was slight. In these examples, the user may utilize the stopping criteria indicator to determine that additional labeling to improve the model's ability to predict classification is not warranted.

The estimated model health window 110 may also be configured to display an option to revert the model to a previous version and an option to train the model based on new labeling information. For example, when the score trend indicates a decrease in confidence from retraining a model based on a given set of user input, the option to revert may be selected and the previous version of the model may be identified as the current model. The option to revert may also, in examples, remove the labeling of documents associated with that model. The training option may be utilized to instruct the document analysis platform to retrain the model based at least in part on user input received since the model was last trained. Upon retraining the model, the user interface 100 may be configured to enable the model application window 114 to provide functionality for the user to select an option to run the model as trained or otherwise predict classification of the documents in the document set. When the predict option is selected, the documents that have not been labeled may be analyzed to determine whether to mark those documents as in class or out of class. When this occurs, the estimated model health window 110 may be updated, such as by changing the number of documents predicted to be "in" and "out," the score trend indicator, and/or the stopping criteria indicator.

In addition to the above, the model keywords window 112 may provide a visual indication of the keywords that the model has determined to be included as in class and those keywords that the model has determined to be excluded as out of class. The presentation of these keywords may take one or more forms, such as a word cloud and/or a table. In a word cloud, the size, font, emphasis, and spacing of the keywords from each other may indicate the relative importance of a given keyword to the included and excluded groupings. For example, a keyword located in the center of the word cloud with larger, darker, more emphasized font than other keywords may be the most relevant keyword to the grouping. In the table view, keywords may be ranked and the more relevant keyword may be identified as the first keyword in the table.

Figure 5:
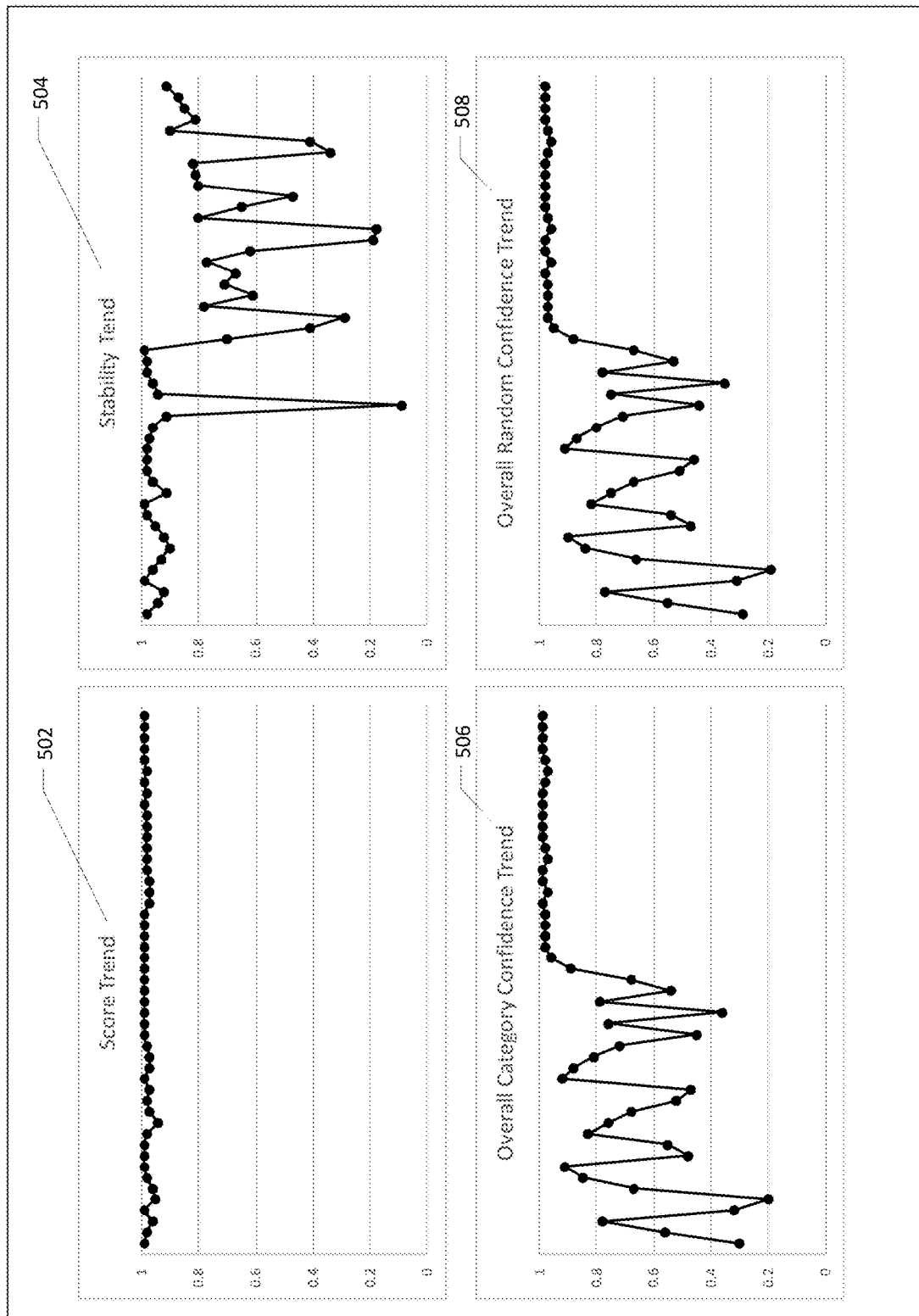
FIG. 5 illustrates an example user interface displaying information associated with confidence values associated with a document analysis architecture.

FIG. 5 illustrates an example user interface 500 displaying information associated with confidence values associated with a document analysis architecture. The user interface 500 may also be described herein as the confidence value user interface 500.

The confidence value user interface 500 may display information associated with one or more confidence values associated with a given classification model. For example, the confidence value user interface 500 may include a score trend 502, a stability trend 504, an overall category confidence trend 506, and an overall random confidence trend 508. The score trend 502 may indicate, for a particular classification model, confidence values for use of the model to determine classification of documents. Each data point may represent a run of the classification model and a determination of a confidence value associated with each run. In some examples, prior to a particular run, additional user input may be received indicating additional documents have been labeled by a user as in class or out of class. This user input may be utilized to retrain the model. In some instances, the additional user input may increase the model's ability to accurately determine classification. This may lead to an increase in the confidence value associated with predictions made by the model. In other instances, the additional user input may decrease the model's ability to accurately determine classification. This may lead to a decrease in the confidence value associated with predictions made by the model. Additionally, or alternatively, additional documents may be added to the document set prior to a given run of the model, and confidence value may differ based at least in part on the determinations of classification made in association with those newly-added documents. By so doing, the score trend 502 may provide an indication of model health over time and a trend as to whether that model health is improving or decreasing. The score trend 502 may also be described as a measure of how accurate the model is based at least in part on a calculation of an F1 score. The F1 score may be a harmonic mean of the model's precision and recall. In these examples, a value of 1 may be considered best, while a 0 may be considered worst.

The stability trend 504 may indicate agreement between each version and/or training of a model. In examples, a stability trend score of 1 may be considered best, while a 0 may be considered worst. A value below 0.999 may mean additional labeled data may be beneficial to make the model successful generally at predicting classification of documents. The calculation for the stability trend 504 may be known as Cohen's kappa statistic. If the metric stabilizes over several trainings but is still short of a recommended value, such as 0.99, an analyst may consider adding additional training data to the model and labeling that data. If the stability trend 504 is fluctuating, this may mean that a user may consider starting training over with a more targeted focus for the model.

The overall category confidence trend 506 may indicate the average confidence within a category data set defined by a user. For this overall category trend 506, confidence for any given document may be considered the difference between the predicted probability of the document being marked in class and the predicted probability of the document being marked out of class. A overall category confidence trend 506 value of 1 may be considered best, while a value of 0 may be considered worst.

The overall random confidence trend 508 may indicate confidence within a category data set, similar to the overall category confidence trend 506, but instead using a random set of documents from a full corpus of the documents to indicate confidence. A overall random confidence trend 508 value of 1 may be considered best, while a value of 0 may be considered worst.

Figure 6:
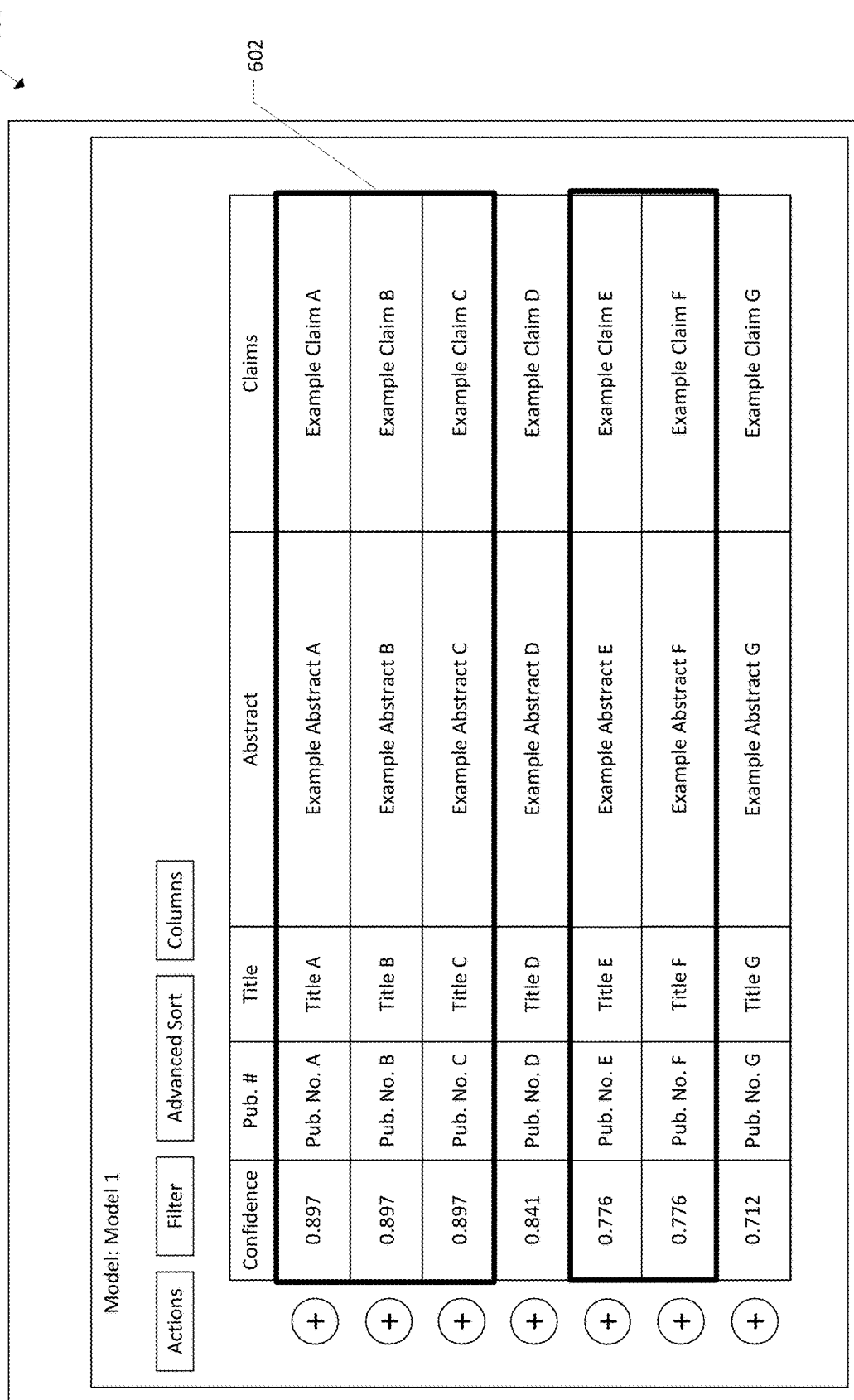
FIG. 6 illustrates an example user interface displaying document data and indications of relationships between documents.

FIG. 6 illustrates an example user interface 600 displaying document data and indications of relationships between documents. The user interface 600 may be the same as or similar to the summary user interface 300 as described with respect to FIG. 3A.

The user interface 600 may provide one or more indications of relationships 602 between documents in the document set. For example, when the documents are patents and patent applications, the user interface 600 may display indications of relationships 602 between various patents and patent applications. For example, patents and patent applications may be related as "families," meaning that the patents and patent applications have some relationship, generally associated with priority dates. For example, a given application may be a continuation, divisional, and/or continuation-in-part application of another application. In other examples, a given application may be a foreign counterpart or a Patent Cooperation Treaty (PCT) application of another application. The user interface 600 may provide an indication of such relationships, such as by grouping the documents in a family together and/or providing a visual indicator of the relationship, such as a box surrounding the summaries of the documents in a given family. In these examples, each of the documents in a given family may be predicted to be in class or out of class based at least in part on one of those documents being predicted to be in class or out of class, respectively. Additionally, when one document in a family is labeled by a user as in class or out of class, the document analysis platform may automatically label the other documents in the family accordingly.

Figure 7:
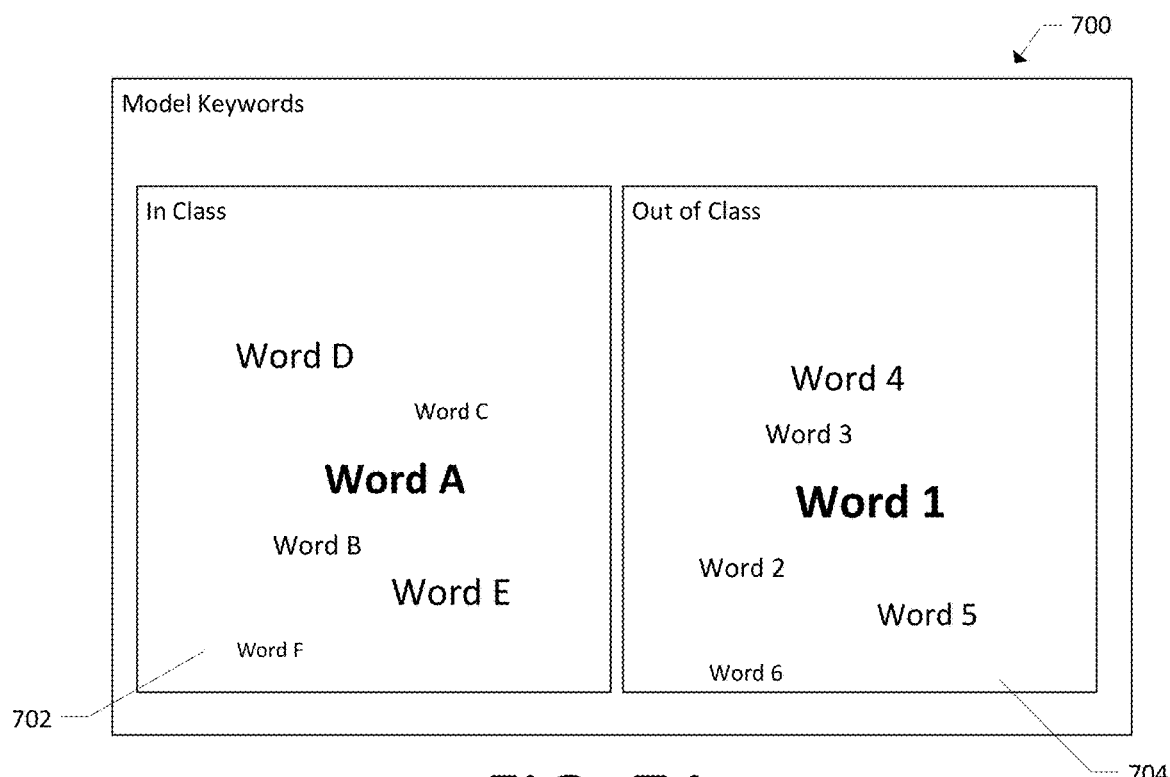
FIG. 7A illustrates an example user interface displaying keywords determined to be in class and keywords determined to be out of class by a classification model in a word-cloud format.
FIG. 7B illustrates an example user interface displaying keywords determined to be in class and keywords determined to be out of class by a classification model in a list format.

FIG. 7A illustrates an example user interface 700 displaying keywords determined to be in class and keywords determined to be out of class by a classification model in a word-cloud format. The user interface 700 may be a portion of the model building user interface 100 and may correspond to at least a portion of the model keywords window 112 as described with respect to FIG. 1.

The user interface 700 may provide a visual indication of the keywords that a given classification model has determined to be included as in class and those keywords that the model has determined to be excluded as out of class. For example, as described more fully elsewhere herein, the models may utilize training datasets indicating which documents are labeled in class and which documents are labeled out of class. Features of those documents may be identified that represent the documents, and those features may be utilized to train the models. In examples, the features may include keywords that represent the text of the document. The presentation of these keywords in the user interface 700 may take one or more forms, such as a word cloud as illustrated in FIG. 7A. In a word cloud, the size, font, emphasis, and spacing of the keywords from each other may indicate the relative importance of a given keyword to the included and excluded groupings. For example, the user interface 700 may include an included keyword window 702 and an excluded keyword window 704. The included keyword window 702 may provide a visual indication of the keywords that the model has determined are representative of the documents labeled as in class. The excluded keyword window 704 may provide a visual indication of the keywords that the model has determined are representative of the documents labeled as out of class. The keywords may each be associated with a different weighting value or otherwise may be more or less important for determining document classification. A visual indication of these weighting values may be provided in the included keyword window 702 and the excluded keyword window 704. For example, a keyword located in the center of the word cloud with larger, darker, more emphasized font than other keywords may be the most relevant keyword to the grouping. As shown in FIG. 7A, the example word clouds illustrate that the keyword "Word A" is most important for determining relevant documents while keyword "Word 1" is most important for determining out of class documents.

In examples, the user interface 700 may be configured to receive user input associated with the keywords. For example, the user input may include a user confirming that a keyword should be included in one or more of the included keyword window 702 and the excluded keyword window 704. The user input may also include a user indicating that a given keyword should be removed, deemphasized, or emphasized more than it currently is. User input data corresponding to the user input may be utilized to retrain the classification model. Additionally, a user may provide user input indicating that a word that is not included in a given window should be included, and the classification model may be retrained based at least in part on that user input data.

FIG. 7B illustrates an example user interface 750 displaying keywords determined to be in class and keywords determined to be out of class by a classification model in a list format. The user interface 750 may be a portion of the model building user interface 100 and may correspond to at least a portion of the model keywords window 112 as described with respect to FIG. 1.

The user interface 750 may provide a visual indication of the keywords that a given classification model has determined to be included as in class and those keywords that the model has determined to be excluded as out of class. For example, as described more fully elsewhere herein, the models may utilize training datasets indicating which documents are labeled in class and which documents are labeled out of class. Features of those documents may be identified that represent the documents, and those features may be utilized to train the models. In examples, the features may include keywords that represent the text of the document. The presentation of these keywords in the user interface 750 may take one or more forms, such as a list format as illustrated in FIG. 7B. In the list format, keywords may be ranked and the more relevant keyword may be identified as the first keyword in the table. For example, the user interface 750 may include an included keyword window 702 and an excluded keyword window 704. The included keyword window 702 may provide a visual indication of the keywords that the model has determined are representative of the documents labeled as in class. The excluded keyword window 704 may provide a visual indication of the keywords that the model has determined are representative of the documents labeled as out of class. The keywords may each be associated with a different weighting value or otherwise may be more or less important for determining document classification. A visual indication of these weighting values may be provided in the included keyword window 702 and the excluded keyword window 704. For example, a keyword located at the top of a given window or is otherwise associated with a highest-ranking indicator may be the most relevant keyword to the grouping. As shown in FIG. 7B, the example lists illustrate that the keyword "Word A" is most important for determining relevant documents while keyword "Word 1" is most important for determining out of class documents. In the list view, an indication of the importance and/or a confidence value associated with the keyword being included in a given window may be displayed. This may provide the user with an indication of not just the ranking of the keywords, but how important those keywords have been determined by the classification model.

In examples, the user interface 750 may be configured to receive user input associated with the keywords. For example, the user input may include a user confirming that a keyword should be included in one or more of the included keyword window 702 and the excluded keyword window 704. The user input may also include a user indicating that a given keyword should be removed, deemphasized, or emphasized more than it currently is. User input data corresponding to the user input may be utilized to retrain the classification model. Additionally, a user may provide user input indicating that a word that is not included in a given window should be included, and the classification model may be retrained based at least in part on that user input data.

Figure 8:
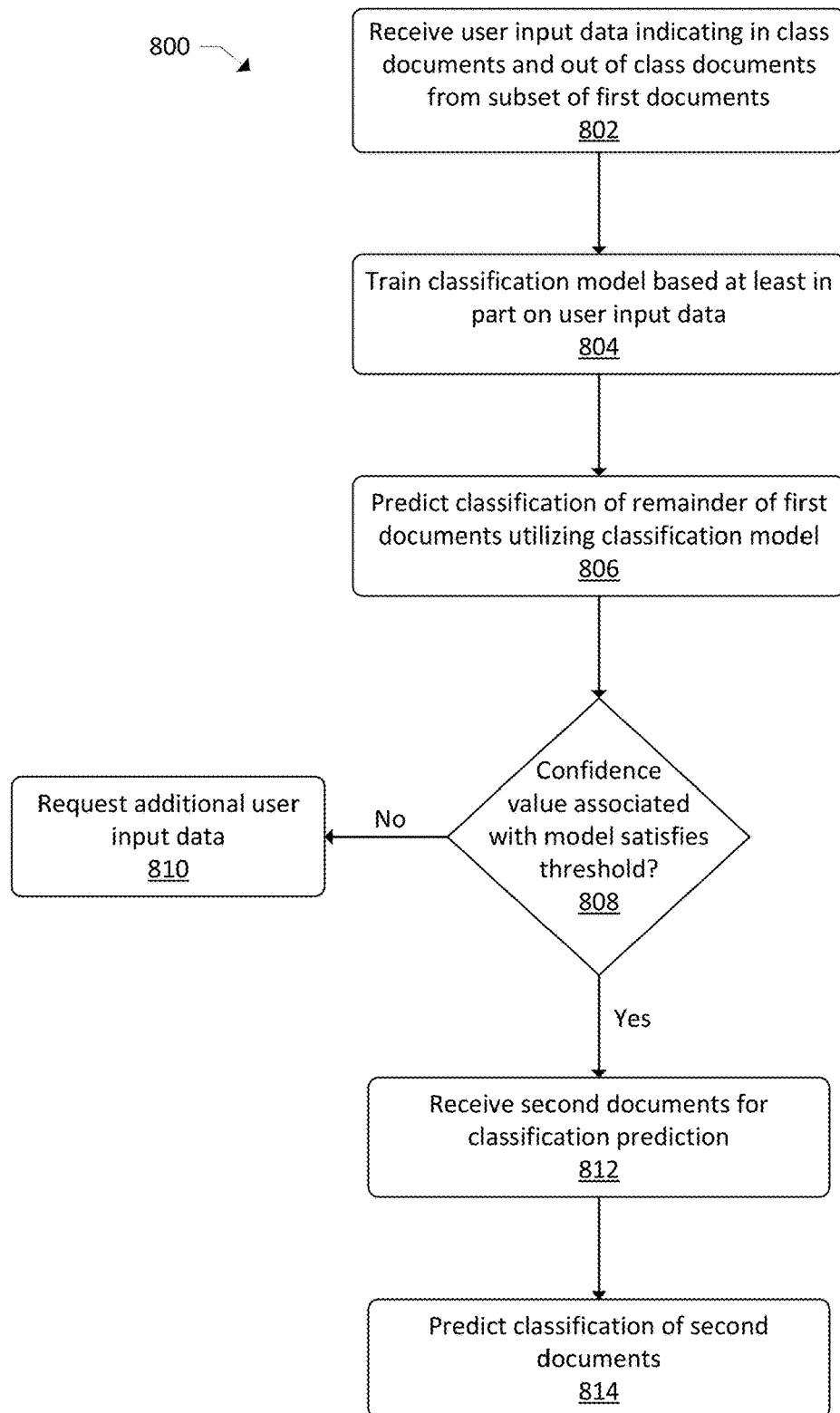
FIG. 8 illustrates a flow diagram of an example process for determining model accuracy.
Figure 9:
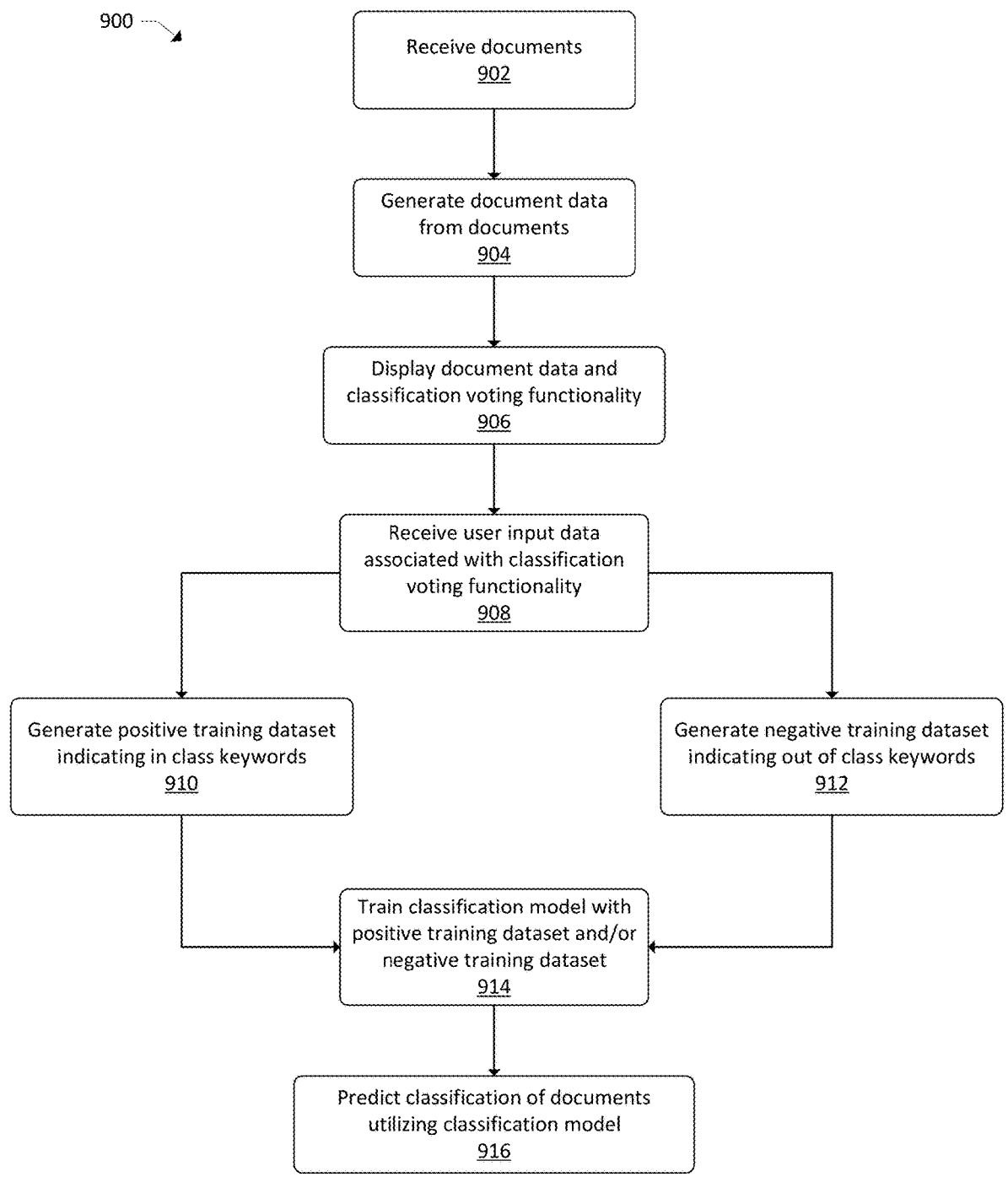
FIG. 9 illustrates a flow diagram of an example process for generating a positive dataset of keywords and a negative dataset of keywords for classification model training.
Figure 10:
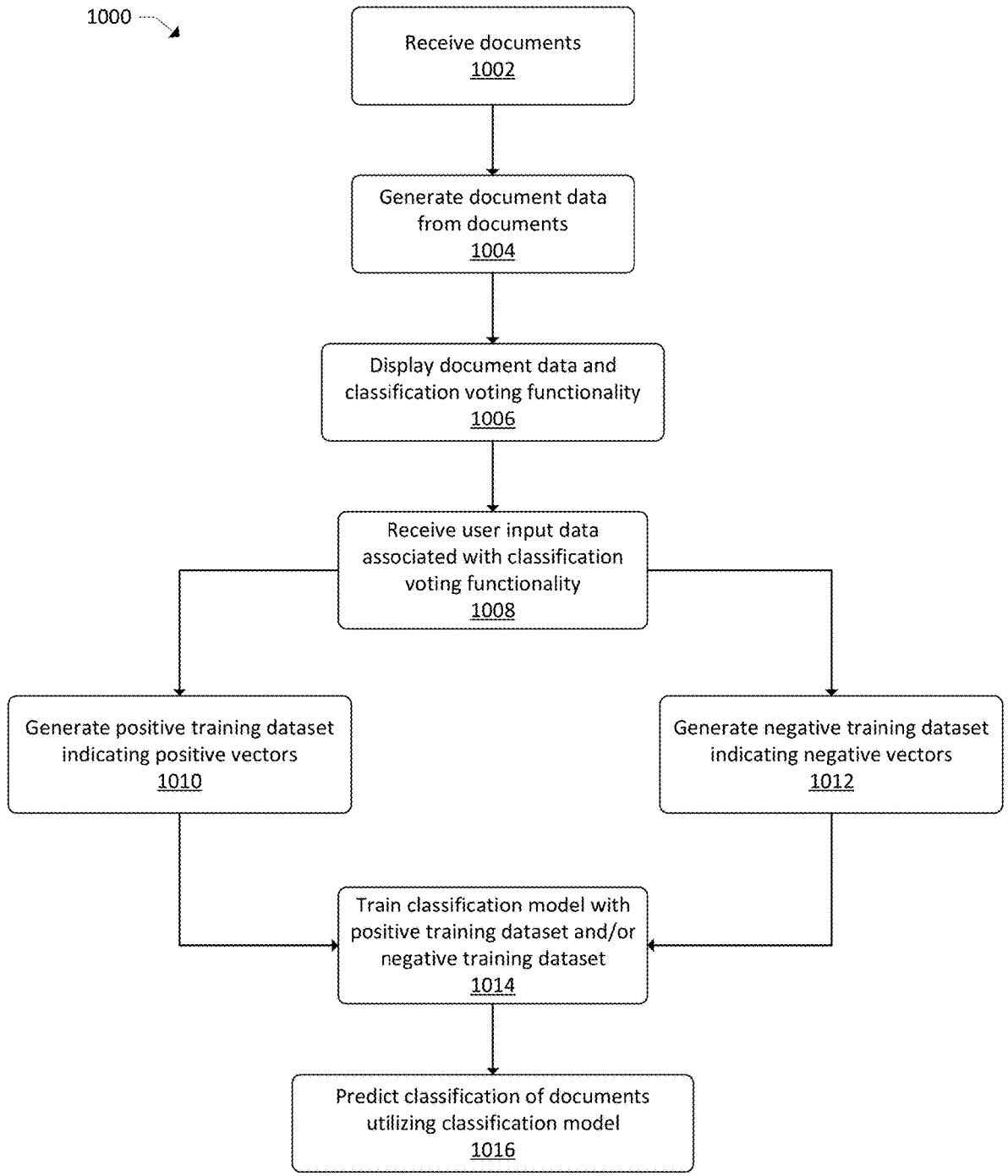
FIG. 10 illustrates a flow diagram of an example process for generating a positive dataset of vectors and a negative dataset of vectors for classification model training.

FIGS. 8-10 illustrate processes associated with document analysis platforms. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7B and 11-30, although the processes may be implemented in a wide variety of other environments, architectures and systems.

FIG. 8 illustrates a flow diagram of an example process 800 for determining a model accuracy. The order in which the operations or steps are described is not intended to be construed as a limitation, and any number of the described operations may be combined in any order and/or in parallel to implement process 800. The operations described with respect to the process 800 are described as being performed by a client device, and/or a system associated with the document analysis platform. However, it should be understood that some or all of these operations may be performed by some or all of components, devices, and/or systems described herein.

At block 802, the process 800 may include receiving user input data indicating in class documents and out of class documents from a subset of first documents. For example, the system may receive user input data indicating in class documents and out of class documents from a subset of first documents. For example, if the first documents include 1,000 documents, the user input data may indicating classification for a subset, such as 20, of those documents. Users may utilize a user interface to provide user input, such as the user interface 350 from FIG. 3B.

At block 804, the process 800 may include training a classification model based at least in part on the user input data. For example, the system may utilize that user input data to train a classification model such that the classification model is configured to determine whether a given document is more similar to those documents marked in class or more similar to those documents marked out of class. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

At block 806, the process 800 may include predicting classification of a remainder of the first documents utilizing the classification model as trained. For example, utilizing the classification model, as trained, the system may predict the classification of the remainder of the first documents that were not labeled by the user input.

At block 808, the process 800 may include determining whether a confidence value associated with the model satisfies a threshold confidence value. For example, each or some of the predictions for the remainder of the documents may be associated with a confidence value indicating how confident the system is that the classification model accurately determined the classification of a given document. The threshold confidence value may be determined and the system may determine whether, an overall confidence value associated with the classification model satisfies that threshold confidence value.

In examples where the confidence value does not satisfy the threshold confidence value, at block 810, the process 800 may include requesting additional user input data. For example, in instances where the confidence value does not satisfy the threshold confidence value, the system may cause an indication of this determination to be displayed and may request additional user input data for retraining the classification model.

In examples where the confidence value satisfies the threshold confidence value, at block 812, the process 800 may include receiving second documents for classification prediction. For example, in instances where the confidence value satisfies the threshold confidence value, the system may receive second documents for classification prediction. The second documents may be received based at least in part on a user uploading additional documents and/or from the system retrieving additional documents from one or more databases.

At block 814, the process 800 may include predicting the classification of the second documents utilizing the classification model. For example, the classification model may be utilized to determine whether some or all of the documents in the second document set are more closely related to the in class documents than to the out of class documents.

FIG. 9 illustrates a flow diagram of an example process 900 for generating a positive dataset of keywords and a negative dataset of keywords for classification model training. The order in which the operations or steps are described is not intended to be construed as a limitation, and any number of the described operations may be combined in any order and/or in parallel to implement process 900. The operations described with respect to the process 900 are described as being performed by a client device, and/or a system associated with the document analysis platform. However, it should be understood that some or all of these operations may be performed by some or all of components, devices, and/or systems described herein.

At block 902, the process 900 may include receiving documents. For example, the document analysis platform may be configured to receive data representing documents. The documents may be provided to the document analysis platform by users uploading those documents and/or by the document analysis platform fetching or otherwise retrieving those documents.

At block 904, the process 900 may include generating document data from the documents. For example, the document analysis platform may be configured to identify portions of the documents and tag or otherwise separate those portions. For example, when the documents are patents and patent applications, the document analysis platform may be configured to identify portions of the documents corresponding to the title, the publication number, the abstract, the detailed description, the figures, and/or the claims, for example. This may be performed utilizing keyword recognition and/or based on one or more rules associated with the formatting of the document, such as numbered paragraphs corresponding to claims, a format for a publication number, presence of image data, etc.

At block 906, the process 900 may include displaying the document data and classification voting functionality. For example, a summary user interface may include portions of the documents and information associated with the documents, such as whether the documents have been labeled, a prediction made in association with the document, a confidence value associated with the prediction, and/or an evaluation of the document and/or a portion of the document. In the example where the documents are patents and patent applications, the user interface may display portions of the documents such as the publication number, the title, the abstract, one or more claims, and/or a claim score. The claim score may be based at least in part on an analysis of the claims of a given patent and the claim score may be provided by way of a scale, such as a scale from 0 to 5, where 0 represents the broadest claim score and 5 represents the narrowest claim score. The user interface may also provide some information about the project category associated with the documents, such as the category title, a category progress indicating how many documents have been labeled and/or predicted to be in class and out of class, how many documents have been skipped, and/or a total number of uploaded documents. The user interface may also provide options for viewing the document summaries, such as a filter option to filter the summaries based at least in part on one or more of the attributes of the documents and/or the analysis of the documents. The options may also include a sort options, which may be utilized to sort the summaries based at least in part on one or more of the attributes of the documents and/or the analysis of the documents. The options may also a columns option, which may be utilized to remove or add columns of information to the summaries. The options may also include an action option, which may be utilized to take an action in association with a document, such as tagging a document, removing a document, editing a document, etc. In addition, the user interface may include selectable portions associated with some or each of the document summaries that, when selected, may cause another user interface to display the full document associated with the selected portion.

At block 908, the process 900 may include receiving user input data associated with classification voting functionality. For example, the user may provide user input utilizing the user interface 350 as described with respect to FIG. 3B.

At block 910, the process 900 may include generating a positive training dataset indicating in class keywords. For example, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example.

At block 912, the process 900 may include generating a negative training dataset indicating out of class keywords. For example, the platform may also generate a negative training dataset indicating keywords from the documents marked out of class by the user input.

At block 914, the process 900 may include training a classification model with the positive training dataset and/or with the negative training dataset. For example, each of these training datasets may be utilized to train the classification model such that the classification model is configured to determine whether a given document has keywords that are more similar to the in class keywords than to the out of class keywords.

At block 916, the process 900 may include predicting classification of documents utilizing the classification model. For example, the trained classification model may be configured to intake a given document and determine one or more keywords associated with that document. Those sample keywords may be compared to the keywords from the classification model to determine whether the sample keywords are more closely related to the classification keywords or the out of class keywords from the training datasets.

FIG. 10 illustrates a flow diagram of an example process 1000 for generating a positive dataset of vectors and a negative dataset of vectors for classification model training. The order in which the operations or steps are described is not intended to be construed as a limitation, and any number of the described operations may be combined in any order and/or in parallel to implement process 1000. The operations described with respect to the process 1000 are described as being performed by a client device, and/or a system associated with the document analysis platform. However, it should be understood that some or all of these operations may be performed by some or all of components, devices, and/or systems described herein.

At block 1002, the process 1000 may include receiving documents. For example, the document analysis platform may be configured to receive data representing documents. The documents may be provided to the document analysis platform by users uploading those documents and/or by the document analysis platform fetching or otherwise retrieving those documents.

At block 1004, the process 1000 may include generating document data from the documents. For example, the document analysis platform may be configured to identify portions of the documents and tag or otherwise separate those portions. For example, when the documents are patents and patent applications, the document analysis platform may be configured to identify portions of the documents corresponding to the title, the publication number, the abstract, the detailed description, the figures, and/or the claims, for example. This may be performed utilizing keyword recognition and/or based on one or more rules associated with the formatting of the document, such as numbered paragraphs corresponding to claims, a format for a publication number, presence of image data, etc.

At block 1006, the process 1000 may include displaying the document data and classification voting functionality. For example, a summary user interface may include portions of the documents and information associated with the documents, such as whether the documents have been labeled, a prediction made in association with the document, a confidence value associated with the prediction, and/or an evaluation of the document and/or a portion of the document. In the example where the documents are patents and patent applications, the user interface may display portions of the documents such as the publication number, the title, the abstract, one or more claims, and/or a claim score. The claim score may be based at least in part on an analysis of the claims of a given patent and the claim score may be provided by way of a scale, such as a scale from 0 to 5, where 0 represents the broadest claim score and 5 represents the narrowest claim score. The user interface may also provide some information about the project category associated with the documents, such as the category title, a category progress indicating how many documents have been labeled and/or predicted to be in class and out of class, how many documents have been skipped, and/or a total number of uploaded documents. The user interface may also provide options for viewing the document summaries, such as a filter option to filter the summaries based at least in part on one or more of the attributes of the documents and/or the analysis of the documents. The options may also include a sort options, which may be utilized to sort the summaries based at least in part on one or more of the attributes of the documents and/or the analysis of the documents. The options may also a columns option, which may be utilized to remove or add columns of information to the summaries. The options may also include an action option, which may be utilized to take an action in association with a document, such as tagging a document, removing a document, editing a document, etc. In addition, the user interface may include selectable portions associated with some or each of the document summaries that, when selected, may cause another user interface to display the full document associated with the selected portion.

At block 1008, the process 1000 may include receiving user input data associated with classification voting functionality. For example, the user may provide user input utilizing the user interface 350 as described with respect to FIG. 3B.

At block 1010, the process 1000 may include generating a positive training dataset indicating positive vectors. For example, the platform may generate a positive training dataset indicating that a vectorized representation of a document is marked in class by a user. For example, the platform may determine a vector in a coordinate system that represents the subject matter of a document. This may be performed utilizing one or more document processing techniques, such as Doc2Vec, for example.

At block 1012, the process 1000 may include generating a negative training dataset indicating negative vectors. For example, the platform may also generate a negative training dataset indicating vectors representing documents marked out of class by the user input.

At block 1014, the process 1000 may include training a classification model with the positive training dataset and/or with the negative training dataset. For example, each of these training datasets may be utilized to train the classification model such that the classification model is configured to determine whether a sample vector representing a given document is closer, in the coordinate system, to the positive vectors than to the negative vectors.

At block 1016, the process 1000 may include predicting classification of documents utilizing the classification model. For example, the trained classification model may be configured to intake a given document and determine a vector representing that document. That sample vector may be compared to the positive and negative vectors to determine whether the sample vector is more closely related to the positive vectors or the negative vectors from the training datasets.

Figure 11:
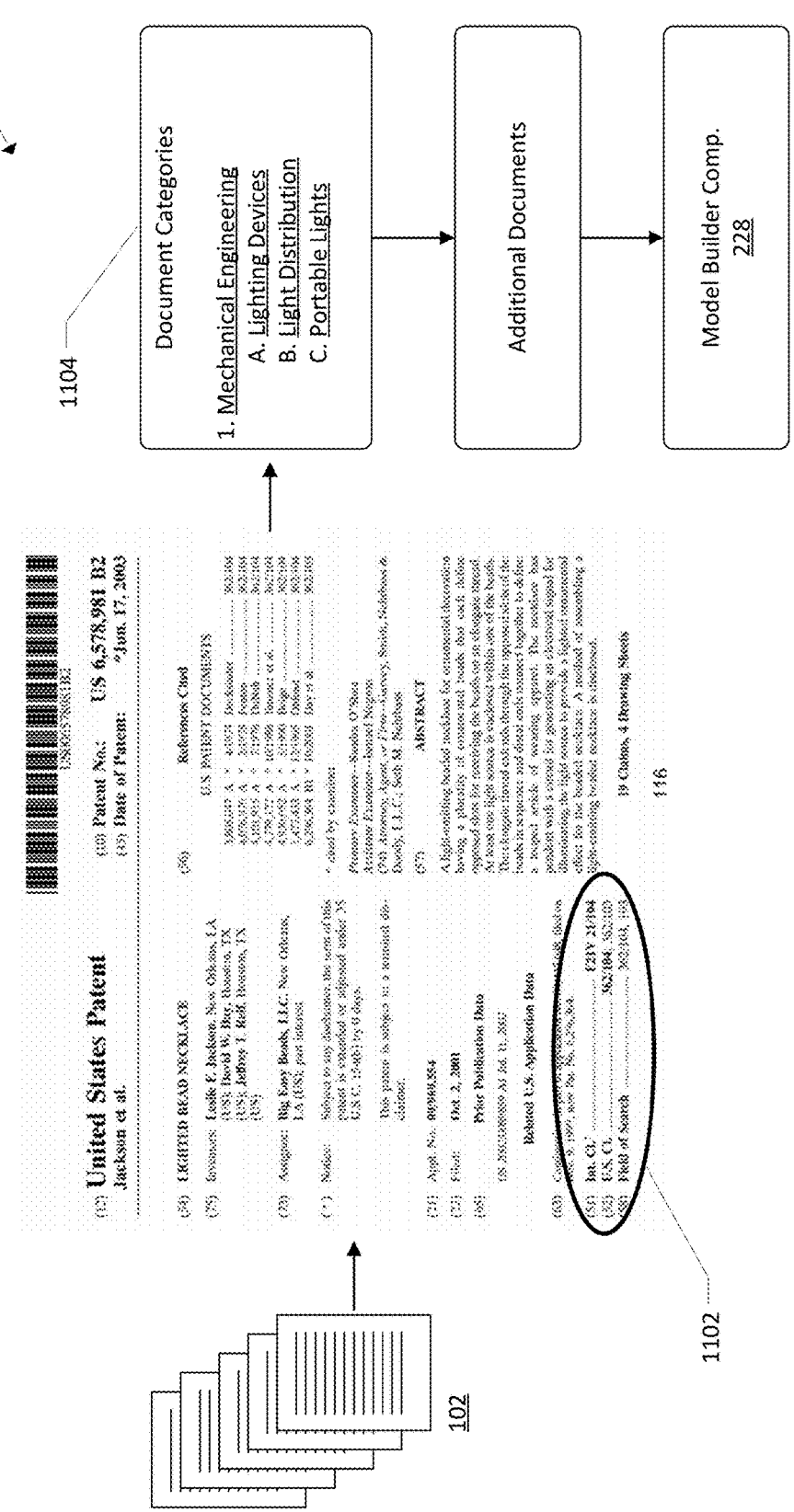
FIG. 11 illustrates a conceptual diagram of an example process for utilizing document categorization for receiving user input data and/or for training classification models.

FIG. 11 illustrates a conceptual diagram of an example process 1100 for utilizing document categorization for receiving user input data and/or for training classification models. FIG. 11 illustrates a progression, from left to right and top to bottom, of information displayed on and/or interactions with one or more user interfaces.

In addition to the techniques for training the classification models described herein associated with receiving user input indicating whether documents are in class or out of class, the classification models may also be trained and/or organized based at least in part on classifications of the documents 102. For example, when the documents 102 are patents and patent applications, a predetermined classification system may be established for classifying the subject matter of a given document 102. The classification system may be determined by the platform, by one or more users, and/or by a third party. For example, patents and patent application may be associated with a predefined classification system such as the Cooperative Patent Classification (CPC) system. The CPC system employs CPC codes 1102 that correspond to differing subject matter. The CPC codes 1102 for a given document 102 may be identified and the categories associated with those codes 1102 may be determined. For example, using FIG. 11, the CPC codes 1102 may include one or more numbers and/or letters that have been predefined to correspond to various document categories and/or subcategories. For certain documents 102, multiple codes 1102 may be identified and/or utilized. For example, the CPC codes 1102 in FIG. 11 include international classification codes and United States classification codes. The specific international classification code in FIG. 11 is F21V. This CPC code may correspond to one or more categories and/or subcategories, here being "mechanical engineering; lighting; heating; weapons; blasting engines or pumps" being a category corresponding to the "F" portion of the code. "Lighting" may correspond to the "21" portion of the code. And "V" may correspond to the subcategory of "functional features or details of lighting devices or systems thereof; structural combination of lighting devices with other articles, not otherwise provided for."

A user interface 1104 may be presented to the user with the determined categories and the user interface 1104 may allow a user to select which categories the user finds in class for a given purpose. As shown in FIG. 11, a user may select one or more of the categories and/or subcategories, such as "mechanical engineering," "lighting devices," "light distribution," "portable lights," etc. The selected categories may be utilized as a feature for training the classification models. Additionally, or alternatively, the platform may determine the CPC codes 1102 for documents 102 marked as in class and may train the classification models to compare those CPC codes 1102 with the CPC codes 1102 associated with the documents 102 to be analyzed to determine classification. Additionally, determination of the CPC codes 1102 may be utilized to search for and acquire additional documents to be utilized for training a classification model and/or for utilizing the model to determine classification of such documents. In these examples, the additional documents may be provided to the model builder component 228, which may utilize those documents as described herein.

In addition to the above, CPC codes 1102 and/or other document classification systems may be utilized to determine which documents will be predicted as in class and which documents will be predicted as out of class. For example, as described above, keywords associated with in class documents may be utilized for comparison with sample keywords to determine if a sample document should be classified as in class. In addition to such keywords, the CPC codes 1102 may also be utilized. For example, a given document having keywords and a first CPC code 1102 may be predicted as in class, while another document having the same keywords but having a second CPC codes 1102 may be predicted as out of class. By so doing, the classification models may be trained to utilize the CPC codes 1102 as an indicator of whether a document should be classified as in class or out of class.

Figure 12:
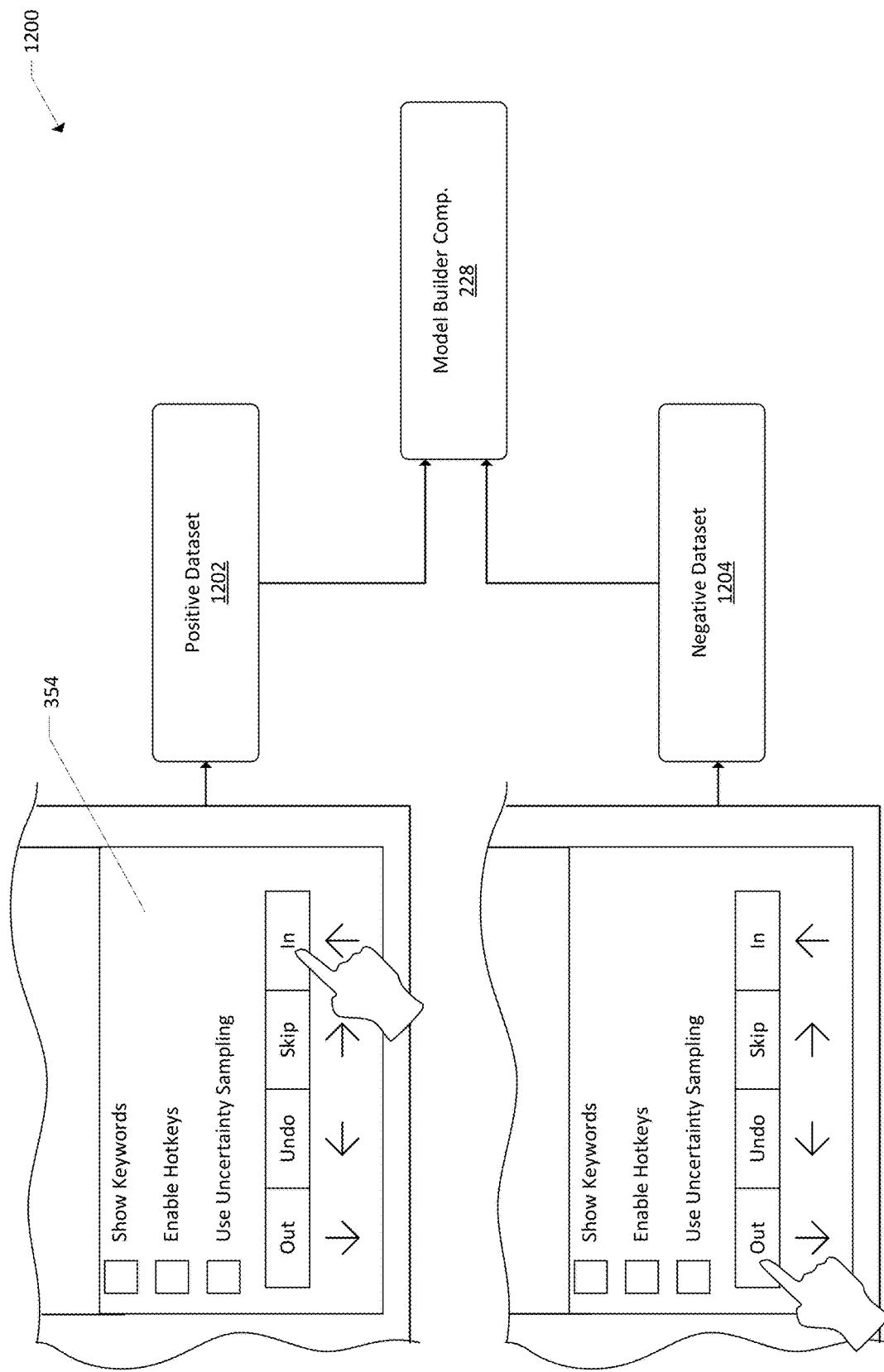
FIG. 12 illustrates a conceptual diagram of an example process for receiving user input data for training classification models.

FIG. 12 illustrates a conceptual diagram of an example process 1200 for receiving user input data for training classification models. FIG. 12 illustrates a progression, from left to right and top to bottom, of information displayed on and/or interactions with one or more user interfaces.

In examples, a full document user interface may include information about documents being reviewed by a user, such as the document title, publication number, abstract, claims, and category notes such as the number of documents marked in class and out of class, the number of documents skipped, the number of documents that have been labeled, and analysis details of the document. The user interface may provide additional information regarding some or all of the aspects of a given document. For example, additional portions of the abstract and/or additional claims and/or claim language may be displayed. Additionally, the category progress information and analysis details may be displayed in a category notes window. The analysis details may include the prediction made with respect to the document, such as whether a classification model determined that the document was in class or out of class, a confidence value associated with that determination, and a claim score associated with the claims of the document.

In addition to the above, the user interface may provide a voting window 354 that may allow a user to provide user input indicating whether the document should be labeled as relevant or otherwise "in class" or irrelevant or otherwise "out of class." Additional options may include "skip" and "undo" for example. The voting window 354 may also be utilized to present one or more of the keywords to enable "hotkeys" or otherwise shortcut keys to allow for the user input via a keyboard or similar device as opposed to a mouse scrolling and clicking one of the options, and an option to utilize uncertainty sampling. For example, a user may view the information about the document in the user interface. After review of some or all of the information being displayed, the user may determine that the document is either in class or out of class (or determine that the document is to be skipped). In examples where the document is to be labeled as in class, the user may utilize one or more input means to select a portion of the screen corresponding to the "in" option. In examples where the document is to be labeled as out of class, the user may utilize one or more input means to select a portion of the screen corresponding to the "out" option. Alternatively, when hotkeys are enabled, the user may select the corresponding hotkey on a keyboard (whether physical or digital). Upon selection of one of the options in the voting window 354, the user interface may be caused to display the next unlabeled document in the document set to allow the user to review that document and provide user input associated with the classification of that document.

As shown in FIG. 12, when a user selects the "in" portion of the user interface and/or otherwise indicates that the given document is in class, that document and/or a feature and/or attribute of that document may be saved to a positive dataset 1202. For example, when the models utilize keywords for document comparison as described herein, keywords associated with the document labeled "in" may be stored in association with the positive dataset 1202, along with additional information such as weighting values associated with the keywords and/or confidence values associated with the determination of the keywords. In examples where the models utilize vectors for document comparison as described herein, a vector associated with the document labeled "in" may be stored in association with the positive dataset 1202, along with additional information such as weighting values and/or confidence values. Additional documents where the user indicates that the documents are in class may also be stored in association with the positive dataset 1202.

When a user selects the "out" portion of the user interface and/or otherwise indicates that the given document is out of class, that document and/or a feature and/or attribute of that document may be saved to a negative dataset 1204. For example, when the models utilize keywords for document comparison as described herein, keywords associated with the document labeled "out" may be stored in association with the negative dataset 1204, along with additional information such as weighting values associated with the keywords and/or confidence values associated with the determination of the keywords. In examples where the models utilize vectors for document comparison as described herein, a vector associated with the document labeled "out" may be stored in association with the negative dataset 1204, along with additional information such as weighting values and/or confidence values. Additional documents where the user indicates that the documents are out of class may also be stored in association with the negative dataset 1204.

As described more fully herein, the classification model may be trained utilizing the labeled documents. For example, the datasets 1202, 1204 may be utilized to train the classification model how to identify, for the documents that have not been labeled, whether a given document is in class or out of class. To do so, the datasets 1202, 1204 may be utilized by the model builder component 228 to train the classification model to compare in class and out of class keywords with keywords representative of a sample document, and/or to compare in class and out of class vectors with a vector representative of the sample document.

Figure 13:
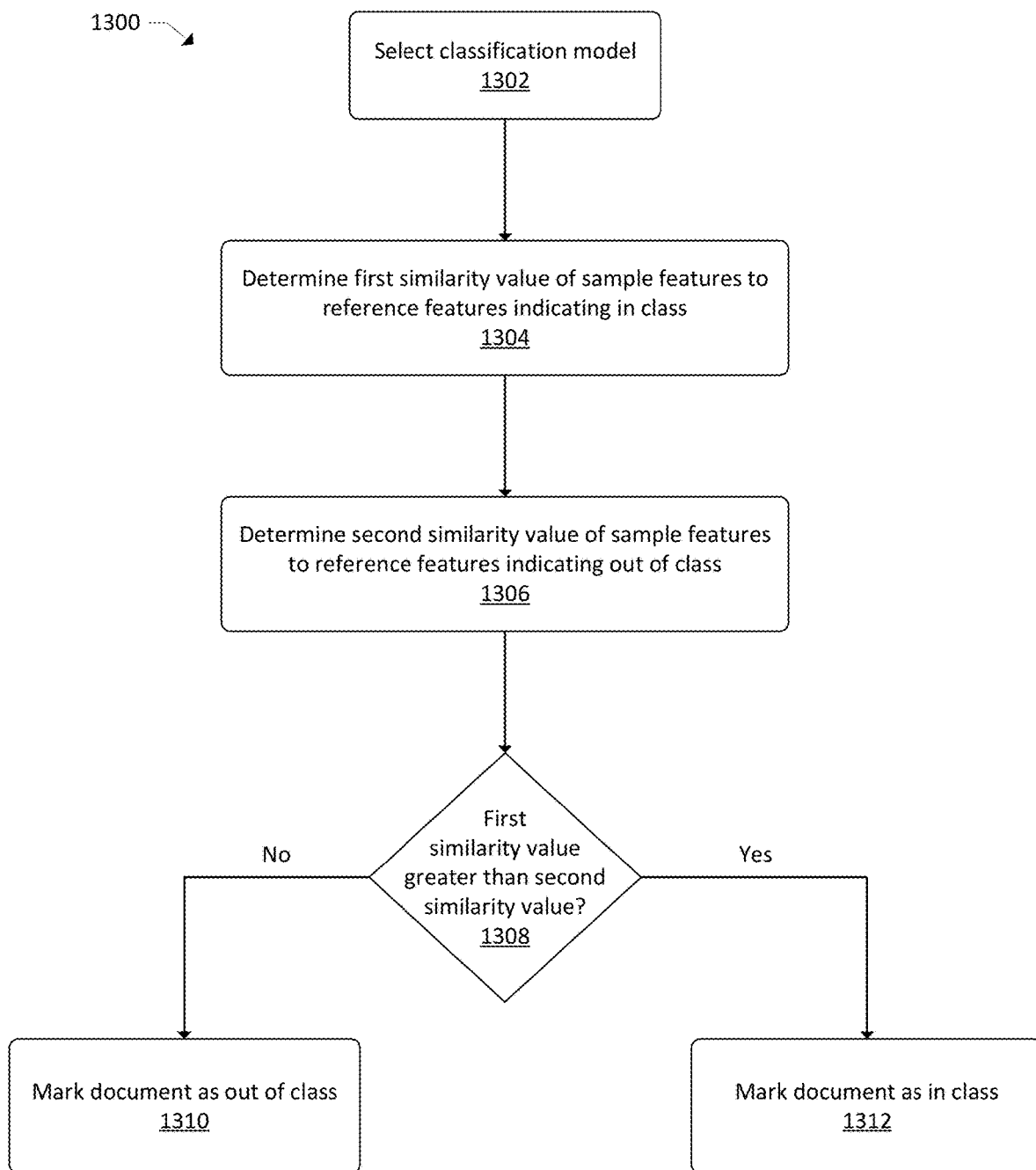
FIG. 13 illustrates a flow diagram of an example process for utilizing a classification model to determine whether a given document is in class or out of class.
Figure 14:
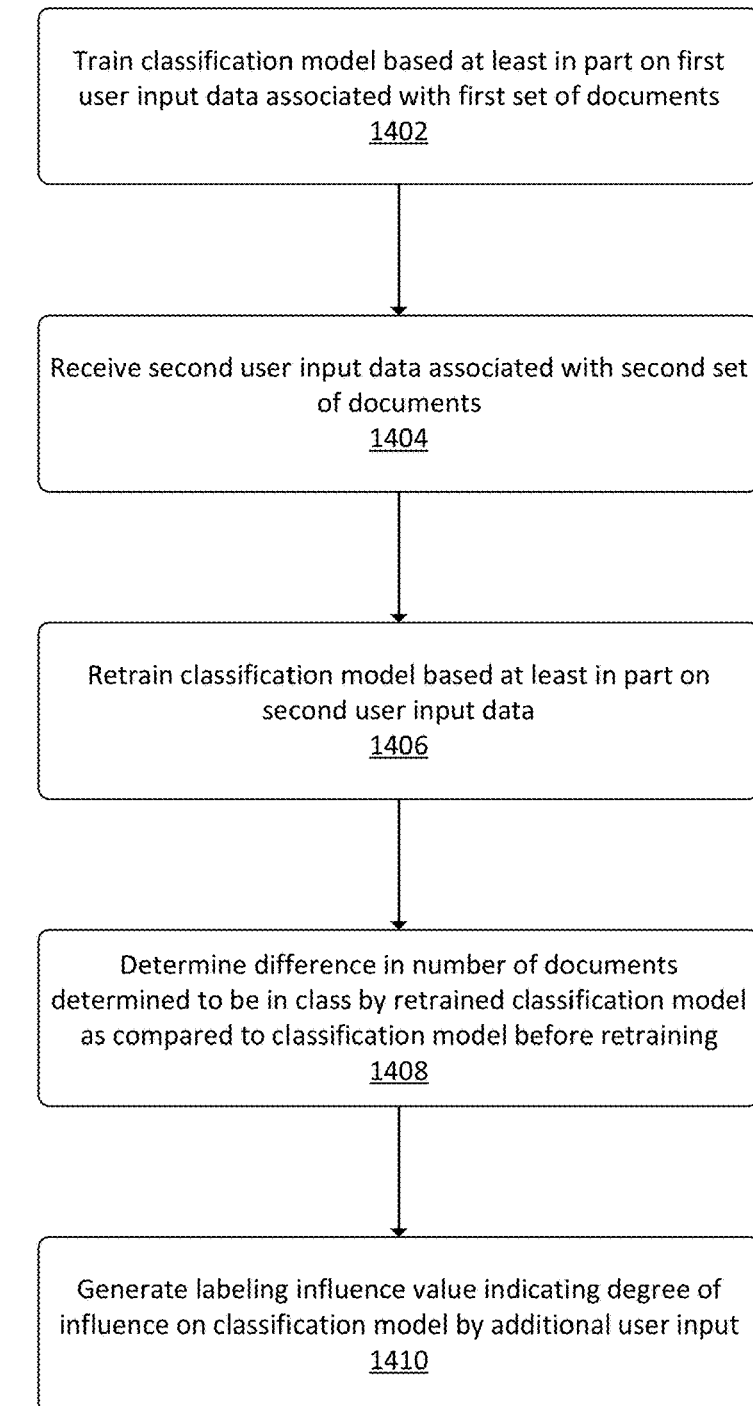
FIG. 14 illustrates a flow diagram of an example process for determining a labelling influence value associated with receiving user input data to retrain a classification model.

FIGS. 13 and 14 illustrate processes associated with document analysis platforms. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-12 and 15-30, although the processes may be implemented in a wide variety of other environments, architectures and systems.

FIG. 13 illustrates a flow diagram of an example process 1300 for utilizing a classification model to determine whether a given document is in class or out of class. The order in which the operations or steps are described is not intended to be construed as a limitation, and any number of the described operations may be combined in any order and/or in parallel to implement process 1300. The process described with respect to the process 1300 are described as being performed by a client device, and/or a system associated with the document analysis platform. However, it should be understood that some or all of these operations may be performed by some or all of components, devices, and/or systems described herein.

At block 1302, the process 1300 may include selecting a classification model. For example, one or more models for predicting the classification of documents in a document set may be made available for use. Those models may include one or more models that utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 1304, the process 1300 may include determining a first similarity value of sample features to reference features indicating documents that are in class. For example, when keywords are utilized to represent documents, keywords associated with the documents labelled as in class from user input may be compared to keywords of a sample document. When those keywords correspond to each other well, or otherwise the reference documents and the sample document share keywords, particularly keywords that are heavily weighted as being in class, then the first similarity value may be high. When the keywords of the reference documents and the keywords of the sample document do not correlate well, then the first similarity value may be low. In examples where vectors are utilized, vectors associated with the documents labelled as in class from user input may be compared to a vector of a sample document. When that vector is closer in distance to vectors associated with in class documents than to out of class documents, the first similarity value may be high.

At block 1306, the process 1300 may include determining a second similarity value of the sample features to reference features indicating documents that are out of class. Determining the second similarity value may be performed in the same or a similar manner as determining the first similarity value. However, instead of determining how closely a sample document correlates to documents determined to be in class, the second similarity value indicates how closely a sample document is correlated to documents marked out of class by user input.

At block 1308, the process 1300 may include determining whether the first similarity value is greater than the second similarity value. For example, the similarity values may be compared to determine which value is greater, assuming a scale where greater equates to higher confidence.

In examples where the first similarity value is not greater than the second similarity value, then at block 1310 the process 1300 may include determining that the document is out of class. The document may be marked as out of class and counted as "out" for purposes of display to a user. A confidence value, which may indicate how closely the document correlated to out of class documents labeled as such by a user may also be determined.

In examples where the first similarity value is greater than the second similarity value, then at block 1312 the process 1300 may include determining that the document is in class.

The document may be marked as in class and counted as "in" for purposes of display to a user. A confidence value, which may indicate how closely the document correlated to in class documents labeled as such as user may also be determined.

FIG. 14 illustrates a flow diagram of an example process 1400 for determining a labelling influence value associated with receiving user input data to retrain a classification model. The order in which the operations or steps are described is not intended to be construed as a limitation, and any number of the described operations may be combined in any order and/or in parallel to implement process 1400. The operations described with respect to the process 1400 are described as being performed by a client device, and/or a system associated with the document analysis platform. However, it should be understood that some or all of these operations may be performed by some or all of components, devices, and/or systems described herein.

At block 1402, the process 1400 may include training a classification model based at least in part on first user input data associated with a first set of documents. For example, the process 1300 as described above may be utilized to train the classification model. In part, one or more datasets may be generated based at least in part on user input indicating a portion of documents that are in class and/or a portion of documents that are out of class. The dataset(s) may be utilized to train a classification model to determine whether features of a sample document correlate more to the documents labeled as in class or the documents labeled as out of class.

At block 1404, the process 1400 may include receiving second user input data associated with a second set of documents. For example, documents that had not been previously labeled by the user may be labeled. The second set of documents may be a portion of the original set of documents and/or the second set of documents may include newly-added documents.

At block 1406, the process 1400 may include retraining the classification model based at least in part on the second user input data. Retraining the classification model may be performed in the same or a similar manner as training the classification model as described at block 1402.

At block 1408, the process 1400 may include determining a difference in a number of documents determined to be in class by the retained classification model as compared to the classification model before retraining. For example, before retraining, the classification model may be run to determine a number of the documents predicted to be in class and a number of the documents predicted to be out of class. The classification model may be run again after retraining and a second number of documents predicted to be in class and documents predicted to be out of class may be determined. For example, having retrained the model utilizing new labeling data, in examples the model will perform differently than before training, and that difference may result in some of the documents originally predicted to in class being predicted as out of class after retraining, and/or vice versa.

At block 1410, the process 1400 may include generating a labeling influence value indicating a degree of influence on the classification model by the second user input. For example, when the number of in class and out of class documents changes drastically between model trainings, the labeling influence value may indicate this change. This may provide a user with an indication that additional user input will have a large effect on the model. In other examples, when the number of in class and out of class documents does not change or changes only slightly, the labeling influence value may indicate this small change. This may provide a user with an indication that additional user input will have negligible effects on the model.

Figure 15:
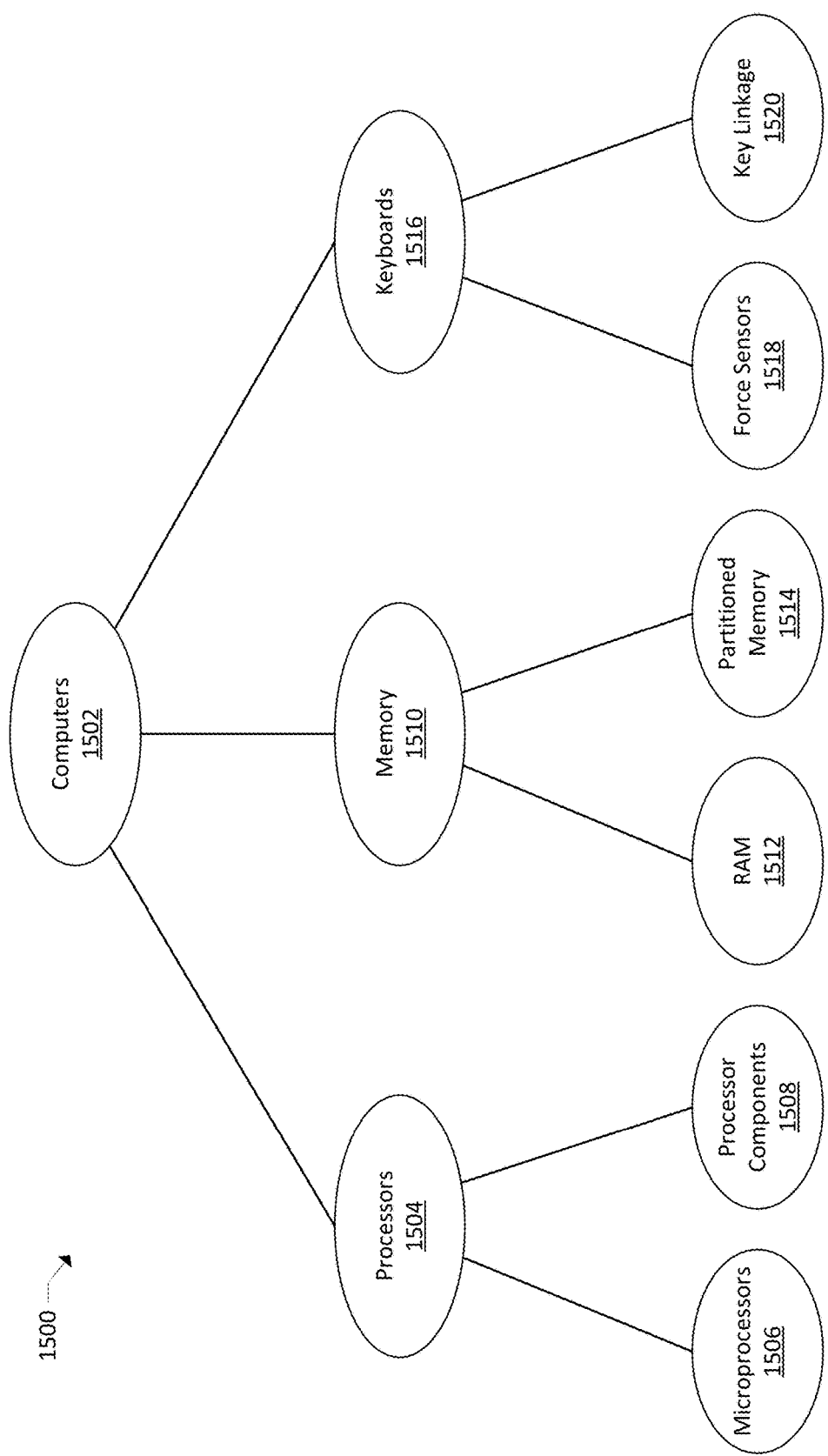
FIG. 15 illustrates a conceptual diagram of an example model taxonomy.

FIG. 15 illustrates a conceptual diagram of an example model taxonomy 1500. For example, in addition to the training of classification models as described above, once the classification models are trained such that the models are determined to accurately predict classification as trained, the models may be placed in a model taxonomy 1500. The model taxonomy 1500 may represent a taxonomy tree or otherwise a model hierarchy indicating relationships between models and/or a level of specificity associated with the models. For example, as shown in FIG. 15, a first model 1502 associated with determining whether documents are in class with respect to "computers," may be associated with other models 1505, 1510, 1516 trained to determine whether documents are in class with respect to "processors," "memory," and "keyboards," respectively. Each of these models may also be associated with other models 1506, 1508, 1512, 1514, 1518, 1520 trained to determine more specific aspects of these components, such as "microprocessors" and "processor components," or "RAM" and "partitioned memory." This taxonomy 1500 may be searchable and may provide functionality that allows a user to provide a search query for a model. The keywords from the search query may be utilized to identify models that may be applicable to the search query and/or to highlight "branches" of the taxonomy associated with the search query.

As shown in FIG. 15, the models in the model taxonomy 1500 may be linked to each other in one or more ways. For example, when the subject matter of one model is related to the subject matter of another model, those models may be linked in the taxonomy 1500. In some examples, the nodes of the taxonomy representing the models may be determined utilizing a predefined subject matter classification system, such as the CPC system described herein.

Figure 16:
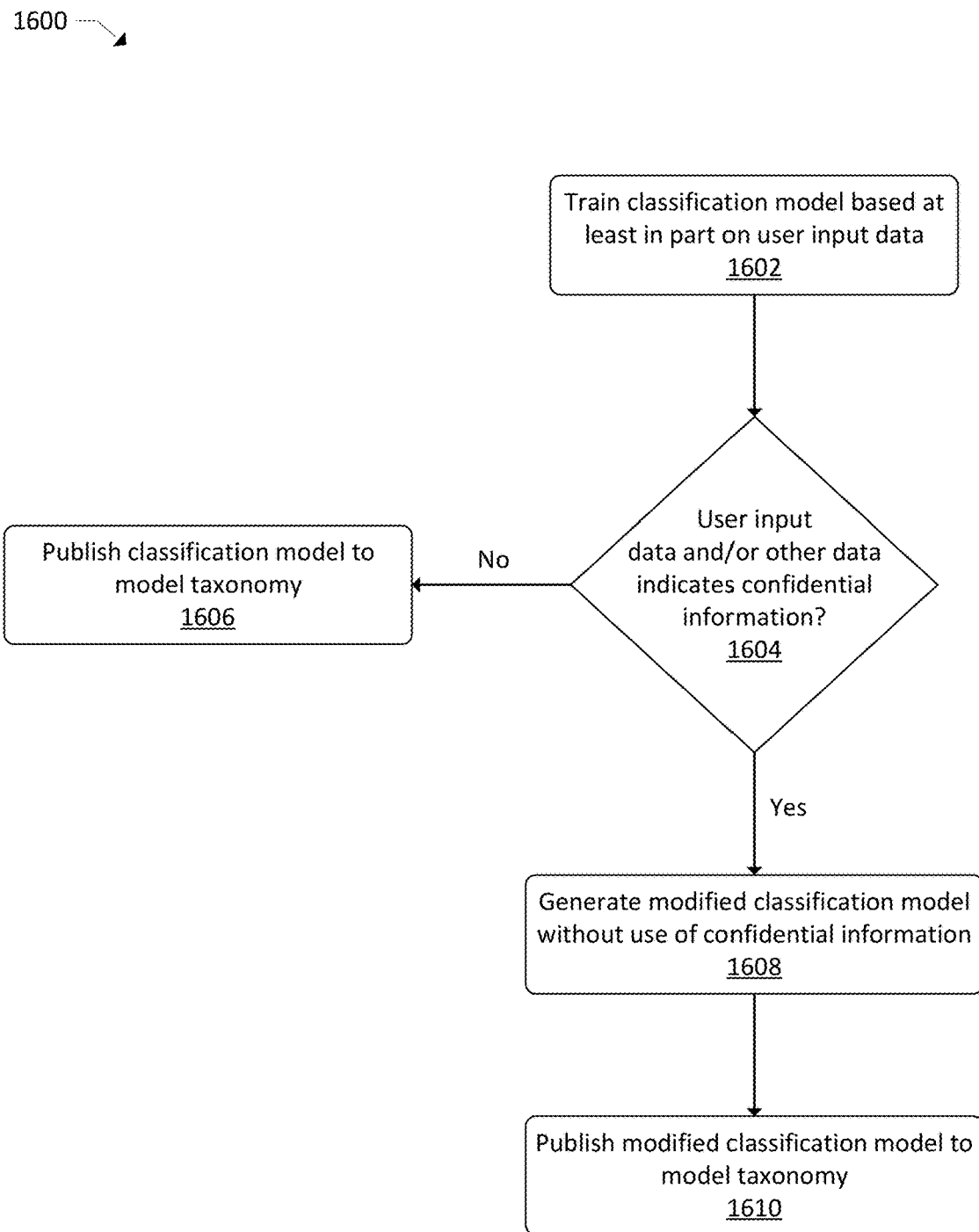
FIG. 16 illustrates a flow diagram of an example process for determining portions of a classification model associated with confidential information and generating a modified classification model without association to the confidential information.

FIG. 16 illustrates processes associated with document analysis platforms. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-15 and 17-30, although the processes may be implemented in a wide variety of other environments, architectures and systems.

FIG. 16 illustrates a flow diagram of an example process 1600 for determining portions of a classification model associated with confidential information and generating a modified classification model without association to the confidential information. The order in which the operations or steps are described is not intended to be construed as a limitation, and any number of the described operations may be combined in any order and/or in parallel to implement process 1600. The operations described with respect to the process 1600 are described as being performed by a client device, and/or a system associated with the document analysis platform. However, it should be understood that some or all of these operations may be performed by some or all of components, devices, and/or systems described herein.

At block 1602, the process 1600 may include training a classification model based at least in part on user input data. For example, one or more datasets may be generated based at least in part on user input indicating a portion of documents that are in class and/or a portion of documents that are out of class. The dataset(s) may be utilized to train a classification model to determine whether features of a sample document correlate more to the documents labeled as in class or the documents labeled as out of class.

At block 1604, the process 1600 may include determining whether the user input data and/or other data indicates confidential information. For example, when a user profile associated with a user is setup and/or when a project is started, information about the purpose of the project, one or more restrictions put on the project, and/or user input provided for the project may be provided. In examples, that information may indicate that the project and/or portions thereof are confidential and/or are otherwise restricted from use by other users. For example, a company may desire to utilize the document analysis platform described herein for one or more business reasons, but in generating a classification model to serve those purposes, the user input provided and/or the results from the classification model may indicate the user's purpose. When that purpose is confidential, an indication of such may be provided by the user and/or may be inferred by the platform. For example, at least a portion of the user input utilized to train the classification model in question may be denoted as confidential by the user.

In examples where the user input data and/or the other data does not indicate confidential information, then at block 1606 the process 1600 may include publishing the classification model to a model taxonomy. For example, the classification model may be deemed sufficient for publishing to the model taxonomy such that use by others as described elsewhere herein may not impact confidentiality and/or restrictions associated with the user that was involved in training the model.

In example where the user input data and/or the other data indicates confidential information, then at block 1608 the process 1600 may include generating a modified classification model without use of confidential information. For example, the user input data associated with confidential information and/or the restrictions may be removed from the dataset(s) utilized for training the classification model. The classification model may be retrained without that confidential user input, resulting in a modified classification model.

At block 1610, the process 1600 may include publishing the modified classification model to the model taxonomy. The modified classification model may be published in the same or a similar manner as described above with respect to block 1606. In examples, when a classification model has been modified pursuant to this process, an indication of the modification may be provided to other users of the model. This may provide those users with an indication that additional training of the model may be desirable.

Figure 17:
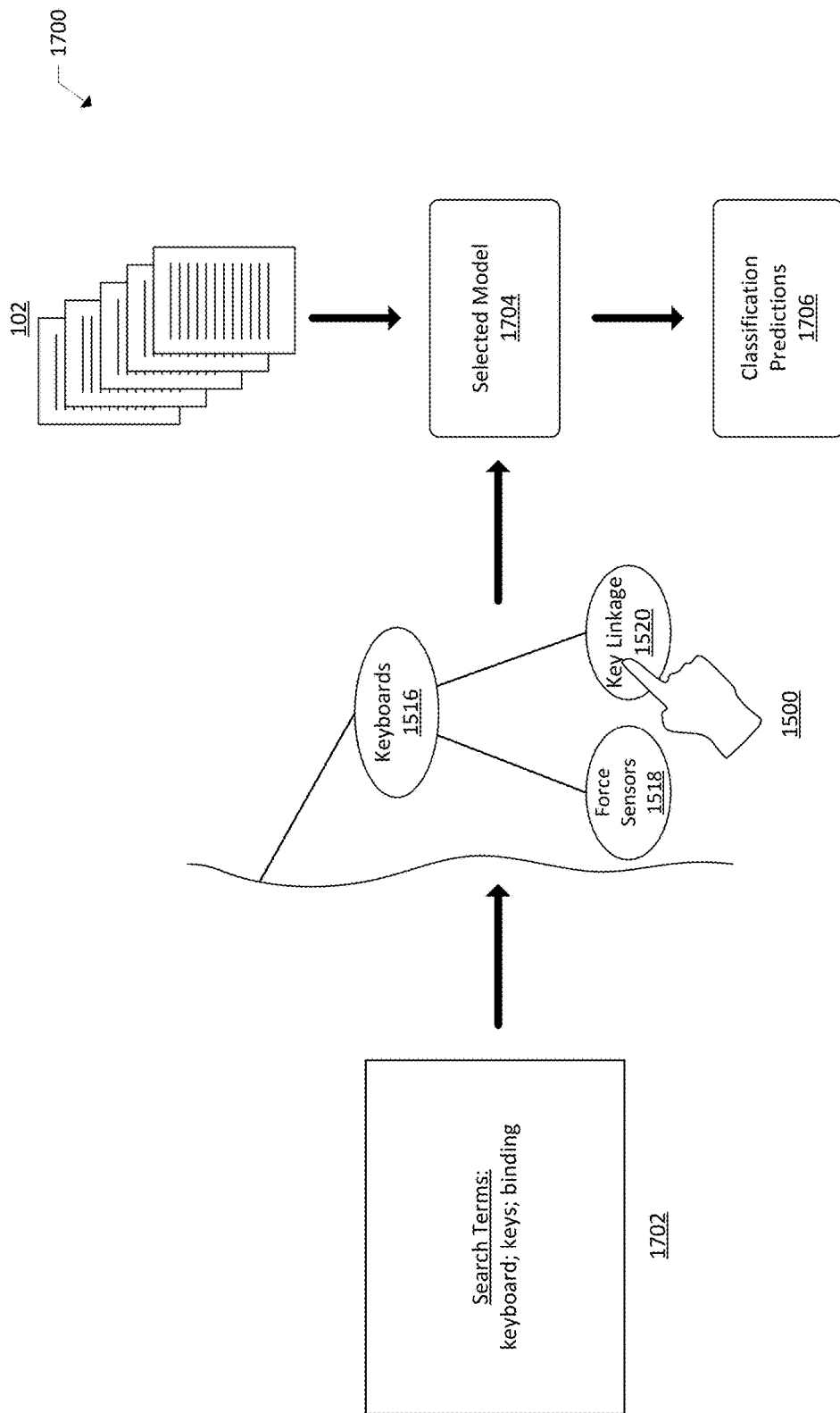
FIG. 17 illustrates a conceptual diagram of an example process for presenting at least a portion of a model taxonomy based at least in part on a user query and utilizing a selected model for document analysis.

FIG. 17 illustrates a conceptual diagram of an example process 1700 for presenting at least a portion of a model taxonomy 1500 based at least in part on a user query and utilizing a selected model for document analysis. FIG. 17 illustrates a progression, from left to right and top to bottom, of information displayed on and/or interactions with one or more user interfaces.

For example, a user interface 1702 may be generated and/or displayed to allow for user input to be received for searching the model taxonomy 1500 for models that may be utilized by a user for determining classification. The user interface 1702 may be configured to receive user input representing search terms for searching for models. These search terms may collectively be referred to as a search query. The taxonomy may be searchable and may provide functionality that allows a user to provide the search query for a model. The keywords from the search query may be utilized to identify models that may be applicable to the search query and/or to highlight "branches" of the taxonomy 1500 associated with the search query.

A user interface may be utilized to display indications of the models identified during a model search, and the user interface may be configured to receive user input indicating selection of a given model for use in determining classification of documents. The user and/or the platform may then upload the document set 102 to be analyzed and the selected model 1704 may be utilized to predict classification of individual ones of the documents 102. A user interface indicating the classification predictions 1706 as performed utilizing the selected model 1704 may be displayed as well as a confidence value associated with the accuracy of the model in determining classification. This may provide the user with an indication of whether the selected model 1704 is sufficient for analyzing the documents at issue, or whether another model should be selected, or a new model should be trained.

Figure 18:
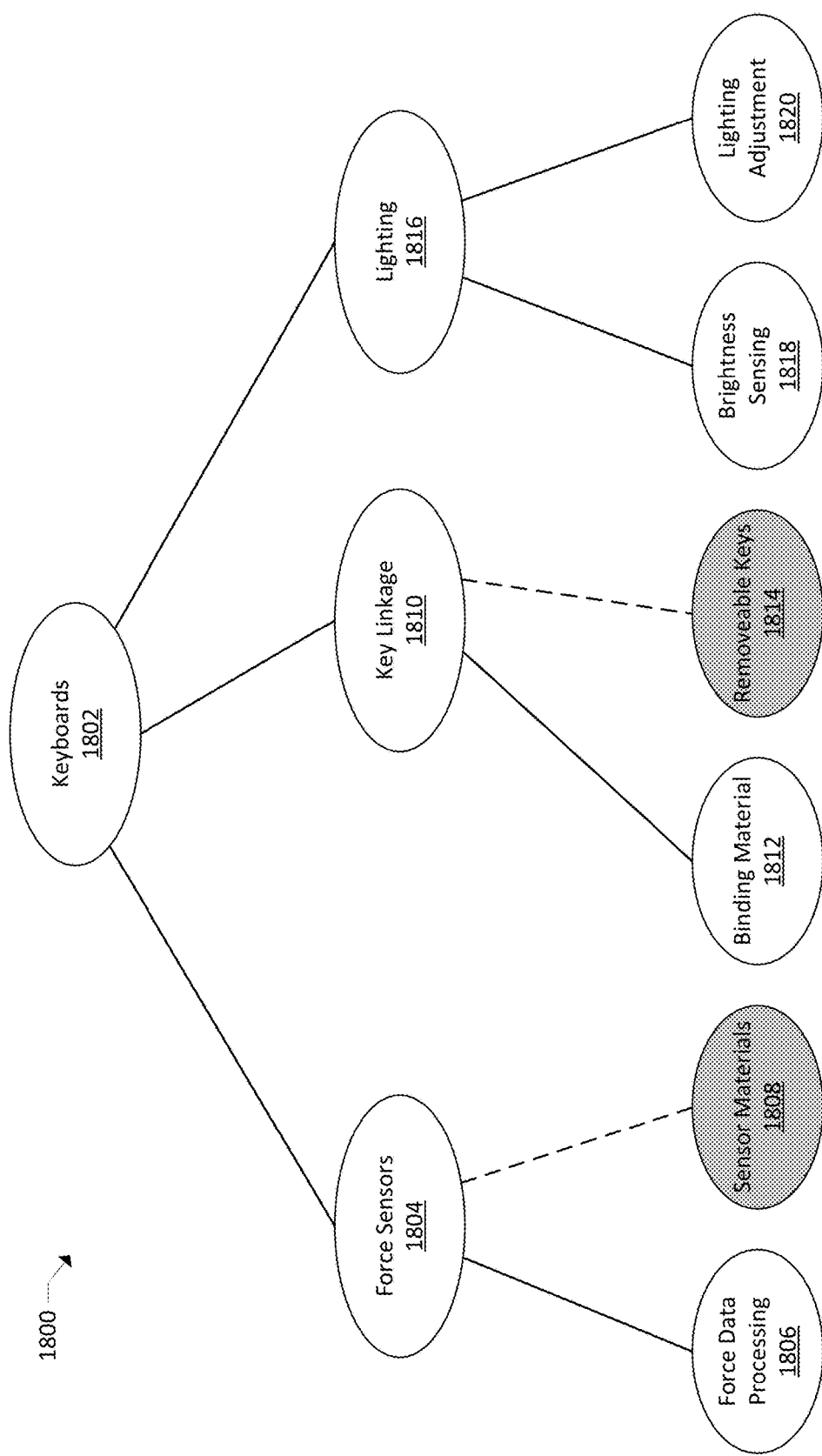
FIG. 18 illustrates a conceptual diagram of an example model taxonomy showing gaps in the taxonomy where classification models have not been trained and/or where the classification models require further training.

FIG. 18 illustrates a conceptual diagram of an example model taxonomy 1800 showing gaps in the taxonomy 1800 where classification models have not been trained and/or require further training.

For example, the model taxonomy 1800 may provide an indication of where models have not been trained for a given subject matter. For example, a "node" on the model taxonomy 1800 may be left blank or may indicate that a model has not yet been trained. With respect to FIG. 18, such an indication includes a shading of a node of the taxonomy 1800. Additionally, in examples, the line or other linkage between nodes in the taxonomy may be displayed as dashed or otherwise not complete. The nodes may be determined from the predefined classification system, such as by CPC codes. This may provide a user an indication of whether selecting an already-trained model would be preferable to training a new model. In FIG. 18, the force sensors node 1804, key linkage node 1810, and lighting node 1816 are shown as related to the keyboards node 1802. The force data processing node 1806 is not shaded, indicating that a model has been trained for this subject matter. However, the sensor materials node 1808, like the removeable keys node 1814 are displayed as shaded and dashed lines connect those nodes to the next tier of nodes in the taxonomy 1800. This may indicate that models have not been trained for that subject matter and/or that models that have been trained do not sufficiently determine classification of documents.

The model taxonomy 1800 may also provide an indication of how closely related models are on the hierarchy. This indication may be presented by way of lines between "nodes" in the taxonomy 1800, where the length of a line may indicate how closely the models are related to each other. With respect to FIG. 18, the key linkage node 1810 is displayed closer to the lighting node 1816 than to the force sensors node 1804. This may indicate that the key linkage model is more closely related to the lighting model than to the force sensors model.

In addition, when a user query for use of a model is received, the model and/or models that most closely match up with the search query may be identified. The platform may determine whether at least one of the resulting models has keywords that are sufficiently similar to the keywords in the search query. In examples where there is sufficient similarity, indicators of those models may be presented as results to the user. In examples where there is insufficient similarity, the user interface may return results indicating that no models in the model taxonomy are sufficient in light of the search query, and may request that the user perform the operations associated with training a new model.

Figure 19:
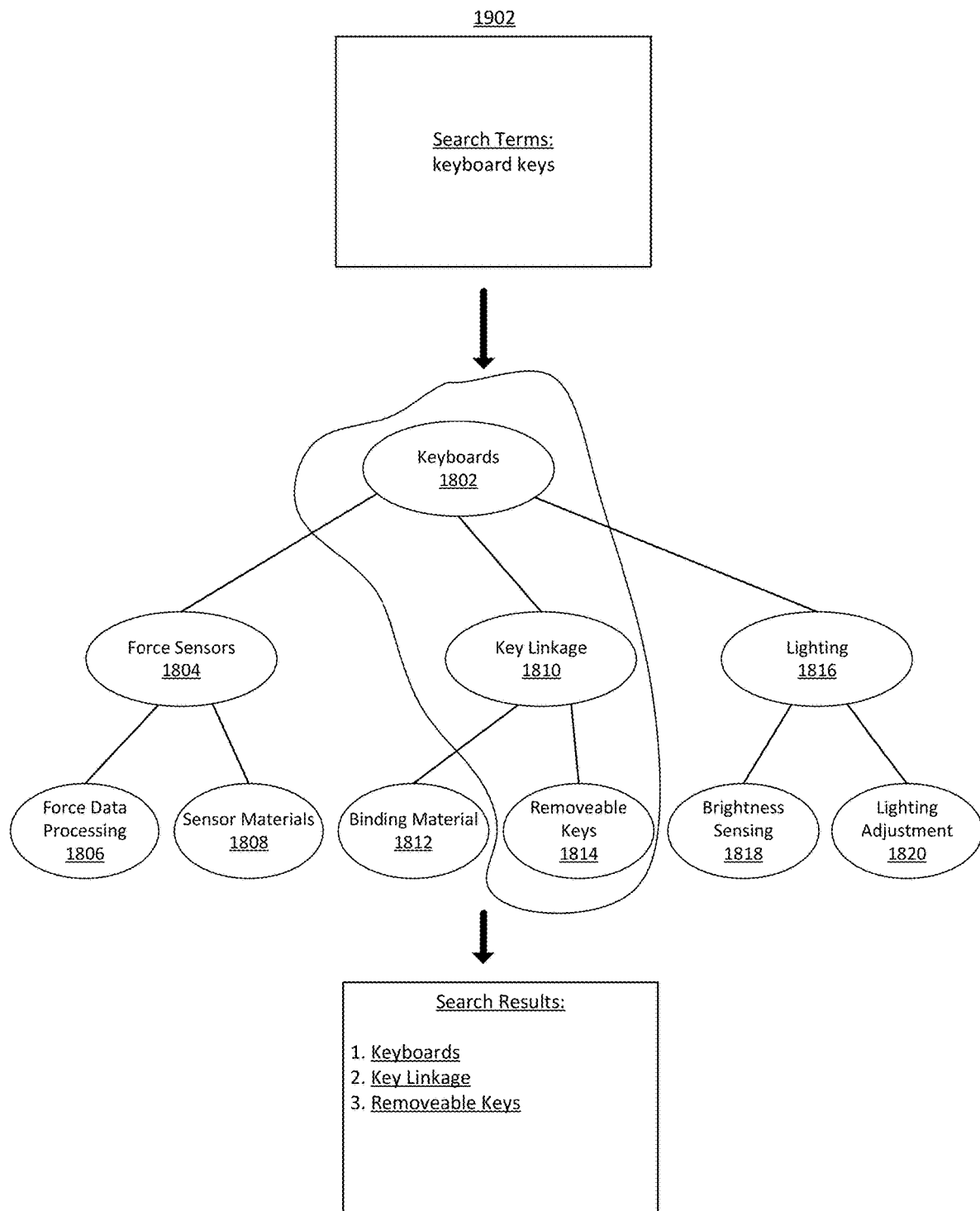
FIG. 19 illustrates a conceptual diagram of an example process for determining which models in a model taxonomy to present in response to a user query for utilizing a model.

FIG. 19 illustrates a conceptual diagram of an example process 1900 for determining which models in a model taxonomy to present in response to a user query for utilizing a model. FIG. 19 illustrates a progression, from left to right and top to bottom, of information displayed on and/or interactions with one or more user interfaces.

For example, a user interface 1902 may be generated and/or displayed to allow for user input to be received for searching the model taxonomy for models that may be utilized by a user for determining classification. The user interface 1902 may be configured to receive user input representing search terms for searching for models. These search terms may collectively be referred to as a search query. The taxonomy may be searchable and may provide functionality that allows a user to provide the search query for a model. The keywords from the search query may be utilized to identify models that may be applicable to the search query and/or to highlight "branches" of the taxonomy associated with the search query.

As shown in FIG. 19, the search query is "keyboard keys." This search query may be compared to titles of the models in the taxonomy and/or to tags associated with the models to determine which model or models may correlate to the search query. The tags may be identified via user input that includes the tags and/or may be based on keywords associated with the documents determined to be in class by the model. In FIG. 19, the "keyboard keys" search query may result in the document analysis platform identifying the "keyboards" model 1802, the "key linkage" model 1810, and the "removeable keys" model 1814 as correlating at least in part to the search query. In examples, the platform may determine that a particular model correlates to the search query, but the platform may nonetheless surface that model and other models that are linked or otherwise associated with that model as search results. For example, the model(s) in the taxonomy that are one tier higher and/or one tier lower may also be surfaced. This may allow the user to determine the level of abstraction of the model to be selected.

A user interface may be utilized to display indications of the models identified during a model search, and the user interface may be configured to receive user input indicating selection of a given model for use in determining classification of documents. The user and/or the platform may then upload a document set to be analyzed and the selected model may be utilized to predict classification of individual ones of the documents. A user interface indicating the classification predictions as performed utilizing the selected model may be displayed as well as a confidence value associated with the accuracy of the model in determining classification. This may provide the user with an indication of whether the selected model is sufficient for analyzing the documents at issue, or whether another model should be selected, or a new model should be trained.

FIGS. 20-30 illustrate processes associated with document analysis platforms. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-19, although the processes may be implemented in a wide variety of other environments, architectures and systems.

Figure 20:
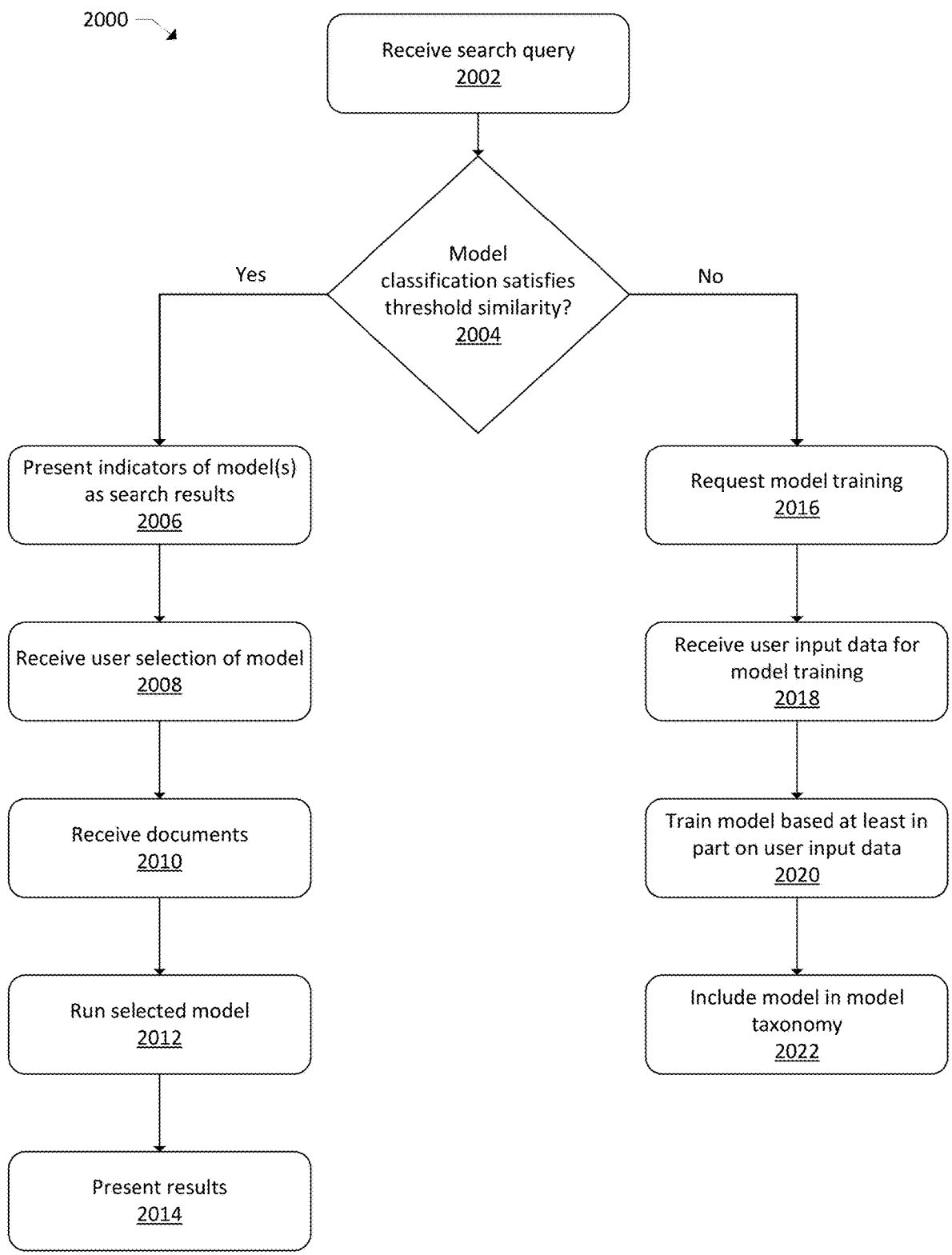
FIG. 20 illustrates a flow diagram of an example process for determining whether to utilizing a model from a model taxonomy or whether to request training of a new model.

FIG. 20 illustrates a flow diagram of an example process 2000 for determining whether to utilizing a model from a model taxonomy or whether to request training of a new model. The order in which the operations or steps are described is not intended to be construed as a limitation, and any number of the described operations may be combined in any order and/or in parallel to implement process 2000. The operations described with respect to the process 2000 are described as being performed by a client device, and/or a system associated with the document analysis platform. However, it should be understood that some or all of these operations may be performed by some or all of components, devices, and/or systems described herein.

At block 2002, the process 2000 may include receiving a search query. For example, a user interface may be generated and/or displayed to allow for user input to be received for searching the model taxonomy for models that may be utilized by a user for determining classification. The user interface may be configured to receive user input representing search terms for searching for models. These search terms may collectively be referred to as a search query. The taxonomy may be searchable and may provide functionality that allows a user to provide the search query for a model. The keywords from the search query may be utilized to identify models that may be applicable to the search query and/or to highlight "branches" of the taxonomy associated with the search query.

At block 2004, the process 2000 may include determining whether a model classification satisfies a threshold similarity to the search query. For example, when the words in the search query are keywords associated with a given model, a model classification value associated with the correlation between the search query and the subject matter the model is trained based on may be high and may satisfy a threshold similarity. In other examples, the search query may only partially correlate to the subject matter the model is trained based on. In these examples, the model classification value may not satisfy the threshold similarity to the search query.

In examples where the classification satisfies the threshold similarity, at block 2006, the process 2000 may include presenting indicators of one or more models as search results. For example, a user interface may be caused to display an indicator of the one or more models as search results. The search results may include, for example, the title of the model(s), a confidence value that the model(s) correlate to the search query, and an option to select one or more of the models for use in predicting document classification.

At block 2008, the process 2000 may include receiving a user selection of a model from the one or more models. For example, the user may provide user input via the user interface indicating that the user desires to use a given model of the search results to analyze documents.

At block 2010, the process 2000 may include receiving documents to be analyzed utilizing the selected model. For example, the user may upload documents to the document analysis platform and/or the platform may query one or more databases for the documents. Data representing the documents may be received at the platform and stored in a database for analysis.

At block 2012, the process 2000 may include running the selected model against the documents. For example, the model may determine a first similarity value of sample features to reference features indicating documents that are in class. For example, when keywords are utilized to represent documents, keywords associated with the documents labelled as in class from user input may be compared to keywords of a sample document. When those keywords correspond to each other well, or otherwise the reference documents and the sample document share keywords, particularly keywords that are heavily weighted as being in class, then the first similarity value may be high. When the keywords of the reference documents and the keywords of the sample document do not correlate well, then the first similarity value may be low. In examples where vectors are utilized, vectors associated with the documents labelled as in class from user input may be compared to a vector of a sample document. When that vector is closer in distance to vectors associated with in class documents than to out of class documents, the first similarity value may be high. The model may also determine a second similarity value of the sample features to reference features indicating documents that are out of class. Determining the second similarity value may be performed in the same or a similar manner as determining the first similarity value. However, instead of determining how closely a sample document correlates to documents determined to be in class, the second similarity value indicates how closely a sample document is correlated to documents marked out of class by user input.

The model may then determine whether the first similarity value is greater than the second similarity value. For example, the similarity values may be compared to determine which value is greater, assuming a scale where greater equates to higher confidence. In examples where the first similarity value is not greater than the second similarity value, then the model may determine that the document is out of class. The document may be marked as out of class and counted as "out" for purposes of display to a user. A confidence value, which may indicate how closely the document correlated to out of class documents labeled as such by a user may also be determined. In examples where the first similarity value is greater than the second similarity value, then the model may determine that the document is in class. The document may be marked as relevant and counted as "in" for purposes of display to a user. A confidence value, which may indicate how closely the document correlated to in class documents labeled as such as user may also be determined.

At block 2014, the process 2000 may include presenting the results. For example, the results may be presented utilizing the user interface 100 described with respect to FIGS. 1 and 4.

Returning to block 2004, in examples where the classification does not satisfy the threshold similarity, then at block 2016 the process 2000 may include requesting model training. For example, a user interface may be caused to display an indication that none of the models in the model taxonomy correlate, or correlate well enough, to the search query to be utilized for predictive purposes. The user interface may include a link or other selectable portion that, when selected, may cause the user interface to engage the model builder component to start the process of training a model.

At block 2018, the process 2000 may include receiving user input data for model training. For example, documents may be upload to the platform, and the user may provide user input for at least a portion of those documents indicating whether a given one of the documents is in class or out of class.

At block 2020, the process 200 may include training a model based at least in part on the user input data. Model training may be performed in the same or a similar manner as described elsewhere herein. For example, when keywords are utilized, the model may be trained to determine which keywords correspond to in class documents and which keywords correspond to out of class documents. When vectors are utilized, the model may be trained to determine which vectors correspond to in class documents and which vectors correspond to out of class documents.

At block 2022, the process 2000 may include including the model, as trained, in a model taxonomy. For example, based at least in part on the subject matter of the model, the model may be placed in the taxonomy. In examples, the CPC codes or other classification system may be utilized as described herein to determine whether a model should be placed in the taxonomy.

Figure 21:
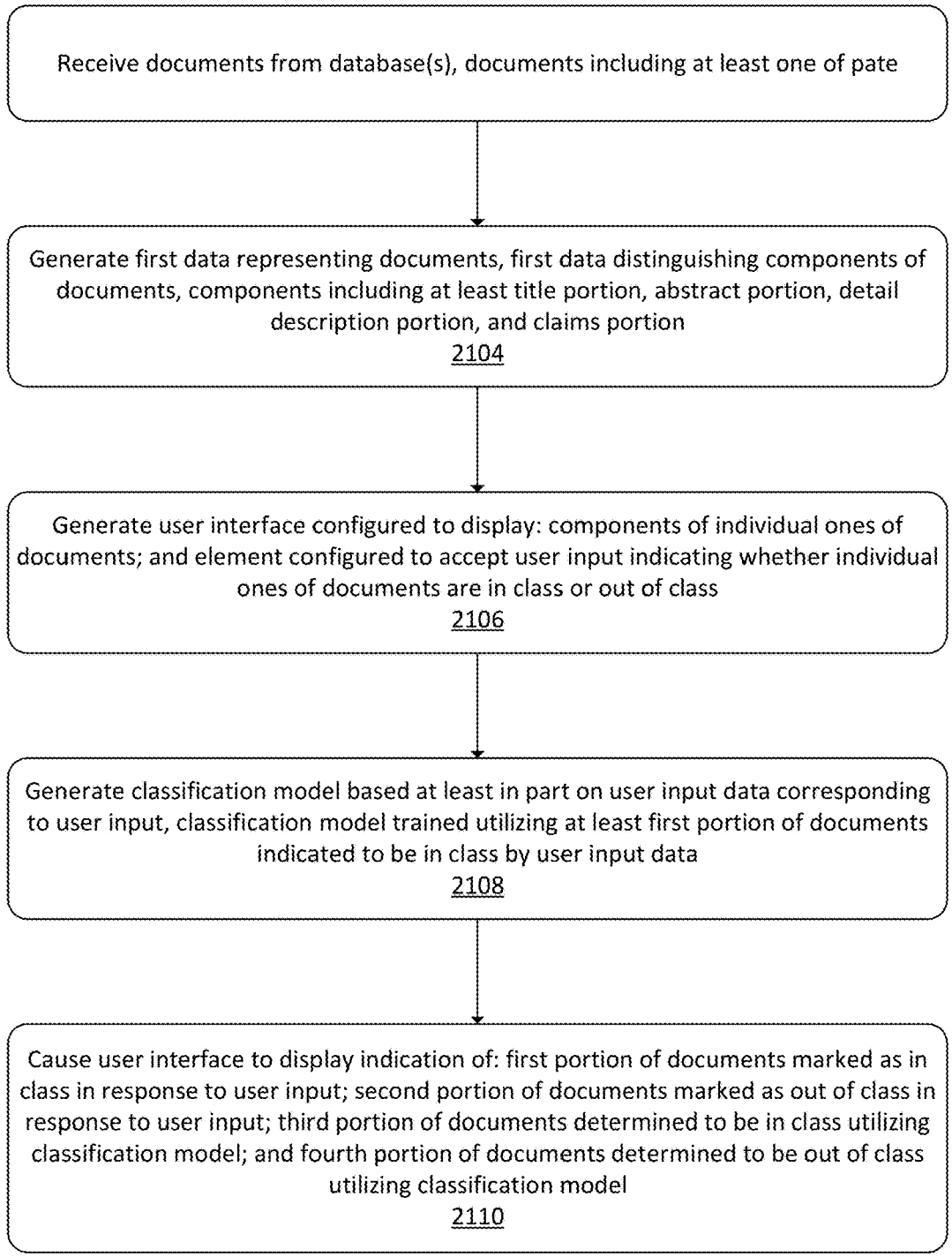
FIG. 21 illustrates a flow diagram of an example process for utilizing user input data to build classification models.

FIG. 21 illustrates a flow diagram of an example process 2100 for utilizing user input data to build classification models. The order in which the operations or steps are described is not intended to be construed as a limitation, and any number of the described operations may be combined in any order and/or in parallel to implement process 2100. The operations described with respect to the process 2100 are described as being performed by a client device, and/or a system associated with the document analysis platform. However, it should be understood that some or all of these operations may be performed by some or all of components, devices, and/or systems described herein.

At block 2102, the process 2100 may include receiving documents from one or more databases, the documents including at least one of patents or patent applications. For example, the documents may be received based at least in part on user input and/or as determined by a document analysis platform.

At block 2104, the process 2100 may include generating first data representing the documents, the first data distinguishing components of the documents, the components including at least a title portion, an abstract portion, a detailed description portion, and a claims portion. For example, when the documents are patents and patent applications, the portions of the documents, such as the abstract, title, background, detail description, claims, figures, etc. may be identified and distinguished.

At block 2106, the process 2100 may include generating a user interface configured to display: the components of individual ones of the documents; and an element configured to accept user input indicating whether the individual ones of the documents are in class or out of class. For example, the user interface may be the same or similar to the user interface 350 as described with respect to FIG. 3B.

At block 2108, the process 2100 may include generating a classification model based at least in part on user input data corresponding to the user input, the classification model trained utilizing at least a first portion of the documents indicated to be in class by the user input data. For example, the system may utilize that user input data to train a classification model such that the classification model is configured to determine whether a given document is more similar to those documents marked in class or more similar to those documents marked out of class. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

At block 2110, the process 2100 may include causing the user interface to display an indication of: the first portion of the documents marked as in class in response to the user input; a second portion of the documents marked as out of class in response to the user input; a third portion of the documents determined to be in class utilizing the classification model; and a fourth portion of the documents determined to be out of class utilizing the classification model. For example, the user interface may be the same or similar to the user interface 100 described with respect to FIGS. 1 and 4.

Additionally, or alternatively, the process 2100 may include determining a first confidence value associated with results of the classification model. The process 2100 may also include receiving second user input indicating classification of at least one document determined to be in class utilizing the classification model. The process 2100 may also include causing the classification model to be retrained based at least in part second user input data corresponding to the second user input. The process 2100 may also include determining a second confidence value associated with results of the classification model as retained. The process 2100 may also include generating a user interface indicating a trendline representing a change from the first confidence value to the second confidence value, the trendline indicating an increase or decrease in confidence associated with the use of the second user input data to retrain the classification model.

Additionally, or alternatively, the process 2100 may include receiving second user input indicating classification of at least one document determined to be in class utilizing the classification model. The process 2100 may also include causing the classification model to be retrained based at least in part second user input data corresponding to the second user input. The process 2100 may also include determining a change in a number of the third portion of the documents marked in class utilizing the in class model as retrained. The process 2100 may also include generating a user interface indicating an influence value of the second user input on output by the classification model, the influence value indicating that additional user input is one of likely to or unlikely to have a statistical impact on performance of the classification model.

Additionally, or alternatively, the process 2100 may include generating second data indicating a relationship between a first document of the documents and a second document of the documents, the relationship indicating that the first document includes at least one component that is similar to a component of the second document. The process 2100 may also include determining that the user input data indicates that the first document is in class. The process 2100 may also include determining that the second document is in class based at least in part on the second data indicating the relationship. In these examples, the first portion of the documents utilized to train the classification model may include the second document.

Figure 22:
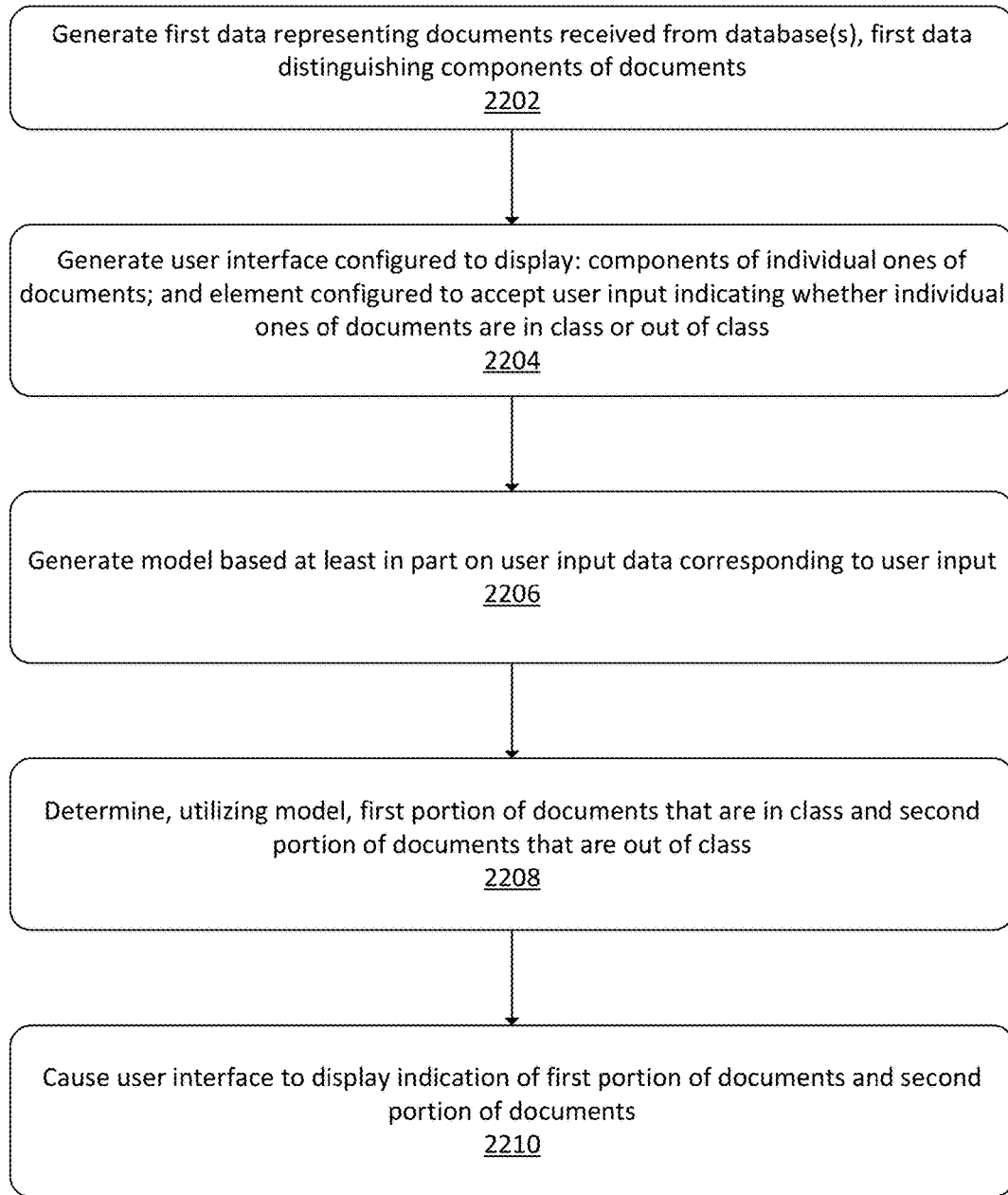
FIG. 22 illustrates a flow diagram of another example process for utilizing user input data to build classification models.

FIG. 22 illustrates a flow diagram of another example process 2200 for utilizing user input data to build classification models. The order in which the operations or steps are described is not intended to be construed as a limitation, and any number of the described operations may be combined in any order and/or in parallel to implement process 2200. The operations described with respect to the process 2200 are described as being performed by a client device, and/or a system associated with the document analysis platform.

However, it should be understood that some or all of these operations may be performed by some or all of components, devices, and/or systems described herein.

At block 2202, the process 2200 may include generating first data representing documents received from one or more databases, the first data distinguishing components of the documents. For example, when the documents are patents and patent applications, the portions of the documents, such as the abstract, title, background, detail description, claims, figures, etc. may be identified and distinguished.

At block 2204, the process 2200 may include generating a user interface configured to display: the components of individual ones of the documents; and an element configured to accept user input indicating whether the individual ones of the documents are in class or out of class. For example, the user interface may be the same or similar to the user interface 350 as described with respect to FIG. 3B.

At block 2206, the process 2200 may include generating a model based at least in part on user input data corresponding to the user input. For example, the system may utilize that user input data to train a classification model such that the classification model is configured to determine whether a given document is more similar to those documents marked in class or more similar to those documents marked out of class. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

At block 2208, the process 2200 may include determining, utilizing the model, a first portion of the documents that are in class and a second portion of the documents that are out of class. For example, when keywords are utilized, the model may determine that keywords associated with the first portion of the documents correlate to in class keywords as trained, while keywords associated with the second portion of the documents correlate to the out of class keywords as trained. When vectors are utilized, the model may determine that vectors associated with the first portion of the documents correlate to in class vectors as trained, while vectors associated with the second portion of the documents correlate to the out of class vectors as trained.

At block 2210, the process 2200 may include causing the user interface to display an indication of first portion of the documents and the second portion of the documents with respect to FIGS. 1 and 4.

Additionally, or alternatively, the process 2200 may include determining a first confidence value associated with results of the model and receiving second user input indicating classification of at least one document determined to be in class utilizing the model. The process 2200 may also include causing the model to be retrained based at least in part second user input data corresponding to the second user input. The process 2200 may also include determining a second confidence value associated with results of the model as retained and generating a user interface indicating a trendline representing a change from the first confidence value to the second confidence value.

Additionally, or alternatively, the process 2200 may include receiving second user input indicating classification of at least one document determined to be in class utilizing the model. The process 2200 may also include causing the model to be retrained based at least in part second user input data corresponding to the second user input. The process 2200 may also include determining a change in a number of the second portion of the documents determined to be in class utilizing the model as retrained. The process 2200 may also include generating a user interface indicating an influence value of the second user input on output by the model.

Additionally, or alternatively, the process 2200 may include generating second data indicating a relationship between a first document of the documents and a second document of the documents. The process 2200 may also include determining that the user input data indicates that the first document is in class and determining that the second document is in class based at least in part on the second data indicating the relationship. In these examples, generating the model may include training the model utilizing the second document.

Additionally, or alternatively, the process 2200 may include determining, for individual ones of the documents marked as in class, a confidence value indicating a degree of classification. The process 2200 may also include determining a ranking of the individual ones of the documents marked as in class based at least in part on the confidence value. The process 2200 may also include causing the user interface to display the individual ones of the documents marked as in class based at least in part on the ranking.

Additionally, or alternatively, the process 2200 may include causing display, via the user interface, of indications associated with classification of the documents. For example, the indications may include a first indication of a first number of the documents marked in class in response to user input. The indications may also include a second indication of a second number of the documents marked out of class in response to the user input. The indications may also include a third indication of a third number of the documents determined to be in class utilizing the model. The indications may also include a fourth indication of a fourth number of the documents determined to be out of class utilizing the model.

Additionally, or alternatively, the process 2200 may include causing display, via the user interface, of a number of sections. The sections may include a first section indicating first keywords determined to be statistically relevant by the model for identifying the first portion of the documents, wherein the first keywords are displayed in a manner that indicates a first ranking of statistical classification of the first keywords, wherein the first keywords are selectable via user input to be removed from the first section. The sections may also include a second section indicating second keywords determined to be statistically relevant by the model for identifying the second portion of the documents, wherein the second keywords are displayed in a manner that indicates second ranking of the statistical classification of the second keywords, wherein the second keywords are selectable via user input to be removed from the second section. The process 2200 may also include, based at least in part on receiving the user input indicating that at least one of the first keywords or the second keywords should be removed, retraining the model to account for removal of the at least one of the first keywords or the second keywords.

Additionally, or alternatively, the process 2200 may include searching, utilizing the model, one or more databases for additional documents determined to be in class by the model. The process 2200 may also include receiving an instance of the additional documents from the one or more databases. The process 2200 may also include receiving user input indicating classification of the additional documents. The process 2200 may also include retraining the model based at least in part on the user input indicating the classification of the additional documents.

Figure 23:
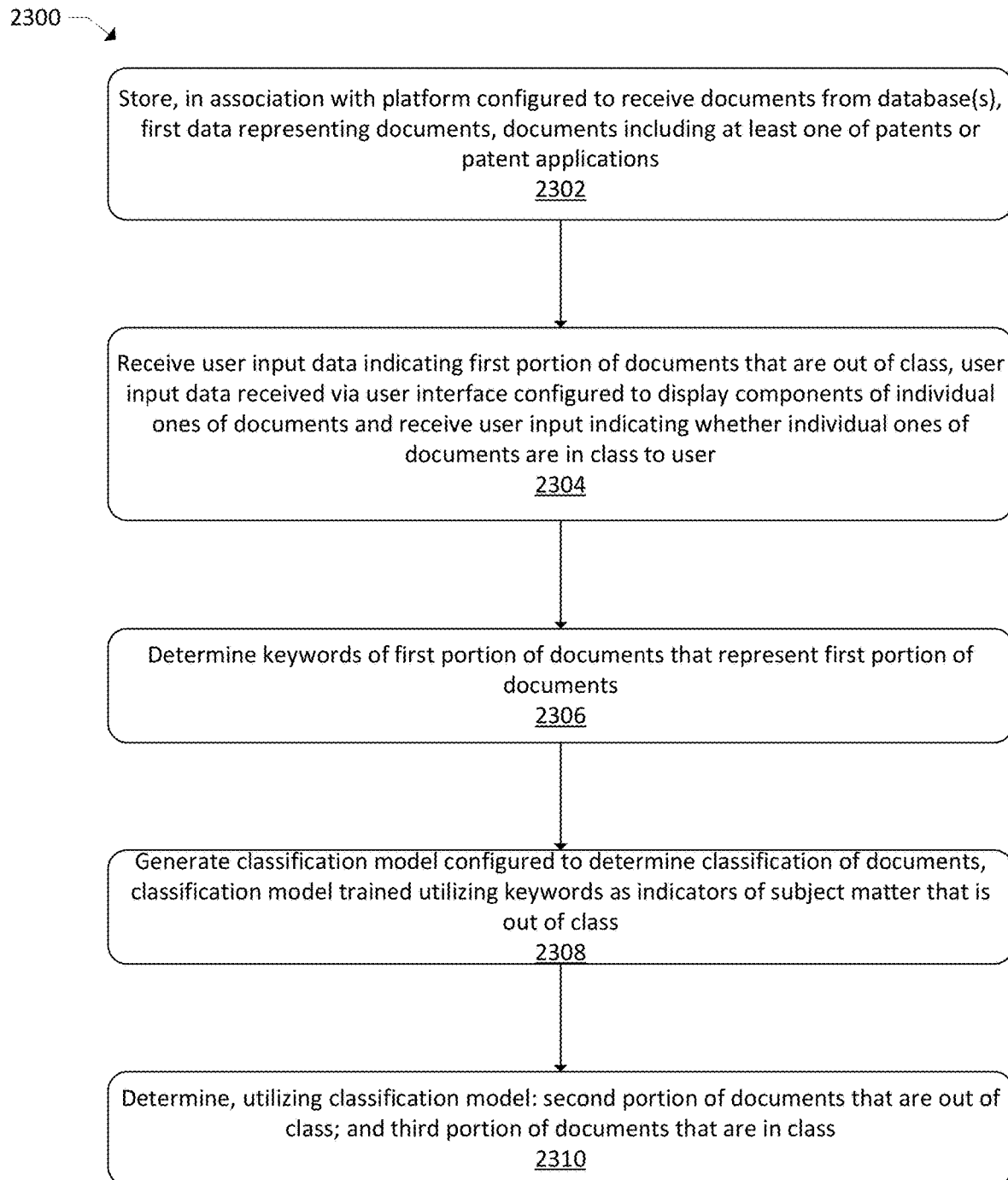
FIG. 23 illustrates a flow diagram of an example process for building classification models utilizing negative datasets.

FIG. 23 illustrates a flow diagram of an example process 2300 for building classification models utilizing negative datasets. The order in which the operations or steps are described is not intended to be construed as a limitation, and any number of the described operations may be combined in any order and/or in parallel to implement process 2300. The operations described with respect to the process 2300 are described as being performed by a client device, and/or a system associated with the document analysis platform. However, it should be understood that some or all of these operations may be performed by some or all of components, devices, and/or systems described herein.

At block 2302, the process 2300 may include storing, in association with a platform configured to receive documents from one or more databases, first data representing the documents, the documents including at least one of patents or patent applications. For example, the documents may be received based at least in part on user input and/or as determined by a document analysis platform.

At block 2304, the process 2300 may include receiving user input data indicating a first portion of the documents that are out of class, the user input data received via a user interface configured to display components of individual ones of the documents and receive user input indicating whether the individual ones of the documents are in class. For example, the user may review all or a portion of the document and provide user input indicating whether the document is in class or out of class. This may be performed utilizing a user interface such as the user interface 350 described with respect to FIG. 3B.

At block 2306, the process 2300 may include determining keywords of the first portion of the documents that represent the first portion of the documents. For example, the platform may generate a training dataset indicating the keywords associated with the documents marked out of class by a user. For example, the platform may determine one or more keywords associated with a given document that represent the subject matter of that document. This may be performed utilizing one or more document processing techniques, such as term frequency inverse document frequency techniques, for example.

At block 2308, the process 2300 may include generating a classification model configured to determine classification of the documents, the classification model trained utilizing the keywords as indicators of subject matter that is out of class. For example, the model may be trained to accept text data representing a sample document and to determine keywords representative of that sample document. Then, the model may be trained to compare those keywords to reference keywords that indicate out of class subject matter.

At block 2310, the process 2300 may include determining, utilizing the classification model: a second portion of the documents that are out of class; and a third portion of the documents that are in class. For example, the models may predict which of the documents that have not been labeled in response to user input correlate more to in class documents than to out of class documents, and vice versa.

Additionally, or alternatively, the process 2300 may include generating a tokenized version of the first portion of the documents, the tokenized version including lexical tokens representing elements of the first portion of the documents. The process 2300 may also include applying a bigram-based language model to the tokenized version of the first portion of the documents, the bigram-based language model configured to determine a bigram frequency of the lexical tokens. The process 2300 may also include selecting keywords corresponding to a portion of the lexical tokens having a high bigram frequency with respect to lexical tokens other than the portion of the lexical tokens.

Additionally, or alternatively, the process 2300 may include causing display of the keywords via the user interface, wherein the keywords are displayed in a manner that indicates a ranking of the statistical classification of the keywords. The process 2300 may also include receiving, via the user interface, user input indicating at least one of: an indication that a first keyword of the keywords should be ranked as more statistically relevant by the classification model; or an indication that a second keyword of the keywords should be ranked as less statistically relevant by the classification model. The process 2300 may also include retraining the classification model based at least in part on the user input.

Additionally, or alternatively, the process 2300 may include determining one or more categories of the first portion of the documents, the one or more categories based at least in part on predefined classification of the individual ones of the documents by a system associated with the one or more databases. The process 2300 may also include causing display of the one or more categories via the user interface and receiving, via the user interface, user input indicating a category of the one or more categories that is out of class. The process 2300 may also include identifying a set of the documents that is associated with the category and including the set of the documents in the second portion of the documents determined to be out of class.

Figure 24:
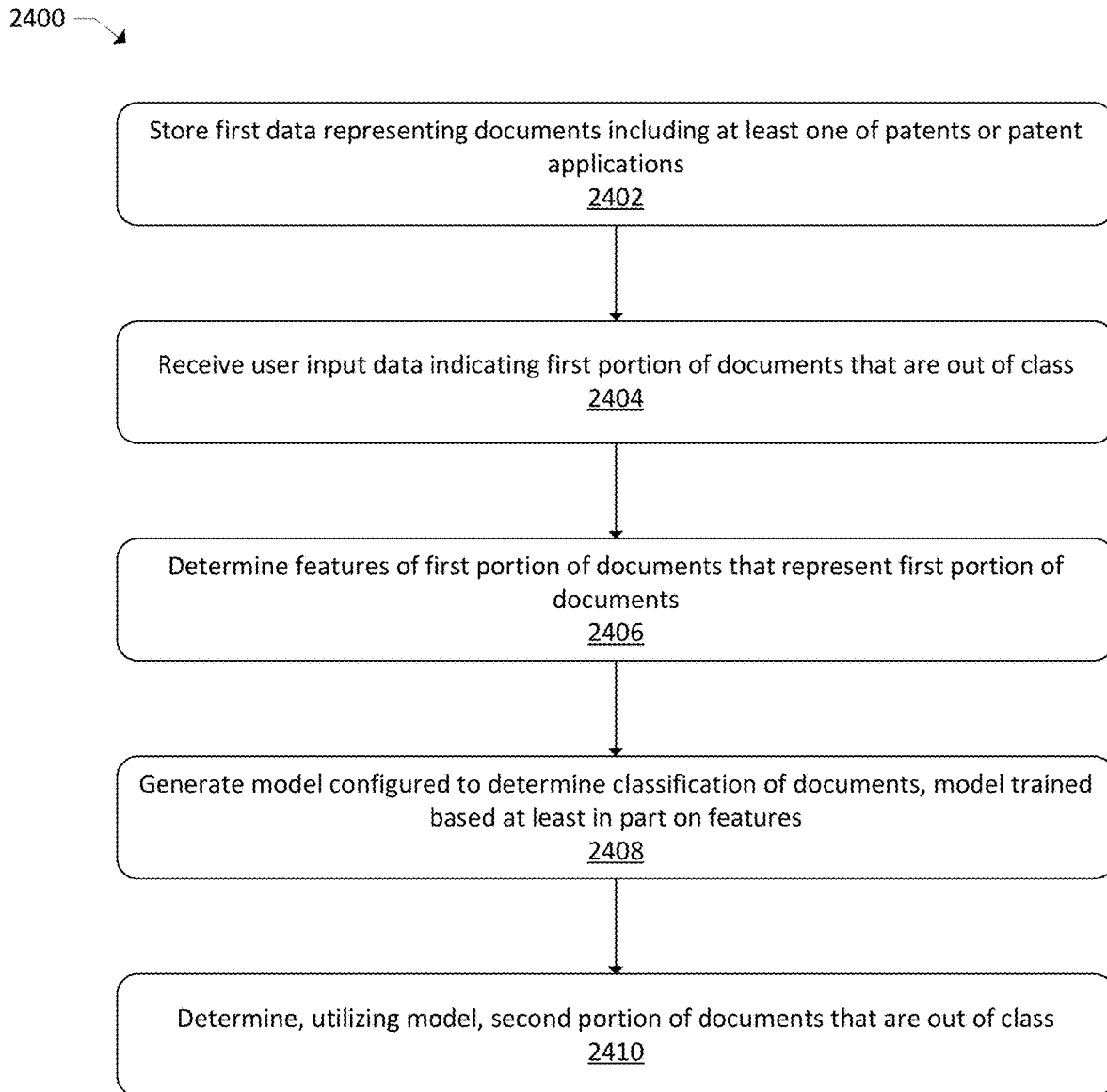
FIG. 24 illustrates a flow diagram of another example process for building classification models utilizing negative datasets.

FIG. 24 illustrates a flow diagram of another example process 2400 for building classification models utilizing negative datasets. The order in which the operations or steps are described is not intended to be construed as a limitation, and any number of the described operations may be combined in any order and/or in parallel to implement process 2400. The operations described with respect to the process 2400 are described as being performed by a client device, and/or a system associated with the document analysis platform. However, it should be understood that some or all of these operations may be performed by some or all of components, devices, and/or systems described herein.

At block 2402, the process 2400 may include storing first data representing documents including at least one of patents or patent applications. For example, the documents may be received based at least in part on user input and/or as determined by a document analysis platform.

At block 2404, the process 2400 may include receiving user input data indicating a first portion of the documents that are out of class. For example, the user may review all or a portion of the document and provide user input indicating whether the document is in class or out of class. This may be performed utilizing a user interface such as the user interface 350 described with respect to FIG. 3B.

At block 2406, the process 2400 may include determining features of the first portion of the documents that represent the first portion of the documents. For example, the features may include keywords that represent the subject matter of the documents and/or vectors that represent the subject matter of the documents.

At block 2408, the process 2400 may include generating a model configured to determine classification of the documents, the model trained based at least in part on the features. As described more fully herein, the models may be trained utilizing the features to determine whether keywords of a sample document, and/or a vector representing the sample document, more closely correlate to keywords and/or vectors of documents labeled as in class or to keywords and/or vectors of documents labeled as out of class.

At block 2410, the process 2400 may include determining, utilizing the model, a second portion of the documents that are out of class. For example, the model may be utilized to determine which of the documents have keywords and/or vectors that more closely correspond to documents labeled out of class than to documents labeled in class.

Additionally, or alternatively, the process 2400 may include generating a tokenized version of the first portion of the documents, the tokenized version including lexical tokens representing elements of the first portion of the documents. The process 2400 may also include applying a bigram-based language model to the tokenized version of the first portion of the documents, the bigram-based language model configured to determine a bigram frequency of the lexical tokens. The process 2400 may also include selecting a portion of the lexical tokens having a high bigram frequency with respect to lexical tokens other than the portion of the lexical tokens.

Additionally, or alternatively, the process 2400 may include causing display of keywords corresponding to the features in a manner that indicates a ranking of the classification of the keywords. The process 2400 may also include receiving user input indicating at least one of: an indication that a first keyword of the keywords should be ranked as more in class; or an indication that a second keyword of the keywords should be ranked as less in class. The process 2400 may also include retraining the model based at least in part on the user input.

Additionally, or alternatively, the process 2400 may include determining a category of a document in the first portion of the documents, the category based at least in part on classification of the document by a system from which the document was acquired. The process 2400 may also include receiving user input indicating the category is out of class. The process 2400 may also include identifying a set of the documents that is associated with the category and including the set of the documents in the second portion of the documents determined to be out of class.

Additionally, or alternatively, the process 2400 may include determining a set of documents identified as in class via user input data. The process 2400 may also include generating a first dataset of the first portion of the documents identified as out of class and generating a second dataset of the set of documents identified as out of class. In these examples, generating the model may comprise training the model based at least in part on the first dataset and the second dataset.

Additionally, or alternatively, the process 2400 may include determining a first correlation between the individual ones of the documents and the keywords and determining a second correlation between the individual ones of the documents and a set of documents indicated to be in class via user input. The process 2400 may also include determining that the first correlation is greater than the second correlation.

Additionally, or alternatively, the process 2400 may include causing display of the features via a user interface and receiving user input, via the user interface, indicating that a feature of the features should be marked as in class instead of out of class. The process 2400 may also include retraining the model based at least in part on the user input.

Additionally, or alternatively, the process 2400 may include determining a category of a document in the first portion of the documents, the category based at least in part on classification of the document by a system from which the document was acquired. The process 2400 may also include querying one or more databases for additional documents associated with the category. The process 2400 may also include retraining the model based at least in part on the additional documents.

Figure 25:
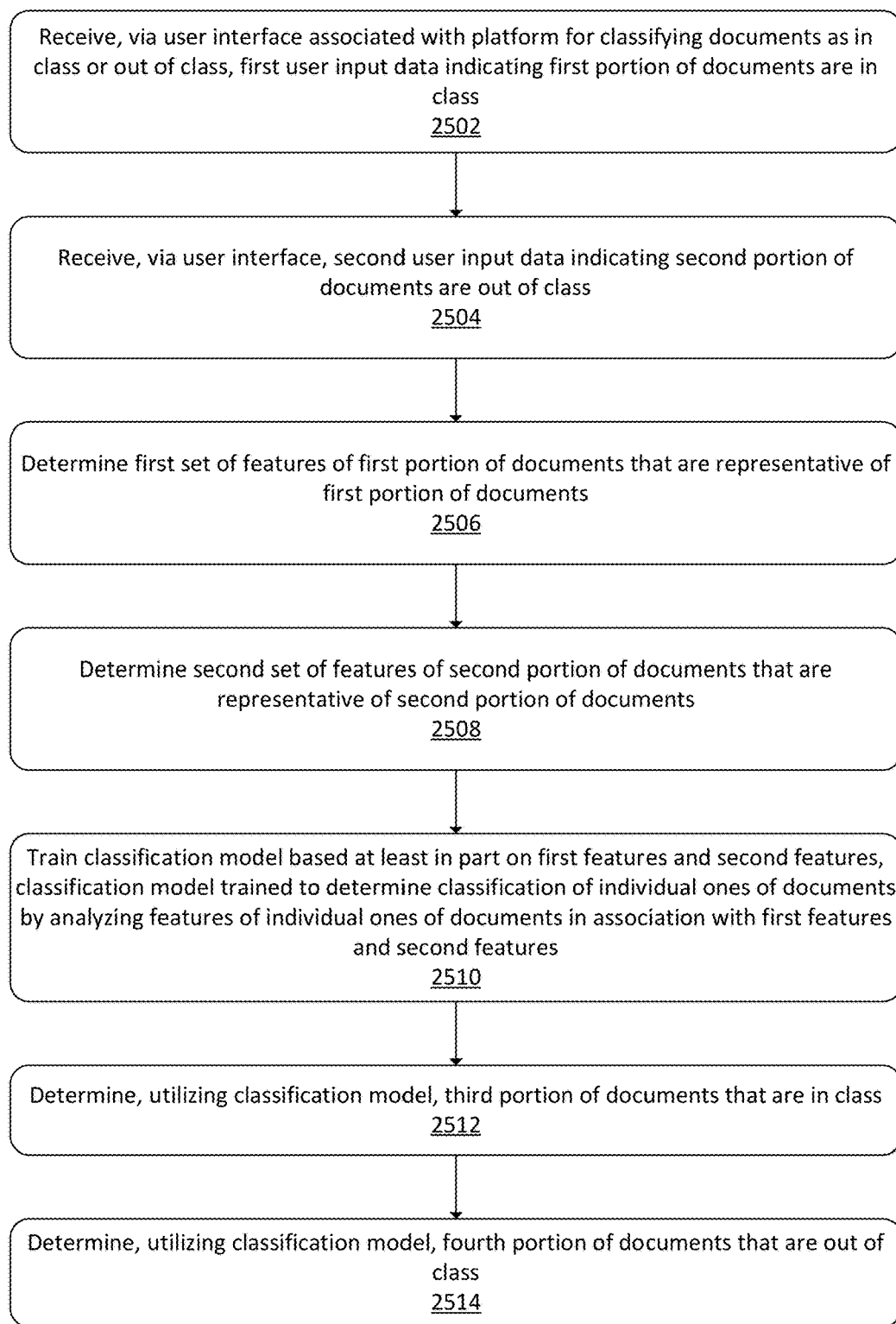
FIG. 25 illustrates a flow diagram of an example process for utilizing classification models for determining classification of example documents.

FIG. 25 illustrates a flow diagram of an example process 2500 for utilizing classification models for determining classification of example documents. The order in which the operations or steps are described is not intended to be construed as a limitation, and any number of the described operations may be combined in any order and/or in parallel to implement process 2500. The operations described with respect to the process 2500 are described as being performed by a client device, and/or a system associated with the document analysis platform. However, it should be understood that some or all of these operations may be performed by some or all of components, devices, and/or systems described herein.

At block 2502, the process 2500 may include receiving, via a user interface associated with a platform for classifying documents as in class or out of class, first user input data indicating a first portion of the documents are in class. For example, the system may receive user input data indicating in class documents and out of class documents from a subset of first documents. For example, if the first documents include 1,000 documents, the user input data may indicating classification for a subset, such as 20, of those documents. Users may utilize a user interface to provide user input, such as the user interface 350 from FIG. 3B.

At block 2504, the process 2500 may include receiving, via the user interface, second user input data indicating a second portion of the documents are out of class. This may be performed in the same or a similar manner as described with respect to block 2502, above.

At block 2506, the process 2500 may include determining a first set of features of the first portion of the documents that are representative of the first portion of the documents. For example, the platform may generate a positive training dataset indicating in class keywords associated with the documents marked in class by a user. For example, the CPC platform may determine one or more keywords associated with a given document that represent the subject matter of that document. This may be performed utilizing one or more document processing techniques, such as term frequency inverse document frequency techniques, for example. When vectors are utilized, the first set of feature may include vectors that represent documents labeled as in class.

At block 2508, the process 2500 may include determining a second set of features of the second portion of the documents that are representative of the second portion of the documents. This process may be performed in the same or a similar manner as the processes described with respect to block 2506, but with the documents labeled as out of class.

At block 2510, the process 2500 may include training a classification model based at least in part on the first features and the second features, the classification model trained to determine a classification of individual ones of the documents by analyzing features of the individual ones of the documents in association with the first features and the second features. For example, the system may utilize that user input data to train a classification model such that the classification model is configured to determine whether a given document is more similar to those documents marked in class or more similar to those documents marked out of class. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

At block 2512, the process 2500 may include determining, utilizing the classification model, a third portion of the documents that are in class. For example, the model may be utilized to determine which of the documents have keywords and/or vectors that more closely correspond to documents labeled in class than to documents labeled out of class.

At block 2514, the process 2500 may include determining, utilizing the classification model, a fourth portion of the documents that are out of class. For example, the model may be utilized to determine which of the documents have keywords and/or vectors that more closely correspond to documents labeled out of class than to documents labeled in class.

Additionally, or alternatively, the process 2500 may include determining a first confidence score that a document of the documents correlates to the first features. The process 2500 may also include determining a second confidence score that the document correlates to the second features. The process 2500 may also include determining that the first confidence score indicates more confidence than the second confidence score. The process 2500 may also include associating the document with the third portion of the documents based at least in part on the first confidence score indicating more confidence than the second confidence score.

Additionally, or alternatively, the process 2500 may include determining a document type of the documents, the document type indicating at least one of a subject matter associated with the documents, a database from which the documents were received, or a format of the documents. The process 2500 may also include selecting a base model of multiple models based at least in part on the document type, wherein the base model has been configured to generate output utilizing the document type.

Additionally, or alternatively, the process 2500 may include receiving third user input data indicating additional classification determinations associated with the documents other than the first portion of the documents. The process 2500 may also include retraining the classification model based at least in part on the third user input data. The process 2500 may also include determining a difference in the number of the documents in the third portion after utilizing the classification model as retrained. The process 2500 may also include generating a labeling influence value indicating a degree of influence on the classification model by additional user input data.

Figure 26:
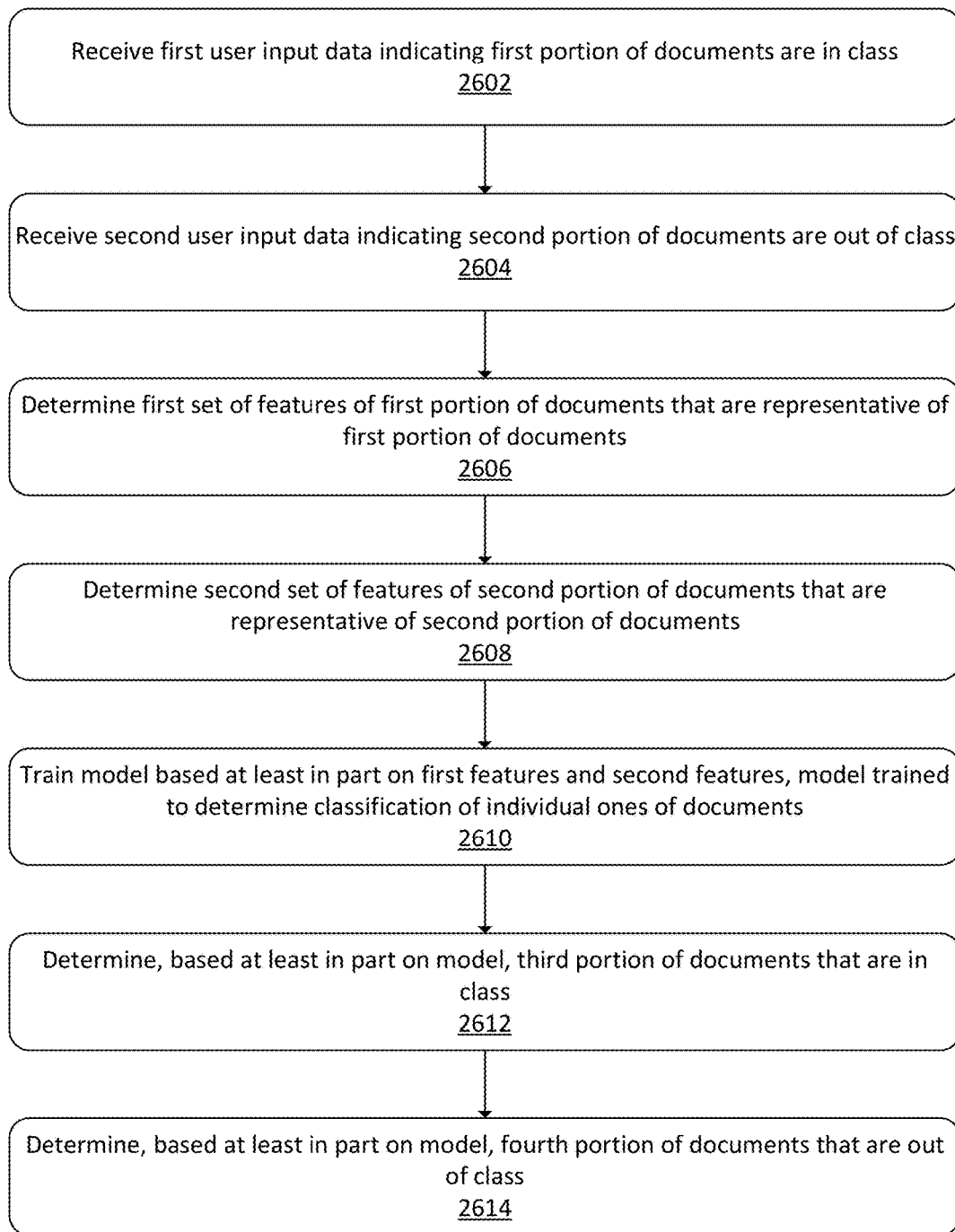
FIG. 26 illustrates a flow diagram of another example process for utilizing classification models for determining classification of example documents.

FIG. 26 illustrates a flow diagram of another example process 2600 for utilizing classification models for determining classification of example documents. The order in which the operations or steps are described is not intended to be construed as a limitation, and any number of the described operations may be combined in any order and/or in parallel to implement process 2600. The operations described with respect to the process 2600 are described as being performed by a client device, and/or a system associated with the document analysis platform. However, it should be understood that some or all of these operations may be performed by some or all of components, devices, and/or systems described herein.

At block 2602, the process 2600 may include receiving first user input data indicating a first portion of documents are in class. For example, the system may receive user input data indicating in class documents and out of class documents from a subset of first documents. For example, if the first documents include 1,000 documents, the user input data may indicating classification for a subset, such as 20, of those documents. Users may utilize a user interface to provide user input, such as the user interface 350 from FIG. 3B.

At block 2604, the process 2600 may include receiving second user input data indicating a second portion of the documents are out of class. This may be performed in the same or a similar manner as described with respect to block 2602, above, except that the user input data may be with respect to out of class documents.

At block 2606, the process 2600 may include determining a first set of features of the first portion of the documents that are representative of the first portion of the documents. For example, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. When vectors are utilized, the first set of feature may include vectors that represent documents labeled as in class.

At block 2608, the process 2600 may include determining a second set of features of the second portion of the documents that are representative of the second portion of the documents. This process may be performed in the same or a similar manner as the processes described with respect to block 2606, but with the documents labeled as out of class.

At block 2610, the process 2600 may include training a model based at least in part on the first features and the second features, the model trained to determine a classification of individual ones of the documents. For example, the system may utilize that user input data to train a classification model such that the classification model is configured to determine whether a given document is more similar to those documents marked in class or more similar to those documents marked out of class. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

At block 2612, the process 2600 may include determining, based at least in part on the model, a third portion of the documents that are in class. For example, the model may be utilized to determine which of the documents have keywords and/or vectors that more closely correspond to documents labeled in class than to documents labeled out of class.

At block 2614, the process 2600 may include determining, based at least in part on the model, a fourth portion of the documents that are out of class. For example, the model may be utilized to determine which of the documents have keywords and/or vectors that more closely correspond to documents labeled out of class than to documents labeled in class.

Additionally, or alternatively, the process 2600 may include determining that a document of the documents correlates to the first features more than the second features. The process 2600 may also include associating the document with the third portion of the documents based at least in part on the document correlating to the first features more than the second features.

Additionally, or alternatively, the process 2600 may include determining a document type of the documents. The process 2600 may also include selecting a base model of multiple models based at least in part on the document type, wherein the base model has been configured to generate output utilizing the document type.

Additionally, or alternatively, the process 2600 may include receive third user input data indicating additional classification determinations associated with the documents other than the first portion of the documents. The process 2600 may also include retraining the model based at least in part on the third user input data. The process 2600 may also include determining a difference in the number of the documents in the third portion after utilizing the model as retrained. The process 2600 may also include generating a labeling influence value indicating a degree of influence on the model by additional user input data.

Additionally, or alternatively, the process 2600 may include determining, for individual ones of the first portion of the documents, a first vector representing the first features. The process 2600 may also include determining, for individual ones of the second portion of the documents, a second vector representing the second features. The process 2600 may also include determining that a document of the documents is associated with the third portion of the documents based at least in part on a third vector representing the document being associated with the first vector more than the second vector.

Additionally, or alternatively, the process 2600 may include identifying additional documents that differ from the documents. The process 2600 may also include determining a classification of individual ones of the additional documents utilizing the model. The process 2600 may also include determining a confidence value indicating performance of the model for determining the classification of the individual ones of the additional documents. The process 2600 may also include determining that the model has been trained successfully based at least in part on the confidence value satisfying a threshold confidence value.

Additionally, or alternatively, the process 2600 may include causing display of keywords representing the first features via a user interface. The process 2600 may also include receiving user input, via the user interface, indicating that a set of documents associated with a keyword of the keywords should be marked as in class instead of out of class. The process 2600 may also include retraining the model based at least in part on the user input.

Additionally, or alternatively, the process 2600 may include receiving third user input data indicating classification of a document associated with the third portion of the documents, the third user input data indicating that the document is out of class. The process 2600 may also include determining third features representing the document. The process 2600 may also include retraining the model based at least in part on the third features.

FIG. 27 illustrates a flow diagram of an example process 2700 for building model taxonomies. The order in which the operations or steps are described is not intended to be construed as a limitation, and any number of the described operations may be combined in any order and/or in parallel to implement process 2700. The operations described with respect to the process 2700 are described as being performed by a client device, and/or a system associated with the document analysis platform. However, it should be understood that some or all of these operations may be performed by some or all of components, devices, and/or systems described herein.

At block 2702, the process 2700 may include generating classification models configured to identify a document of multiple documents as in class or out of class, the classification models trained utilizing user input data indicating a first portion of the documents as in class and a second portion of the documents as out of class, wherein the documents include patents and patent applications. For example, the system may utilize that user input data to train a classification model such that the classification model is configured to determine whether a given document is more similar to those documents marked in class or more similar to those documents marked out of class. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

At block 2704, the process 2700 may include determining, for individual ones of the classification models, a technology category and one or more subcategories associated with the individual ones of the classification models, the technology category and the one or more subcategories associated with a classification system associated with the multiple documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter. The CPC codes for a given document may be identified and the categories associated with those codes may be determined.

At block 2706, the process 2700 may include generating a taxonomy of the classification models, the taxonomy indicating categorical relationships between the classification models, generating the taxonomy based at least in part on the technology category and the one or more subcategories associated with the individual ones of the classification models. For example, the taxonomy may include nodes representing the models and linkages between the nodes representing relationships between the models.

Additionally, or alternatively, the process 2700 may include determining a code associated with individual ones of the documents, the code associated with the individual ones of the documents based at least in part on a codification system associated with the documents. The process 2700 may also include determining a first portion of the code associated with the technology category. The process 2700 may also include determining a second portion of the code associated with the one or more subcategories. The process 2700 may also include determining a tier of the taxonomy to associate the individual ones of the classification models based at least in part on the technology category and the one or more subcategories.

Additionally, or alternatively, the process 2700 may include determining that a first classification model of the classification models is associated with a first node of the taxonomy. The process 2700 may also include determining that a second classification model of the classification models is associated with a second node of the taxonomy. The process 2700 may also include determining that the first node and the second node are linked in the taxonomy and generating an indication that the first classification model is related to the second classification model based at least in part on the first node and the second node being linked in the taxonomy.

Additionally, or alternatively, the process 2700 may include receiving, for a classification model of the classification models, a first training dataset configured to train the classification model to determine which of the documents are in class. The process 2700 may also include receiving an indication that a portion of the first training dataset includes confidential information. The process 2700 may also include generating a modified classification model corresponding to the classification model trained without the portion of the first training dataset that includes the confidential information. In these examples, generating the taxonomy by utilizing the modified classification model instead of the classification model.

Figure 28:
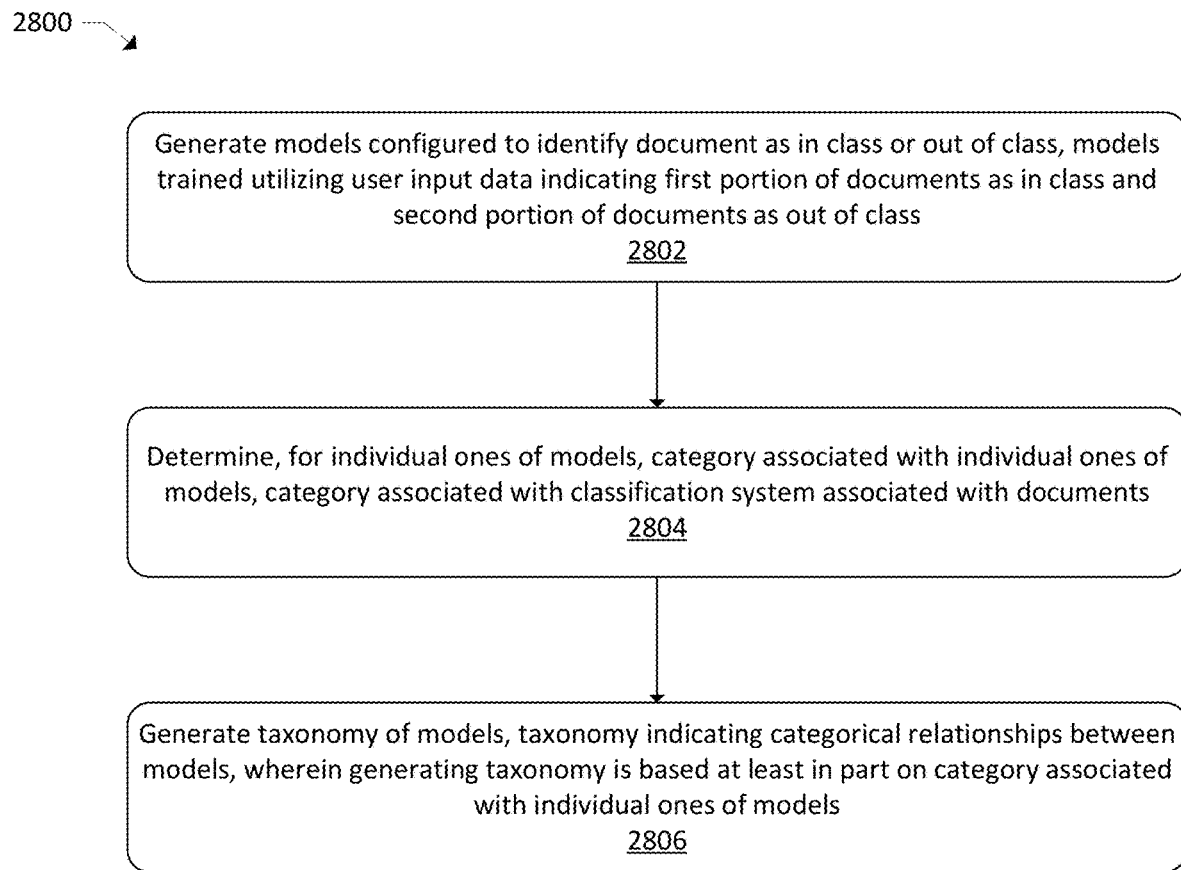
FIG. 28 illustrates a flow diagram of another example process for utilizing model taxonomies.

FIG. 28 illustrates a flow diagram of another example process 2800 for utilizing model taxonomies. The order in which the operations or steps are described is not intended to be construed as a limitation, and any number of the described operations may be combined in any order and/or in parallel to implement process 2800. The operations described with respect to the process 2800 are described as being performed by a client device, and/or a system associated with the document analysis platform. However, it should be understood that some or all of these operations may be performed by some or all of components, devices, and/or systems described herein.

At block 2802, the process 2800 may include generating models configured to identify a document as in class or out of class, the models trained utilizing user input data indicating a first portion of documents as in class and a second portion of documents as out of class. For example, the system may utilize that user input data to train a classification model such that the classification model is configured to determine whether a given document is more similar to those documents marked in class or more similar to those documents marked out of class. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

At block 2804, the process 2800 may include determining, for individual ones of the models, a category associated with individual ones of the models, the category associated with a classification system associated with the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter. The CPC codes for a given document may be identified and the categories associated with those codes may be determined.

At block 2806, the process 2800 may include generating a taxonomy of the models, the taxonomy indicating categorical relationships between the models, wherein generating the taxonomy is based at least in part on the category associated with the individual ones of the models. For example, the taxonomy may include nodes representing the models and linkages between the nodes representing relationships between the models.

Additionally, or alternatively, the process 2800 may include determining a classifier associated with individual ones of the documents, the classifier based at least in part on a classification system that utilizes the documents. The process 2800 may also include determining the category based at least in part on the classifier. The process 2800 may also include determining a tier of the taxonomy to associate the individual ones of the classification models based at least in part on the category.

Additionally, or alternatively, the process 2800 may include determining that a first model of the models is associated with a first node of the taxonomy. The process 2800 may also include determining that a second model of the models is associated with a second node of the taxonomy. The process 2800 may also include determining that the first node and the second node are linked in the taxonomy. The process 2800 may also include generating an indication that the first model is related to the second model based at least in part on the first node and the second node being linked in the taxonomy.

Additionally, or alternatively, the process 2800 may include receiving, for a model of the models, a training dataset configured to train the model to determine which of the documents are in class to the model. The process 2800 may also include receiving an indication that a portion of the training dataset includes confidential information. The process 2800 may also include generating a modified model corresponding to the model trained without the portion of the training dataset that includes the confidential information. In these examples, generating the taxonomy may include generating the taxonomy based at least in part on the modified model.

Additionally, or alternatively, the process 2800 may include receiving data indicating a restriction associated with the user input data for a model of the models and determining that the restriction is user specific. The process 2800 may also include determining, based at least in part on the restriction being user specific, a portion of a training dataset configured to train the model that is associated with the restriction. The process 2800 may also include generating a modified model corresponding to the model trained without the portion of the training dataset.

Additionally, or alternatively, the process 2800 may include receiving request data for use of at least one of the classification models for determining classification of a set of documents, the request data indicating keywords associated with the set of documents. The process 2800 may also include determining a category of multiple categories associated with the keywords and selecting a model of the models based at least in part on the category. The process 2800 may also include determining a portion of the set of documents that are in class utilizing the model.

Additionally, or alternatively, the process 2800 may include determining, based at least in part on classifiers associated with a classification system, that the models are not associated with a classifier of the classifiers. The process 2800 may also include determining a technology category associated with classifier. The process 2800 may also include generating an indication that the models do not include a model associated with the technology category.

Additionally, or alternatively, the process 2800 may include determining first features representing a first model of the models and determining second features representing a second model of the models. The process 2800 may also include determining a similarity value of the first features to the second features. The process 2800 may also include associating the first model with the second model in the taxonomy based at least in part on the similarity value.

Figure 29:
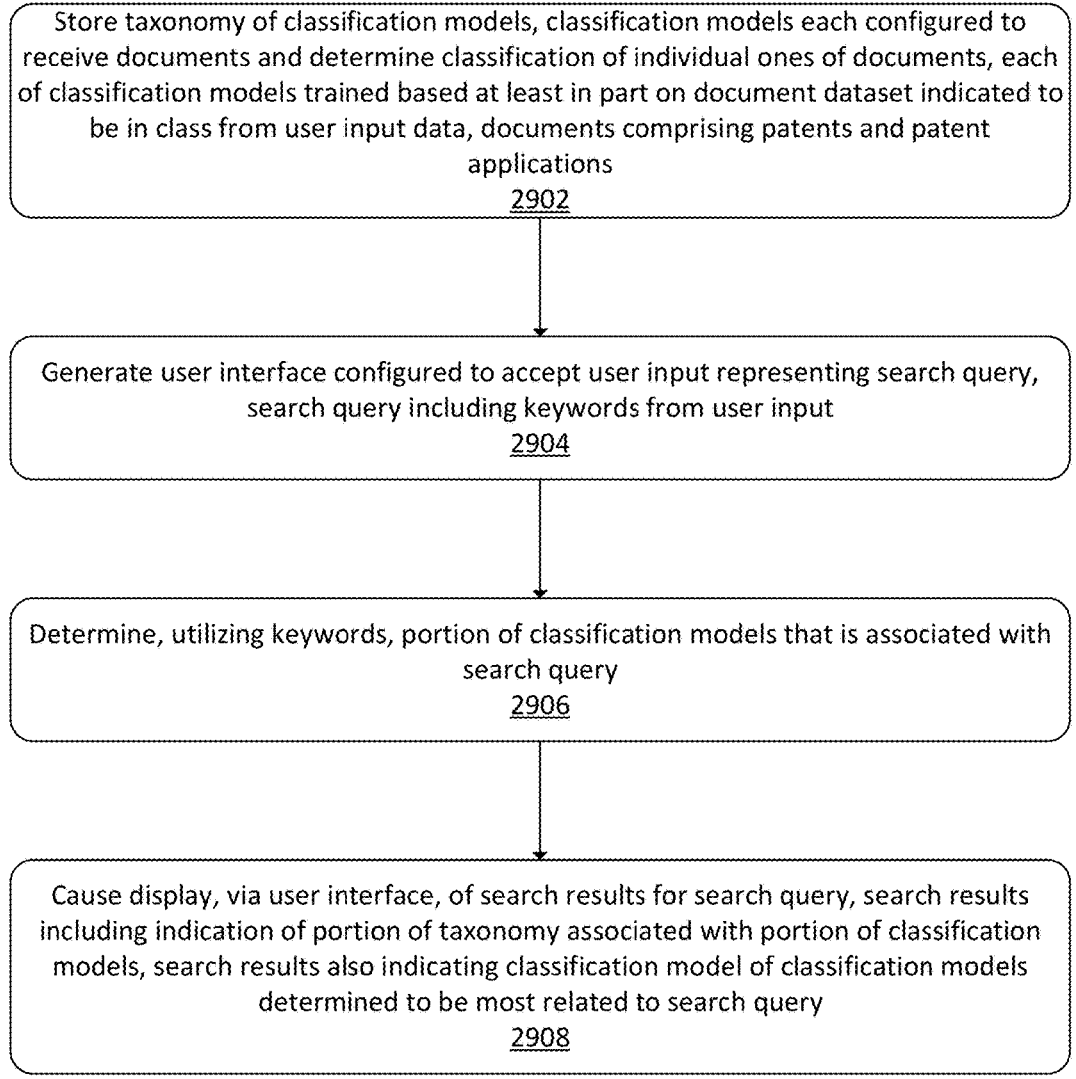
FIG. 29 illustrates a flow diagram of an example process for searching classification models using taxonomies.

FIG. 29 illustrates a flow diagram of an example process 2900 for searching classification models using taxonomies. The order in which the operations or steps are described is not intended to be construed as a limitation, and any number of the described operations may be combined in any order and/or in parallel to implement process 2900. The operations described with respect to the process 2900 are described as being performed by a client device, and/or a system associated with the document analysis platform. However, it should be understood that some or all of these operations may be performed by some or all of components, devices, and/or systems described herein.

At block 2902, the process 2900 may include storing a taxonomy of classification models, the classification models each configured to receive documents and determine a classification of individual ones of the documents, each of the classification models trained based at least in part on a document dataset indicated to be in class from user input data, the documents comprising patents and patent applications. For example, once classification models are trained such that the models are determined to accurately predict classification as trained, the models may be placed in a model taxonomy. The model taxonomy may represent a taxonomy tree or otherwise a model hierarchy indicating relationships between models and/or a level of specificity associated with the models. This taxonomy may be searchable and may provide functionality that allows a user to provide a search query for a model. The keywords from the search query may be utilized to identify models that may be applicable to the search query and/or to highlight "branches" of the taxonomy associated with the search query.

The models in the model taxonomy may be linked to each other in one or more ways. For example, when the subject matter of one model is related to the subject matter of another model, those models may be linked in the taxonomy. In some examples, the nodes of the taxonomy representing the models may be determined utilizing a predefined subject matter classification system, such as the CPC system described herein.

At block 2904, the process 2900 may include generating a user interface configured to accept user input representing a search query, the search query including keywords from the user input. For example, the user interface may have one or more input fields configured to receive user input, such as text and/or audio representing the keywords to be searched for.

At block 2906, the process 2900 may include determining, utilizing the keywords, a portion of the classification models that is associated with the search query. For example, in examples where the models are represented by keywords, those reference keywords may be compared to the keywords from the search query to determine a correlation between the search query keywords and the reference keywords. For those models with a high correlation and/or a best correlation as compared to other models, those models may be identified as responsive to the search query. Additionally, models that are related to the highly-correlative models may, in examples, also be determined.

At block 2908, the process 2900 may include causing display, via the user interface, of search results for the search query, the search results including an indication of a portion of the taxonomy associated with the portion of the classification models, the search results also indicating a classification model of the classification models determined to be most related to the search query. For example, the user interface may be utilized to display indications of the models identified during a model search, and the user interface may be configured to receive user input indicating selection of a given model for use in determining classification of documents. The user and/or the platform may then upload the document set to be analyzed and the selected model may be utilized to predict classification of individual ones of the documents. A user interface indicating the classification predictions as performed utilizing the selected model may be displayed as well as a confidence value associated with the accuracy of the model in determining classification. This may provide the user with an indication of whether the selected model is sufficient for analyzing the documents at issue, or whether another model should be selected, or a new model should be trained.

Additionally, or alternatively, the process 2900 may include storing, in association with individual ones of the classification models, reference keywords representing how the individual ones of the classification models have been trained to determine classification. The process 2900 may also include determining a similarity value between the keywords associated with the search query and the reference keywords. The process 2900 may also include determining the first classification model that is most related to the search query based at least in part on the similarity value. The process 2900 may also include determining a tier of the taxonomy associated with the first classification model. In these examples, the search results include: a second classification model associated with a second tier of the taxonomy, the second tier indicating a broader technological category than the first tier; and a third classification model associated with a third tier of the taxonomy, the third tier indicating a more specific technological category than the first tier.

Additionally, or alternatively, the process 2900 may include receiving, via the user interface, user input data indicating selection of the classification model. The process 2900 may include causing display of a request for sample documents for input into the classification model. The process 2900 may include receiving document data corresponding to the sample documents. The process 2900 may also include determining, utilizing the classification model, a first portion of the sample documents determined to be in class. The process 2900 may also include determining, utilizing the classification model, a second portion of the sample documents determined to be in class. The process 2900 may also include causing displaying, via the user interface, of: a first indication of the first portion of the sample documents; a second indication of the second portion of the sample documents; and a third indication of a confidence value that the classification model accurately determined the first portion and the second portion.

Additionally, or alternatively, the process 2900 may include receiving, via the user interface, user input data indicating selection of the classification model. The process 2900 may also include causing display of a request for sample documents for input into the classification model. The process 2900 may also include receiving document data corresponding to the sample documents. The process 2900 may also include determining, utilizing output of the classification model indicating classification of individual ones of the sample documents, a ranking of the sample documents. The process 2900 may also include causing display of at least an indication of the sample documents in an order corresponding to the ranking.

FIG. 30 illustrates a flow diagram of another example process 3000 for searching classification models using taxonomies. The order in which the operations or steps are described is not intended to be construed as a limitation, and any number of the described operations may be combined in any order and/or in parallel to implement process 3000. The operations described with respect to the process 3000 are described as being performed by a client device, and/or a system associated with the document analysis platform. However, it should be understood that some or all of these operations may be performed by some or all of components, devices, and/or systems described herein.

At block 3002, the process 3000 may include storing a taxonomy of models trained to determine a classification of individual ones of documents, individual ones of the models trained based at least in part on a document dataset indicated to be in class at least in part from first user input data. For example, once classification models are trained such that the models are determined to accurately predict classification as trained, the models may be placed in a model taxonomy. The model taxonomy may represent a taxonomy tree or otherwise a model hierarchy indicating relationships between models and/or a level of specificity associated with the models. This taxonomy may be searchable and may provide functionality that allows a user to provide a search query for a model. The keywords from the search query may be utilized to identify models that may be applicable to the search query and/or to highlight "branches" of the taxonomy associated with the search query.

The models in the model taxonomy may be linked to each other in one or more ways. For example, when the subject matter of one model is related to the subject matter of another model, those models may be linked in the taxonomy. In some examples, the nodes of the taxonomy representing the models may be determined utilizing a predefined subject matter classification system, such as the CPC system described herein.

At block 3004, the process 3000 may include receiving second user input data representing a search query. For example, a user interface may have one or more input fields configured to receive user input, such as text and/or audio representing the keywords to be searched for.

At block 3006, the process 3000 may include determining a portion of the models that are associated with the search query. For example, in examples where the models are represented by keywords, those reference keywords may be compared to the keywords from the search query to determine a correlation between the search query keywords and the reference keywords. For those models with a high correlation and/or a best correlation as compared to other models, those models may be identified as responsive to the search query. Additionally, models that are related to the highly-correlative models may, in examples, also be determined.

At block 3008, the process 3000 may include causing display of search results for the search query, the search results indicating a portion of the taxonomy associated with the portion of the models. For example, the user interface may be utilized to display indications of the models identified during a model search, and the user interface may be configured to receive user input indicating selection of a given model for use in determining classification of documents. The user and/or the platform may then upload the document set to be analyzed and the selected model may be utilized to predict classification of individual ones of the documents. A user interface indicating the classification predictions as performed utilizing the selected model may be displayed as well as a confidence value associated with the accuracy of the model in determining classification. This may provide the user with an indication of whether the selected model is sufficient for analyzing the documents at issue, or whether another model should be selected, or a new model should be trained.

Additionally, or alternatively, the process 3000 may include storing, in association with the individual ones of the models, a reference representation of the individual ones of the models. The process 3000 may also include determining a similarity value between a sample representation of the search query and the reference representation. The process 3000 may also include determining a first model that is most related to the search query based at least in part on the similarity value. The process 3000 may also include determining a tier of the taxonomy associated with the first model. In these examples, the search results include the first model and at least one of: a second model associated with a second tier of the taxonomy, the second tier indicating a broader technological category than the first tier; or a third model associated with a third tier of the taxonomy, the third tier indicating a more specific technological category than the first tier.

Additionally, or alternatively, the process 3000 may include receiving user input data indicating selection of a model of the portion of the models. The process 3000 may also include causing display of a request for sample documents for input into the model. The process 3000 may also include receiving document data corresponding to the sample documents. The process 3000 may also include determining, utilizing the model, a first portion of the sample documents determined to be in class and determining, utilizing the model, a second portion of the sample documents determined to be in class. The process 3000 may also include causing displaying of: a first indication of the first portion of the sample documents; a second indication of the second portion of the sample documents; and a third indication of a confidence value that the model accurately determined the first portion and the second portion.

Additionally, or alternatively, the process 3000 may include receiving user input data indicating selection of the model. The process 3000 may also include causing display of a request for sample documents for input into the model and receiving document data corresponding to the sample documents. The process 3000 may also include determining, utilizing output of the model indicating classification of individual ones of the sample documents, a ranking of the sample documents. The process 3000 may also include causing display of at least an indication of the sample documents in an order corresponding to the ranking.

Additionally, or alternatively, the process 3000 may include storing, in association with the individual ones of the models, a reference purpose of the individual ones of the models, the reference purpose indicating by user input associated with training the individual ones of the models. The process 3000 may also include determining a similarity value between a sample purpose indicated in the search query and the reference purpose. The process 3000 may also include determining a model that is most related to the search query based at least in part on the similarity value. In these examples, the search results may indicate the model.

Additionally, or alternatively, the process 3000 may include determining that a confidence value indicating a similarity between the portion of the models and the search query does not satisfy a threshold confidence value. In these examples, causing display of the search results may include causing display, based at least in part on the confidence value not satisfying the threshold confidence value, of an option to train a model not yet in the taxonomy.

Additionally, or alternatively, the process 3000 may include receiving user input data indicating a classification of sample documents. The process 3000 may also include training the model based at least in part on the user input data. The process 3000 may also include determining, from the user input data, a technological category associated with the model. The process 3000 may also include causing the model to be included in the taxonomy based at least in part on the technological category.

Additionally, or alternatively, the process 3000 may include determining a first model that is most related to the search query. The process 3000 may also include determining a tier of the taxonomy associated with the first model. The process 3000 may also include determining a second model that is associated with the tier. In these examples, the search results may include the first model and the second model.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
non-transitory computer-readable media storing computer-executable instructions that, when executed by the one or more processors, cause the one or more processors to perform operations comprising:
receiving, via a user interface associated with a platform for classifying documents as in class or out of class, first user input data indicating a first portion of the documents are in class;
receiving, via the user interface, second user input data indicating a second portion of the documents are out of class;
determining a first set of features of the first portion of the documents that are representative of the first portion of the documents;
determining a second set of features of the second portion of the documents that are representative of the second portion of the documents;
training a classification model based at least in part on the first features and the second features, the classification model trained to determine a classification of individual ones of the documents by analyzing features of the individual ones of the documents in association with the first features and the second features;
determining, utilizing the classification model, a third portion of the documents that are in class;
determining, utilizing the classification model, a fourth portion of the documents that are out of class;
receiving third user input data indicating additional classification determinations associated with the documents other than the first portion of the documents;
retraining the classification model based at least in part on the third user input data;
determining a difference in the number of the documents in the third portion after utilizing the classification model as retrained; and
generating a labeling influence value indicating a degree of influence on the classification model by additional user input data.

2. The system of claim 1, the operations further comprising:
determining a first confidence score that a document of the documents correlates to the first features;
determining a second confidence score that the document correlates to the second features;
determining that the first confidence score indicates more confidence than the second confidence score; and
associating the document with the third portion of the documents based at least in part on the first confidence score indicating more confidence than the second confidence score.

3. The system of claim 1, the operations further comprising:
determining a document type of the documents, the document type indicating at least one of a subject matter associated with the documents, a database from which the documents were received, or a format of the documents; and
selecting a base model of multiple models based at least in part on the document type, wherein the base model has been configured to generate output utilizing the document type.

4. A method, comprising:
receiving first user input data indicating a first portion of documents are in class;
receiving second user input data indicating a second portion of the documents are out of class;
determining a first set of features of the first portion of the documents that are representative of the first portion of the documents;
determining a second set of features of the second portion of the documents that are representative of the second portion of the documents;
training a model based at least in part on the first features and the second features, the model trained to determine a classification of individual ones of the documents;
determining, based at least in part on the model, a third portion of the documents that are in class;
determining, based at least in part on the model, a fourth portion of the documents that are out of class;
receiving third user input data indicating additional classification determinations associated with the documents other than the first portion of the documents;
retraining the model based at least in part on the third user input data;
determining a difference in the number of the documents in the third portion after utilizing the model as retrained; and
generating a labeling influence value indicating a degree of influence on the model by additional user input data.

5. The method of claim 4, further comprising:
determining that a document of the documents correlates to the first features more than the second features; and
associating the document with the third portion of the documents based at least in part on the document correlating to the first features more than the second features.

6. The method of claim 4, further comprising:
determining a document type of the documents; and
selecting a base model of multiple models based at least in part on the document type, wherein the base model has been configured to generate output utilizing the document type.

7. The method of claim 4, further comprising:
determining, for individual ones of the first portion of the documents, a first vector representing the first features;
determining, for individual ones of the second portion of the documents, a second vector representing the second features; and determining that a document of the documents is associated with the third portion of the documents based at least in part on a third vector representing the document being associated with the first vector more than the second vector.

8. The method of claim 4, further comprising:
identifying additional documents that differ from the documents;
determining a classification of individual ones of the additional documents utilizing the model;
determining a confidence value indicating performance of the model for determining the classification of the individual ones of the additional documents; and
determining that the model has been trained successfully based at least in part on the confidence value satisfying a threshold confidence value.

9. The method of claim 4, further comprising:
determining first classification codes associated with the first portion of the documents;
determining second classification codes associated with the second portion of the documents;
determining, utilizing the model, that a first sample document is to be classified as in class based at least in part on the first sample document including keywords representing the first sample document and the first sample document being associated with at least one of the first classification codes; and
determining, utilizing the model, that a second sample document is to be classified as out of class based at least in part on the second sample document including the keywords and the second sample document being associated with at least one of the second classification codes.

10. The method of claim 4, further comprising:
receiving third user input data indicating classification of a document associated with the third portion of the documents, the third user input data indicating that the document is out of class;
determining third features representing the document; and
retraining the model based at least in part on the third features.

11. A system comprising:
one or more processors; and
non-transitory computer-readable media storing computer-executable instructions that, when executed by the one or more processors, cause the one or more processors to perform operations comprising:
receiving first user input data indicating a first portion of documents are in class;
receiving second user input data indicating a second portion of the documents are out of class;
determining a first set of features of the first portion of the documents that are representative of the first portion of the documents;
determining a second set of features of the second portion of the documents that are representative of the second portion of the documents;
training a model based at least in part on the first features and the second features, the model trained to determine a classification of individual ones of the documents;
determining, based at least in part on the model, a third portion of the documents that are in class;
determining, based at least in part on the model, a fourth portion of the documents that are out of class;
receiving third user input data indicating additional classification determinations associated with the documents other than the first portion of the documents;
retraining the model based at least in part on the third user input data;
determining a difference in the number of the documents in the third portion after utilizing the model as retrained; and
generating a labeling influence value indicating a degree of influence on the model by additional user input data.

12. The system of claim 11, the operations further comprising:
determining that a document of the documents correlates to the first features more than the second features; and
associating the document with the third portion of the documents based at least in part on the document correlating to the first features more than the second features.

13. The system of claim 11, the operations further comprising:
determining a document type of the documents; and
selecting a base model of multiple models based at least in part on the document type, wherein the base model has been configured to generate output utilizing the document type.

14. The system of claim 11, the operations further comprising:
determining, for individual ones of the first portion of the documents, a first vector representing the first features;
determining, for individual ones of the second portion of the documents, a second vector representing the second features; and
determining that a document of the documents is associated with the third portion of the documents based at least in part on a third vector representing the document being associated with the first vector more than the second vector.

15. The system of claim 11, the operations further comprising:
identifying additional documents that differ from the documents;
determining a classification of individual ones of the additional documents utilizing the model;
determining a confidence value indicating performance of the model for determining the classification of the individual ones of the additional documents; and
determining that the model has been trained successfully based at least in part on the confidence value satisfying a threshold confidence value.

16. The system of claim 11, the operations further comprising:
causing display of keywords representing the first features via a user interface;
receiving user input, via the user interface, indicating that a set of documents associated with a keyword of the keywords should be marked as in class instead of out of class; and
retraining the model based at least in part on the user input.

17. The system of claim 11, the operations further comprising:
receiving third user input data indicating classification of a document associated with the third portion of the documents, the third user input data indicating that the document is out of class;

determining third features representing the document; and
retraining the model based at least in part on the third features.

\* \* \* \* \*